United States Patent
Curry et al.

(10) Patent No.: US 7,324,120 B2
(45) Date of Patent: Jan. 29, 2008

(54) SEGMENTATION METHOD AND SYSTEM FOR SCANNED DOCUMENTS

(75) Inventors: Donald J. Curry, San Mateo, CA (US); Asghar Nafarieh, Menlo Park, CA (US); Doron Kletter, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 814 days.

(21) Appl. No.: 10/776,516

(22) Filed: Feb. 12, 2004

(65) Prior Publication Data

US 2004/0227758 A1 Nov. 18, 2004

Related U.S. Application Data

(63) Continuation-in-part of application No. 10/188,277, filed on Jul. 1, 2002, now Pat. No. 6,859,204.

(51) Int. Cl.
*G06T 11/00* (2006.01)
(52) U.S. Cl. ........................ 345/611; 382/266
(58) Field of Classification Search ................ 345/611; 382/170, 232, 266
See application file for complete search history.

(56) References Cited

U.S. PATENT DOCUMENTS

| | | | |
|---|---|---|---|
| 4,685,143 A * | 8/1987 | Choate ........................ 382/170 |
| 4,849,914 A | 7/1989 | Medioni et al. |
| 5,515,452 A | 5/1996 | Penkethman et al. |
| 5,583,659 A | 12/1996 | Lee et al. |
| 5,684,894 A * | 11/1997 | Shustorovich ............... 382/232 |
| 5,745,596 A | 4/1998 | Jefferson |
| 5,900,953 A | 5/1999 | Bottou et al. |
| 6,058,214 A | 5/2000 | Bottou et al. |
| 6,324,305 B1 | 11/2001 | Holladay et al. |
| 6,343,154 B1 | 1/2002 | Bottou et al. |
| 6,400,844 B1 | 6/2002 | Fan et al. |
| 6,633,670 B1 | 10/2003 | Matthews |
| 2003/0132946 A1* | 7/2003 | Gold .......................... 345/611 |

FOREIGN PATENT DOCUMENTS

| | | |
|---|---|---|
| EP | 0 712 094 A2 | 5/1996 |
| EP | 1 006 716 A2 | 6/2000 |

OTHER PUBLICATIONS

Castleman, "Digital Image Processing", 1996, Prentice Hall, Inc., pp. 32-33, 447-485.*
R. De Queiroz, "Compression of Compound Documents," *IEEE*, Oct. 1999, pp. 209-213.
U.S. Appl. No. 10/187,499, filed Jul. 1, 2002, Curry et al.
U.S. Appl. No. 10/188,026, filed Jul. 1, 2002, Curry et al.
U.S. Appl. No. 10/188,249, filed Jul. 1, 2002, Curry et al.

(Continued)

*Primary Examiner*—Almis R. Jankus
(74) *Attorney, Agent, or Firm*—Oliff & Berridge, PLC

(57) ABSTRACT

Methods and systems include a dependent min-max module the receives image data and generates a dependent Min value and a dependent Max value within a window around a pixel of interest. A dynamic threshold module, based on the dependent Min and Max values, generates continuity data and enhanced data suitable for identifying, for example, blobs.

14 Claims, 29 Drawing Sheets

OTHER PUBLICATIONS

U.S. Appl. No. 10/188,277, filed Jul. 1, 2002, Curry et al.
U.S. Appl. No. 10/188,157, filed Jul. 1, 2002, Curry et al.
U.S. Appl. No. 10/612,250, filed Jul. 1, 2003, Curry et al.
U.S. Appl. No. 10/612,057, filed Jul. 1, 2003, Curry et al.
U.S. Appl. No. 10/612,234, filed Jul. 1, 2003, Curry et al.
U.S. Appl. No. 10/612,461, filed Jul. 1, 2003, Curry et al.
U.S. Appl. No. 10/612,062, filed Jul. 1, 2003, Curry et al.
U.S. Appl. No. 10/612,261, filed Jul. 1, 2003, Curry et al.
U.S. Appl. No. 10/612,246, filed Jul. 1, 2003, Curry et al.
U.S. Appl. No. 10/612,368, filed Jul. 1, 2003, Curry et al.
U.S. Appl. No. 10/612,248, filed Jul. 1, 2003, Curry et al.
U.S. Appl. No. 10/612,063, filed Jul. 1, 2003, Curry et al.
U.S. Appl. No. 10/612,064, filed Jul. 1, 2003, Curry et al.
U.S. Appl. No. 10/612,084, filed Jul. 1, 2003, Curry et al.
U.S. Appl. No. 10/776,515, filed Feb. 12, 2004, Curry et al.
U.S. Appl. No. 10/776,514, filed Feb. 12, 2004, Curry et al.
U.S. Appl. No. 10/776,608, filed Feb. 12, 2004, Curry et al.
U.S. Appl. No. 10/776,602, filed Feb. 12, 2004, Curry et al.
U.S. Appl. No. 10/776,620, filed Feb. 12, 2004, Curry et al.
U.S. Appl. No. 10/776,603, filed Feb. 12, 2004, Curry et al.
U.S. Appl. No. 10/776,509, filed Feb. 12, 2004, Claassen et al.
U.S. Appl. No. 10/776,508, filed Feb. 12, 2004, Curry et al.
U.S. Appl. No. 10/776,612, filed Feb. 12, 2004, Curry et al.

* cited by examiner

SEGMENTATION METHOD AND SYSTEM FOR SCANNED DOCUMENTS

This is a continuation-in-part of application Ser. No. 10/188,277 filed Jul. 1, 2002 now U.S. Pat. No. 6,859,204. The entire disclosure of the prior application is hereby incorporated by reference herein in its entirety.

This invention is related to U.S. Patent Applications filed on an even date herewith and incorporated by reference in their entireties.

BACKGROUND OF THE INVENTION

1. Field of Invention

This invention is directed to analyzing image data to generate continuity data and/or enhancement data.

2. Related Art

Documents scanned at high resolutions typically require very large amounts of storage space. Furthermore, a large volume of image data requires substantially more time and bandwidth to move around, such as over a local or wide area network, over an intranet, an extranet or the Internet, or other distributed networks.

Documents, upon being scanned using a scanner or the like, are typically defined using an RGB color space, e.g., in raw RGB format. However, rather than being stored in this raw scanned RGB format, the document image data is typically subjected to some form of data compression to reduce its volume, thus avoiding the high costs of storing such scanned RGB color space document image data.

Lossless Run-length compression schemes, such as Lempel-Ziv (LZ) or Lempel-Ziv-Welch (LZW), do not perform particularly well on scanned image data or, in general, image data having smoothly varying low-spatial frequencies such as gradients and/or natural pictorial data. In contrast, lossy methods such as JPEG, work fairly well on smoothly varying continuous tone image data. However, lossy methods generally do not work particularly well on binary text and/or line art image data or, in general, on any high spatial frequency image data containing sharp edges or color transitions, for example.

Another type of image compression is shown, for example, in U.S. Pat. No. 6,633,670, which decomposes images into separate layers, each containing a limited number of image element types, e.g., text, line or photographic. Each layer can be compressed separately. Images are decomposed into foreground, background and mask layers. The value of a pixel in the mask layer is determined by partitioning the image into large and small sub-images or blocks. A sub-image mask is created for each sub-image by sorting pixels of the sub-image into large and small sub-images or blocks. A sub-image mask is created for each image by sorting pixels of the sub-image into clusters centered on the luminance of pixels of a pair of pixels or maximum luminance gradient.

One approach to satisfying the compression needs of data, such as the different types of image data described above, is to use an encoder pipeline that uses a mixed raster content (MRC) format to describe the data. The image data, such as for example, image data defining a composite image having text intermingled with color and/or gray-scale information, is segmented into two or more planes. These planes are generally referred to as the background plane and the foreground planes. A selector plane is generated to indicate, for each pixel in the composite image, which of the image planes contains the actual image data that should be used to reconstruct the final output image. Segmenting the image data into planes in this manner tends to improve the overall compression of the image, because the data can be arranged into different planes such that each of the planes are smoother and more readily compressible than is the original image data. Image segmentation also allows different compression methods to be applied to the different planes. Thus, the most appropriate compression technique for the type of data in each plane can be applied to compress the data of that plane.

SUMMARY OF THE DISCLOSURE

Unfortunately, some image document formats, such as the portable document format (PDF), do not currently fully support such three-layer mixed raster content decompositions of an original document. As a result, when attempting to print or otherwise render a document that has been compressed and stored as a mixed raster content image data file using such image document formats, the document either cannot be rendered at all, or contains objectionable artifacts upon rendering.

This invention provides systems and methods for converting a document to a mixed raster content format having multiple foreground planes.

This invention separately provides systems and methods for inputting data that has been at least partially segmented by a front end of a three-layer mixed raster content system or method and creating multiple foreground planes from the received data.

This invention separately provides systems and methods for identifying regions in the received image data that belong to particular binary foreground planes of a plurality of determined binary foreground planes.

This invention separately provides systems and methods for gathering regions in the segmented received image data having similar properties for a given image characteristic into a given one of a plurality of binary foreground planes.

In various embodiments, the systems include a dependent min-max module the receives image data and generates a dependent Min value and a dependent Max value within a window around a pixel of interest. A dynamic threshold module, based on the dependent Min and Max values, generates continuity data and enhanced data suitable for identifying, for example, blobs.

These and other features and advantages of various exemplary embodiments of systems and methods according to this invention are described in, or are apparent from, the following detailed description of various exemplary embodiments of the systems and methods according to this invention.

BRIEF DESCRIPTION OF DRAWINGS

Various exemplary embodiments of systems and methods of this invention will be described in detail, with reference to the following figures, wherein.

DETAILED DESCRIPTION OF EXEMPLARY EMBODIMENTS

Various exemplary embodiments of systems and methods according to this invention automatically process scanned and/or printed color documents to produce small, highly-compressed image data files that accurately capture the original document content. According to various exemplary embodiments of systems and methods according to this invention, output files are generated in accordance with the mixed raster content (MRC) representation, which is now included in both TIFF and PDF standards, as well as the PostScript standard.

Figure 1:
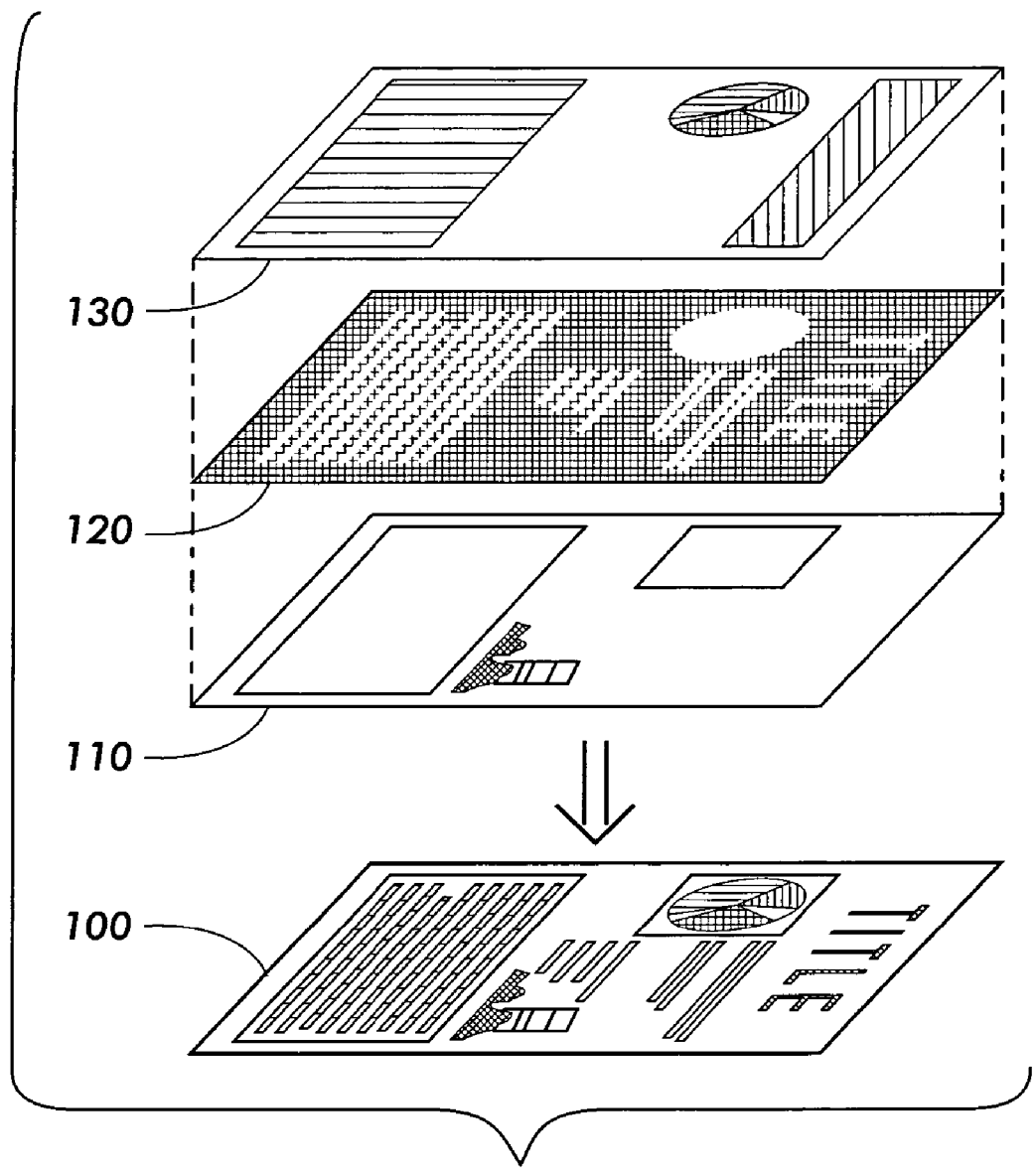
FIG. 1 shows one exemplary embodiment of the foreground, background and selector planes of the three-layer mixed raster content format and the resulting rendered document image.

FIG. 1 shows one exemplary embodiment of a three-layer mixed raster content image data. As shown in FIG. 1, a document image 100 to be rendered using the mixed raster content format is generated using a background plane 110, a foreground plane 130, and a selector plane 120. A fourth, non-image data plane can also be included in the mixed raster content image data file. This fourth plane often contains rendering hints which can be used by a rendering engine, such as Adobe Acrobat or the Acrobat Reader, to provide additional instruction on how particular pixels are to be rendered.

As shown in FIG. 1, the selector plane 120 is used to mask undifferentiated regions of color image data stored on the foreground plane 130 onto the background plane 110 to form the rendered image 100. In particular, the selector plane 120 contains high spatial frequency information for regions otherwise having slowly changing color information. In effect, regions whose color changes relatively slowly, if at all, are placed onto the foreground plane 130. The shapes of those regions are then embedded into the selector plane 120. In contrast, regions having high color frequency, e.g., colors whose values change more significantly over very small spatial extents, are stored as continuous tone image data on the background plane 110. When the image 100 is to be generated, the color information stored in the foreground plane 130 has spatial or shape attributes applied to it based on the binary information stored in the selector plane 120 and the resulting shaped color information is combined onto the background plane 110 to form the reconstructed image 100.

U.S. patent application Ser. Nos. 10/187,499; 10/188,026; 10/188,249; 10/188,277; 10/188,157; 10/612,250; 10/612,057; 10/612,234; 10/612,461; 10/612,062; 10/612,261; 10/612,246; 10/612,368; 10/612,248; 10/612,063; 10/612,064 and 10/612,084, each incorporated herein by reference in its entirety, disclose in greater detail various aspects of the process for decomposing document image data into the various planes 110-130.

However, the mixed raster content format, as outlined above with respect to FIG. 1, is not fully supported by all image document formats. In various exemplary embodiments of systems and methods according to this invention, rather than using the three-layer format outlined above with respect to FIG. 1, image data is decomposed into a background plane and a plurality of binary foreground planes. This is illustrated in detail in FIG. 2.

Figure 2:
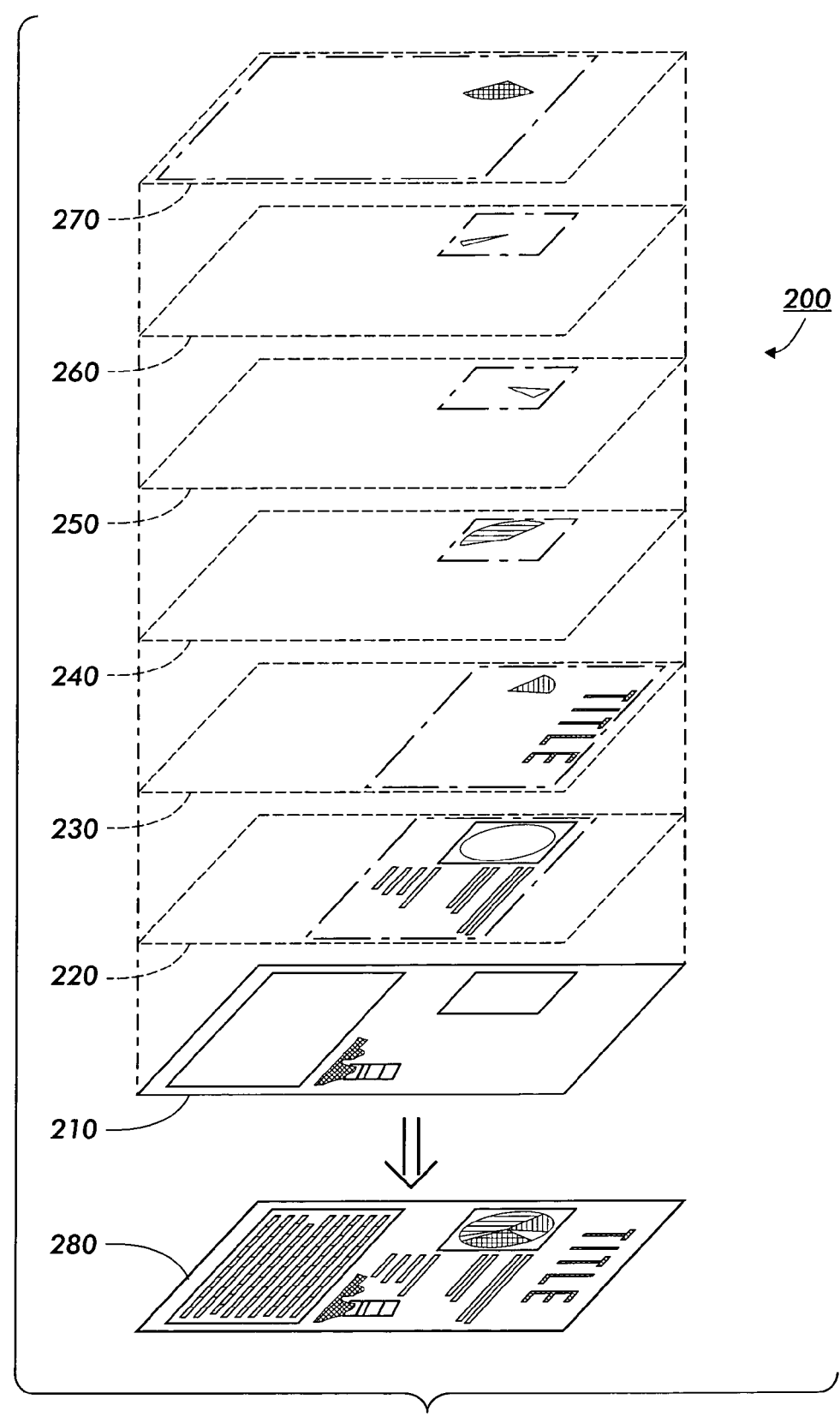
FIG. 2 illustrates one exemplary embodiment of a multiple binary foreground image planes and the resulting document image.

As shown in FIG. 2, a document image 200 is decomposed into a background continuous tone or grayscale plane 210 and, for example, six binary foreground planes 220-270. Each of the binary foreground planes 220-270 defines the spatial extents of low spatial frequency color image data to be combined onto the background plane 210. However, unlike the three-layer mixed raster content shown in FIG. 1, rather than obtaining the color data from a separate foreground plane, each of the multiple binary foreground planes 220-270 has a specific color associated with that plane. The image data is separated into a number of distinct color values, six in this example, where each of the six color values is associated with a particular binary foreground plane. In addition, the pictorial and other color information not lifted to the plurality of foreground planes, if any, are left on the color background plane 210. Thus, th e image data is decomposed to form the background plane 210 and the multiple binary foreground planes 220-270.

It should be appreciated that, in this situation, the image data in any of the multiple binary foreground planes 220-270 does not overlap the image data in any other one of the multiple binary foreground planes 220-270. As a result, each of the binary foreground planes 220-270 can be individually combined with the background plane 210 without regard to order or sequence. When each of the multiple binary foreground planes 220-270 is combined with the background plane 210 by applying the color value associated with that binary foreground plane to the background plane 210 according to the binary data on that binary foreground plane, the resulting image 280 is obtained.

Figure 3:
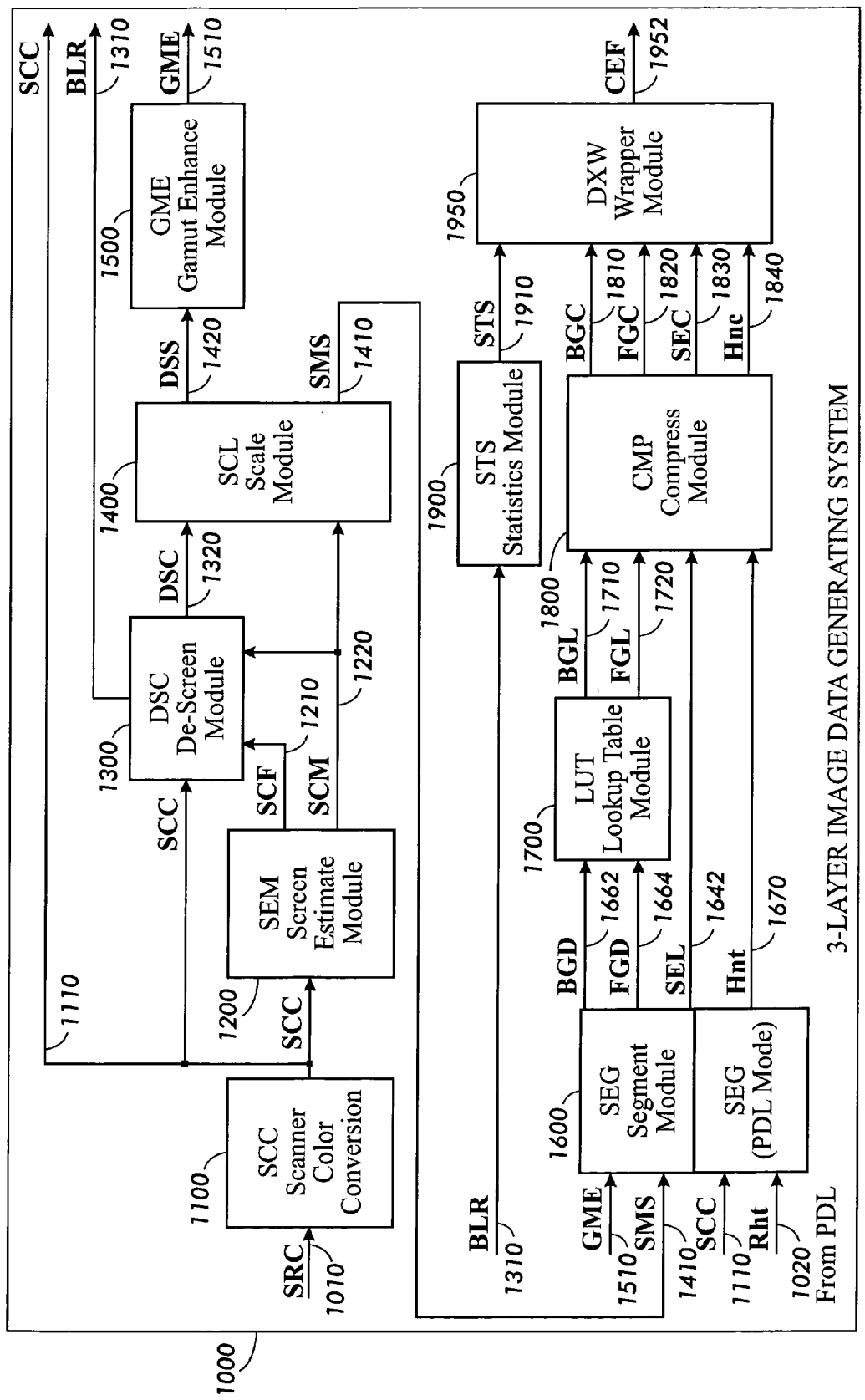
FIG. 3 illustrates one exemplary embodiment of a three-layer image data generating system.

FIG. 3 shows one exemplary embodiment of a three-layer image data generating system 1000, as described in the incorporated 499; 026; 249; 277; 157; 250; 057; 234; 461; 062; 261; 246; 368; 248; 063; 064 and 084 applications. As shown in FIG. 3, scanner image data SRC is input on a signal line 1010 to a scanner color conversion module 1100. In general, the scanner image data SRC will typically be in a red-green-blue (RGB) color space. However, the conversion of the scanner image data into the three-layer format is typically best performed using a luminance and chroma based color space, such as LAB or YCC, as it is more suitable for segmentation. It should be further appreciated that the LAB or YCC color spaces could be accurately computed or linearly approximated depending on the circumstances and desired color fidelity. Accordingly, the scanner color conversion module 1100 outputs scanner color converted SCC image data, which is typically LAB or YCC, data over a signal line 1110 to a screen estimation module 1200, a descreen module 1300, and a segment module 1600. The detailed description provided in the incorporated 234 application and other ones of the incorporated applications discusses this conversion with respect to both LAB and YCC color spaces.

The scanned color converted image data SCC is input by the screen estimate module 1200, which estimates halftone frequencies and magnitudes, if any, in various regions of the converted image data. This information is usable when removing halftoning from the scanned color converted image data SCC. The screen estimate module 1200 outputs, for each pixel in the image data, an estimated screen frequency SCF over a signal line 1210 to the descreen module 1300. The screen estimate module 1200 also outputs, for each pixel in the image data, an estimated screen magnitude signal SCM over a signal line 1220 to the descreen module 1300 and to a scale module 1400.

The descreen module 1300 inputs the scanner color converted SCC image data from the scanner color conversion module 1100, and the estimated screen frequency signal SCF and the screen magnitude signal SCM from the screen estimate module 1200. The descreen module 1300 outputs a blur signal BLR over a signal line 1310 to a statistics module 1900 and outputs a descreened image data signal DSC over a signal line 1320 to the scale module 1400.

The scale module 1400 scales the screen magnitude SCM and descreen DSC signals to the desired output resolution and size, such as for reduction enlargement and/or different printer resolution. The scale module 1400 outputs a scaled screen magnitude signal SMS over a signal line 1410 to the segment module 1600. The scale module 1400 also outputs a scaled descreened image data signal DSS over a signal line 1420 to a gamut enhance module 1500. The gamut enhance module 1500 inputs the scaled descreened image data signal DSS and outputs an enhanced gamut image data signal GME over the signal line 1510 to the segment module 1600. It should be appreciated that the incorporated 234 and 261 applications provide more details regarding the operation of the scanned color conversion module 1100. Similarly, the incorporated 084 application provides greater details on the operation of the screen estimate module 1200, while the incorporated 499, 026 and 064 applications provide greater details regarding the descreen module 1300 and the incorporated 461 application provides greater details on the gamut enhance module 1500.

As shown in FIG. 3, the SCC, SMS and GME signals are input over the signal lines 1110, 1410 and 1510, respectively, to the segment module 1600. In addition, a rendering hint signal Rht is input over a signal line 1020 when the image data to be converted is obtained from an image data file that stores image data written using a page description language (PDL). In particular, as shown in FIG. 3, the SCC and Rht signals are input only to the PDL mode portion of the segment module 1600, while the SMS and the GME signals are input to the segment module 1600 for scanned images in non-PDL mode. The segment module 1600 segments the image data represented by the gamut enhanced image data signal GME based on the scaled image data signal SMS to generate a background image data signal BGD and a foreground image data signal FGD, which are output respectively on the signal lines 1662 and 1664 to a look-up table module 1700. The segment module 1600 also outputs a selector plane image data signal SEL to a compress module 1800 over a signal line 1642. Finally, if the segment module 1600 was provided with a rendering hint signal Rht, the segment module 1600 also outputs a hint image data plane signal Hnt over a signal line 1670 to the compressed module 1800.

The look-up table module 1700 inputs the background and foreground data signals BGD and FGD, respectively, over the signal lines 1662 and 1664 and converts them from one color space into a second color space, such as, for example, from the internal YCC color space to the output device-independent LAB color space. The look-up table module 1700 outputs the color space converted background and foreground data signals BGL and FGL, respectively, over the signal lines 1710 and 1720 to the compress module 1800. The compress module 1800 compresses each of the background plane, the foreground plane, the selector plane, and the hint plane, if generated, separately using compression techniques particularly adapted to the types of data stored on those planes. The compress module 1800 outputs a compressed background image plane signal BGC over a signal line 1810 to a wrapper module 1950. Likewise, the compress module 1800 outputs a compressed foreground data plane signal FGC over a signal line 1820, a compressed selector plane signal SEC over a signal line 1830 and a compressed rendering hint plane signal Hnc over a signal line 1840 to the wrapper module 1950.

In parallel with the look-up table module 1700 and the compress module 1800, the blur signal BLR is input over the signal line 1310 to a statistics module 1900. The statistics module 1900, based on the blur signal BLR, generates a statistics signal STS, which is output over a signal line 1910 to the wrapper module 1950. The wrapper module 1950 then creates a single data file containing each of the various compressed data planes, based on the statistics signal STS. The statistics information STS is very small and therefore is typically not compressed. The statistics information is used for automatic background suppression, neutral detect, auto image enhancement, and various other enhancement techniques. In various exemplary embodiments, this single data file is in a common exchange format (CEF), and is output on the signal line 1952 to a downstream process. It should be appreciated that the common exchange format (CEF) file is not intended to limit the possible data file formats only to the common exchange format, but rather is intended to encompass within its scope any known or later-developed generalized data format, including the PostScript format and the portable document format (PDF).

It should be appreciated that the incorporated 057 application provides greater details regarding the page description mode of the segment module 1600. Likewise, the incorporated 249, 277, 157, 250, 246, 368, 248 and 063 applications provide greater details about the operation of the segment module 1600 in its entirety. The incorporated 062 application provides greater details regarding the look-up table module 1700, while the incorporated 234 application provides greater details regarding the statistics module 1900.

It should be appreciated that, in various exemplary embodiments, the three-layer image data generating system 1000 can be implemented as software executing on a programmed general purpose computer. Likewise, the three-layer image data generating system 1000 can also be implemented on a special purpose computer, a programmed microprocessor or microcontroller and peripheral integrated circuit elements, and ASIC or other integrated circuit, a digital signal processor (DSP), a hardwired electronic or logic circuit, such as a discrete element circuit, a programmable logic device, such as a PLD, PLA, FPGA or PAL, or the like. In general, any device that is capable of implementing the functionality disclosed herein and in the incorporated 499; 026; 249; 277; 157; 250; 057; 234; 461; 062; 261; 246; 368; 248; 063; 064 and 084 applications can be used to implement the three-layer image data generating system 1000. Each of the various signal lines outlined above in FIG. 3 connecting the various modules and the like can be direct signal line connections or can be software connections implemented using an implication programming interface or the like. It should be appreciated that any appropriate hardware, firmware or software elements or data structures can be used to implement one or more of the various modules and/or signal lines outlined above with respect to FIG. 3.

It should be understood that each of the circuits, routines, applications, modules or the like outlined above with respect to FIG. 3 can be implemented as software that is stored on a computer-readable medium and that is executable on a computer general purpose computer, a programmed special purpose computer, a programmed microprocessor, a programmed digital signal processor or the like. Such a computer-readable medium includes using a carrier wave or the like to provide the software instructions to a processing device. It should also be understood that each of the circuits, routines, applications, objects, procedures, managers and/or modules outlined above with respect to FIG. 3 can be implemented as portions of a suitably programmed general purpose computer. Alternatively, each of the circuits, routines, applications, objects, procedures, managers and/or modules shown in FIG. 3 can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, applications, objects, procedures, managers and/or modules shown in FIG. 3 will take is a design choice and it will be obvious and predictable to those skilled in the art. It should be appreciated that the circuits, routines, applications, objects, procedures, managers and/or modules shown in FIG. 3 do not need to be of the same design.

It should be appreciated that a routine, an application, a manager, a procedure, an object, and/or a module, or the like, can be implemented as a self-consistent sequence of computerized steps that lead to a desired result. These steps can be defined by and/or in one or more computer instructions stored in a computer-readable medium, which should be understood to encompass using a carrier wave or the like to provide the software instructions to a processing device. These steps can be performed by a computer executing the instructions that define the steps. Thus, the terms "routine", "application", "manager", "procedure", "object" and/or "module" can refer to, for example, any appropriately-designed circuit, a sequence of instructions, a sequence of instructions organized with any programmed procedure or programmed function, and/or a sequence of instructions organized within programmed processes executing in one or more computers. Such routines, applications, managers, procedures, objects and/or modules, or the like, can also be implemented directly in circuitry that performs a procedure. Further, the data processing described with respect to FIG. 3 can be performed by a computer executing one or more appropriate programs, by special purpose hardware designed to perform the method, or any combination of such hardware, firmware and software elements.

Figure 4:
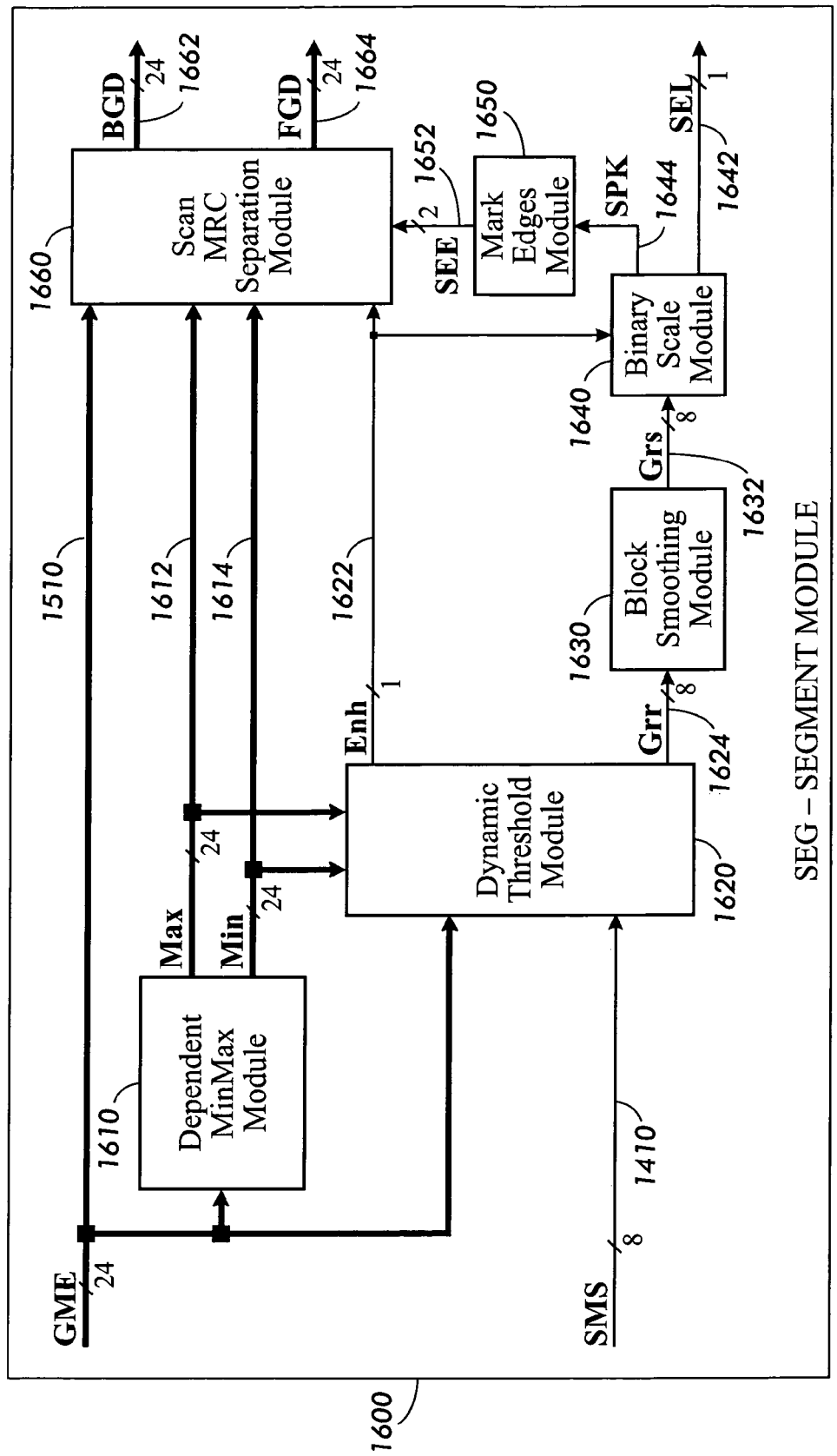
FIG. 4 illustrates one exemplary embodiment of a segment module of the three-layer image data generating system of FIG. 3.

FIG. 4 illustrates in greater detail one exemplary embodiment of the segment module 1600 shown in FIG. 3. As shown in FIG. 4, the segment module 1600 inputs the gamut enhanced image data signal GME over the signal line 1510 and provides it to each of a dependent min-max module 1610, a dynamic threshold module 1620 and a scan MRC separation module 1660. As shown in FIG. 4, the segment module 1600 also inputs the scaled screen magnitude signal SMS, if available, over the signal line 1410 to the dynamic threshold module 1620.

The dependent min-max module 1610 inputs the gamut enhanced image data signal GME over the signal line 1510 and outputs, for each pixel in the input image data, a local maximum image value signal MAX over a signal line 1612 and a local minimum image value signal MIN over a signal line 1614 to the dynamic threshold module 1620 and to the scan MRC separation module 1660. That is, for each pixel in the image being converted, a window defining a neighborhood around that pixel is applied to that pixel and maximum and minimum image values of pixels within that window are determined and identified as the dependent maximum and dependent minimum image values for that pixel of interest. This is described in greater detail in the incorporated 249 and 246 applications.

The dynamic threshold module 1620 inputs the gamut enhanced image data signal GME over the signal line 1510, the scaled screen magnitude signal SMS, if available, over the signal line 1410, the dependent maximum signal MAX and the dependent minimum signal MIN over the signal lines 1612 and 1614. The dynamic threshold module 1620 outputs an enhance control signal Enh over the signal line 1622 to the scan MRC separation module 1660 and to a binary scale module 1640. The dynamic threshold module 1620 also outputs a raw gray level selector signal Grr over a signal line 1624 to a block smooth module 1630. The block smooth module 1630 filters the raw gray signal Grr and outputs a smooth gray selector signal Grs over a signal line 1632 to the binary scale module 1640.

The binary scale module 1640 inputs the enhanced image data signal Enh over the signal line 1622 and the smoothed grayscale signal. Grs over the signal line 1632 and outputs the binary selector plane data signal SEL over the signal line 1642.

The binary scale module 1640 generates the binary selector signal SEL, which forms the selector plane SEL 120 of the Common Exchange Format (FIG. 1). The binary selector signal SEL controls the MRC separation into foreground FGD and background BGD planes. In order to provide high quality separation, the binary selector signal SEL can be generated at higher multiples of the input scanner resolution. Inage data is typically scanned at a fixed resolution, such as 300 or 600 dots per inch, for example. In order to improve text and line-art quality, the binary selector signal SEL can be generated and outputted at higher resolution (for example, 1200 dots per inch). The amount of SEL upsampling is typically, though not limited to, a binary power-of-two integer such as 1, 2, 4, . . . , etc. When higher resolution is used (i.e., scale up by 2 or more), multiple binary SEL bits are generated for each input pixel. These bits are packed together as the packed selector signal SPK, and sent sequentially to the output. For instance, when the selector is up-sampled by 2×, the packed selector SPK output will contain four bits for each input pixel, and thus SPK is now effectively at twice the input resolution. The binary scale module 1640 outputs the packed selector signal SPK over the signal line 1644 to the mark edges module 1650.

The mark edges module 1650 analyzes the bit pattern of the packed selector signal SPK, which can be at the same or higher multiple of the input resolution. The Mark edges module 1650 extracts the information relevant to MRC separation from the packed selector signal SPK. This information is based on counting the number and polarity of the higher resolution edges corresponding to one input image pixel. The information is conveyed to the MRC separation module by means of the selector edge extract SEE signal. The mark edges module 1650 inputs the packed selector signal SPK 1644 and outputs a selector edge extract signal SEE 1652 to the scan MRC separation module 1660. Image pixel intensity polarity is a relative concept that compares the intensity of a given pixel or group (including a row) of pixels with another pixel or group of pixels. For two groups of pixels, the group having the higher intensity has a positive polarity with respect to the group having the lower pixel intensity, whereas the lower pixel intensity group has a lower polarity than the higher intensity pixel group. U.S. Pat. No. 5,515,452, for example, provides an explanation of edge polarity.

The scan MRC separation module 1660 inputs the gamut enhanced image data signal GME over the signal line 1510, the dependent maximum and minimum signals MAX and MIN over the signal lines 1612 and 1614, the enhanced image data signal Enh over the signal line 1622 and the selector edge extract signal SEE over the signal line 1652. The scanned MRC separation module 1660, based on these signals, separates the gamut enhanced image data signal GME into the background plane signal BGD and the foreground plane signal FGD.

It should be appreciated that the incorporated 249; 277 and 368 applications provide greater details for the operation of the dynamic threshold module 1620. The incorporated 063 application provides greater detail regarding the operation of the block smooth module 1630. The incorporated 157 and 248 applications provide greater detail on the operation of the binary scale and mark edges modules 1640 and 1650, while the incorporated 157 application also provides greater details regarding the operation of the scan MRC separation module 1660.

Figure 5:
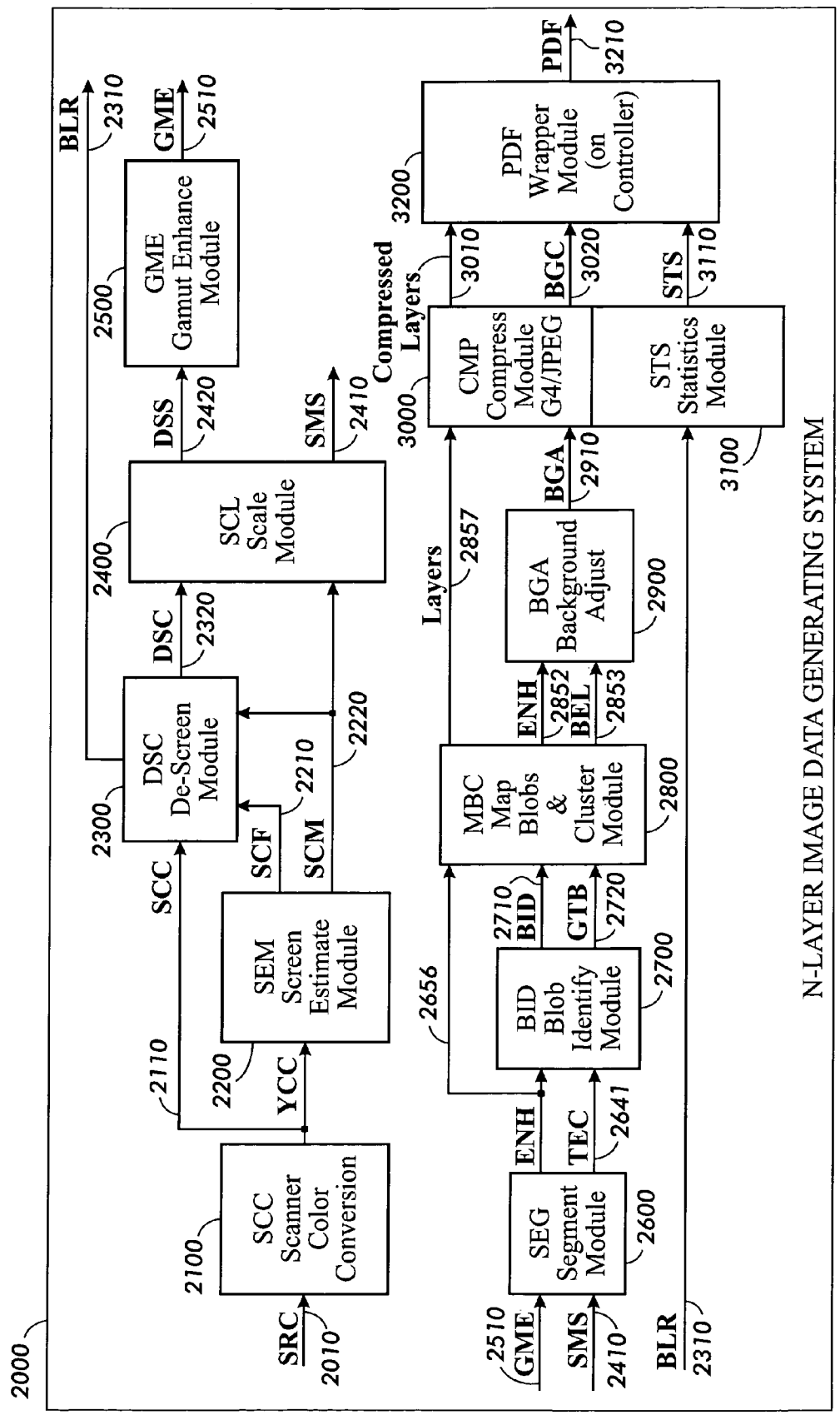
FIG. 5 illustrates one exemplary embodiment of an N-layer image data generating system.

FIG. 5 illustrates one exemplary embodiment of an N-layer image data generating system 2000 according to this invention. The N-layer image data generating system may be a xerographic color printer, a marking device, a digital photocopier, an ink-jet printer and the like. As shown in FIG. 5, the N-layer image data generating system 2000 inputs the scanner signal SRC over a signal line 2010 to a scanner color conversion module 2100. The scanner color conversion module 2100 outputs the scanner color converted signal SCC over a signal line 2110 to a screen estimate module 2200 and a descreen module 2300. The screen estimate module 2200 outputs the estimated screen frequency signal SCF over a signal line 2210 to the descreen module 2300 and outputs the estimated screen magnitude signal SCM over a signal line 2220 to the descreen module 2300 and to a scale module 2400. The descreen module 2300 outputs the blur signal BLR over a signal line 2310 to a statistics module 3100 and the descreened image data signal DSC over a signal line 2320 to the scale module 2400. The scale module 2400 outputs the scaled screen magnitude signal SMS over a signal line 2410 to the segment module 2600 and the scaled descreened image data signal DSS over a signal line 2420 to the gamut enhance module 2500. The gamut enhance module 2500 outputs the gamut enhanced image data signal GME over a signal line 2510 to the segment module 2600. It should be appreciated that each of the modules and signal lines 2010-2510 are generally identical to those described and outlined above with respect to FIG. 3 and in the incorporated 499; 026; 249; 277; 157; 250; 057; 234; 461; 062; 261; 246; 368; 248; 063; 064 and 084 applications and thus will not be described in further detail.

As shown in FIG. 5, the N-layer image data generating system 2000, in place of the segment model 1600 and the look-up table module 1700 and the related signal lines of the three-layer image data generating system 1000, includes a different segment module 2600, a blob identifying module 2700, a map blobs and cluster module 2800 and a background adjust module 2900. However, as also shown in FIG. 5, while the N-layer image data generating system 2000 also includes a compress module 3000, a statistics module 3100 and a PDF wrapper module 3200, these elements operate generally similarly to, but not necessarily identically to, the corresponding modules 1800, 1900 and 1950 outlined above with respect to FIG. 3.

In particular, as shown in FIG. 5, the segment module 2600 inputs only the gamut enhanced image data signal GME over the signal line 2510 and the scaled screen magnitude signal SMS over the signal line 2410. The segment module 2600 processes these signals and generates a tri-state edge continuity signal TEC, which is output over a signal line 2641 to the blob identifying module 2700. The segment module 2600 also outputs the enhanced image data signal ENH over a signal line 2656 to the blob identity module 2700 and the map blobs and cluster module 2800. The blob identifying module 2700 inputs the tri-state edge continuity signal TEC and the enhanced image data signal ENH over the signal lines 2641 and 2656, respectively, and converts them into a blob ID signal (BID) and a global table of blobs GTB. Each of these signals is output over the signal lines 2710 and 2720, respectively, to the map blobs and cluster module 2800.

The map blobs and cluster module 2800 inputs the enhanced image data signal ENH over the signal line 2656, the blob ID signal BID over the signal line 2710 and the global table of blobs signal GTB over the signal line 2720 and assigns various blobs to different ones of the multiple binary foreground planes depending in part on the particular colors associated with each of the different planes and the different blobs. The map blobs and cluster module 2800 also determines the extents of the various binary foreground layers, as each binary foreground layer does not need to extend over the full size of the image data being converted. This occurs, for example, when all the blobs of one binary foreground plane are located only in one-half of the document being converted, such that the other half of that binary foreground plane will always be empty. Since the other half of that binary foreground plane will always be empty, it is not necessary to compress or otherwise maintain the other half of that binary foreground plane. Consequently, the size of that binary foreground plane can be adjusted accordingly.

The map blobs and cluster module 2800 outputs the binary data for each of the binary foreground layers over a signal line 2851 to the compress module 3000. The map blobs and cluster module 2800 also outputs a binary selector signal BEL over a signal line 2853, which is a union of all the binary foreground masks and also passes the enhanced color signal ENH over a signal line 2852 to the background adjust module 2900. The background adjust module 2900 adjusts the background of the background image data signal BG and outputs an adjusted background image data signal BGA to the compress module 3000 over a signal line 2910.

The background adjust module 2900 adjusts the background grayscale layer to fill in the regions, that will be replaced by data from various ones of the binary foreground planes when the image is recombined, with data that maximizes the compressibility of the background grayscale plane. The adjusted background grayscale plane signal BGA is output over the signal line 2910 to the compression module 3000.

The compress module 3000, like the compress module 1800, compresses each of the binary foreground layers received over the signal line 2851 and the background image data signal BGA received over the signal line 2910 differentially, using a compression routine that is appropriate for the particular type of data being compressed, to generate compressed image data for the binary foreground layers and the background plane.

The compress module 3000 then outputs the compressed binary foreground layers to the PDF wrapper 3200 over the signal line 3010, and the compressed background signal BGC over the signal line 3020 to the PDF wrapper 3200.

In parallel, the blur signal BLR is input over the signal line 2310 to the statistics module 3100, which operates generally similarly to the statistics module 1900 outlined above with respect to FIG. 3. The statistics signal STS is output over a signal line 3110 to the PDF wrapper 3200. Since the amount of statistical data gathered is small, it is typically not compressed. The PDF wrapper 3200 inputs the compressed layers signals over the signal line 3010, the compressed background signal BGC over the signal line 3020 and the statistics signal STS over the signal line 3110 and combines them into an n-layer PDF file (PDF) that is output to a downstream process over a signal line 3210.

It should be appreciated that, in various exemplary embodiments, the N-layer image data generating system 2000 can be implemented as software executing on a programmed general purpose computer. Likewise, the N-layer image data generating system 2000 can also be implemented on a special purpose computer, a programmed microprocessor or microcontroller and peripheral integrated circuit elements, and ASIC or other integrated circuit, a digital signal processor (DSP), a hardwired electronic or logic circuit, such as a discrete element circuit, a programmable logic device, such as a PLD, PLA, FPGA or PAL, or the like. In general, any device that is capable of implementing the functionality disclosed herein and in the incorporated 499; 026; 249; 277; 157; 250; 057; 234; 461; 062; 261; 246; 368; 248; 063; 064 and 084 applications can be used to implement the N-layer image data generating system 2000. Each of the various signal lines outlined above in FIG. 5 connecting the various modules and the like can be direct signal line connections or can be software connections implemented using an implication programming interface or the like. It should be appreciated that any appropriate hardware, firmware or software elements or data structures can be used to implement one or more of the various modules and/or signal lines outlined above with respect to FIG. 5.

It should be understood that each of the circuits, routines, applications, modules or the like outlined above with respect to FIG. 5 can be implemented as software that is stored on a computer-readable medium and that is executable on a programmed general purpose computer, a programmed special purpose computer, a programmed microprocessor, a programmed digital signal processor or the like. Such a computer-readable medium includes using a carrier wave or the like to provide the software instructions to a processing device. It should also be understood that each of the circuits, routines, applications, objects, procedures, managers and/or modules outlined above with respect to FIG. 5 can be implemented as portions of a suitably programmed general purpose computer. Alternatively, each of the circuits, routines, applications, objects, procedures, managers and/or modules shown in FIG. 5 can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, applications, objects, procedures, managers and/or modules shown in FIG. 5 will take is a design choice and it will be obvious and predictable to those skilled in the art. It should be appreciated that the circuits, routines, applications, objects, procedures, managers and/or modules shown in FIG. 5 do not need to be of the same design.

It should be appreciated that a routine, an application, a manager, a procedure, an object, and/or a module, or the like, can be implemented as a self-consistent sequence of computerized steps that lead to a desired result. These steps can be defined by and/or in one or more computer instructions stored in a computer-readable medium, which should be understood to encompass using a carrier wave or the like to provide the software instructions to a processing device.

These steps can be performed by a computer executing the instructions that define the steps. Thus, the terms "routine", "application", "manager", "procedure", "object" and/or "module" can refer to, for example, any appropriately-designed circuit, a sequence of instructions, a sequence of instructions organized with any programmed procedure or programmed function, and/or a sequence of instructions organized within programmed processes executing in one or more computers. Such routines, applications, managers, procedures, objects and/or modules, or the like, can also be implemented directly in circuitry that performs a procedure. Further, the data processing described with respect to FIG. 5 can be performed by a computer executing one or more appropriate programs, by special purpose hardware designed to perform the method, or any combination of such hardware, firmware and software elements.

Figure 6:
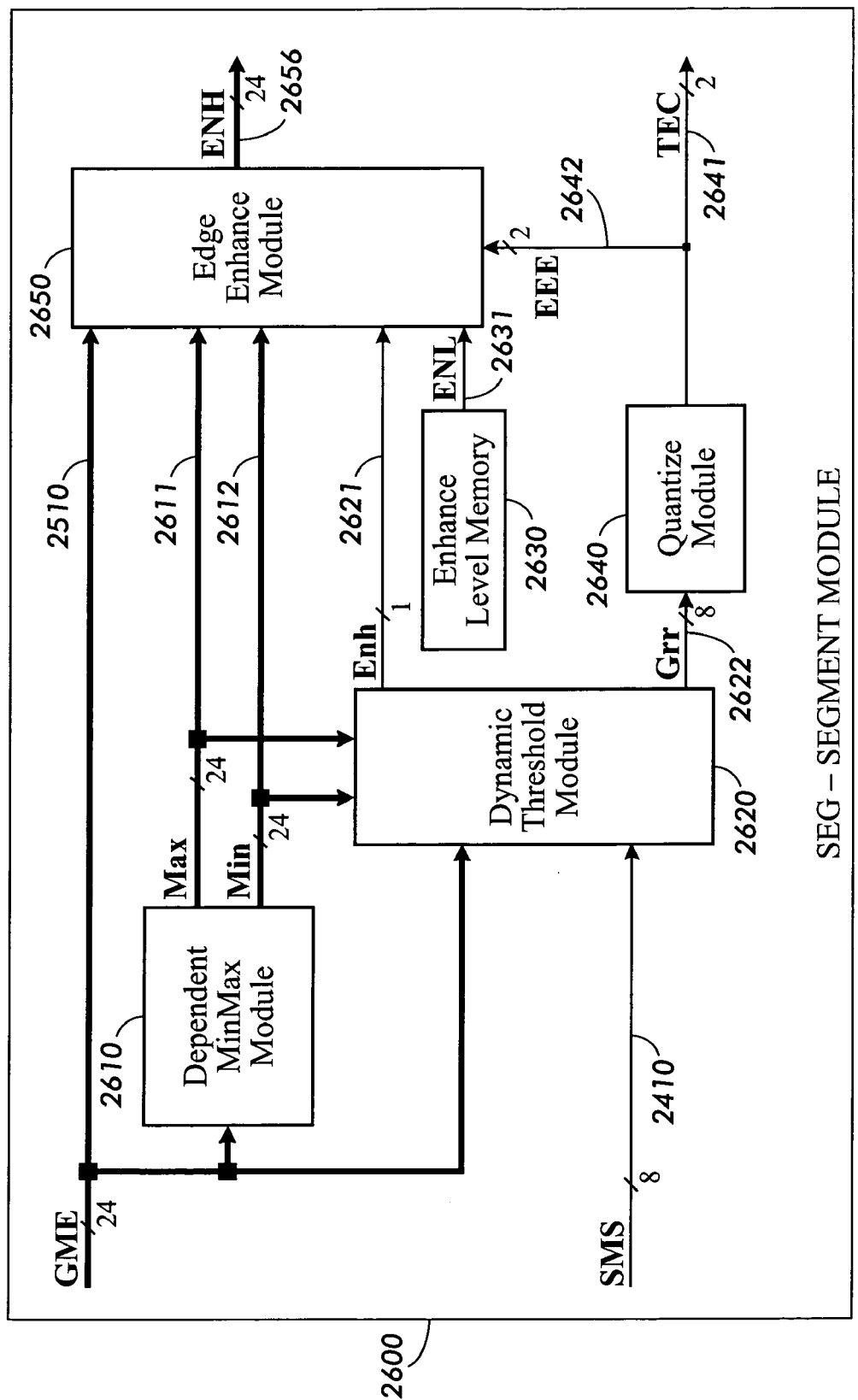
FIG. 6 illustrates one exemplary embodiment of a segment module of the N-layer image data generating system of FIG. 5.

FIG. 6 illustrates in greater detail one exemplary embodiment of the segment module 2600 of the N-layer image data generating system 2000 shown in FIG. 5. As shown in FIG. 6, the gamut enhanced image data signal GME is input over the signal line 2510 to a dependent min-max module 2610 and a dynamic threshold module 2620. Similarly, the scaled screen magnitude signal SMS, if available, is input over the signal line 2410 to the dynamic threshold module 2620. The dependent min-max module 2610 and the dynamic threshold module 2620 operate similarly to the dependent min-max module 1610 and the dynamic threshold module 1620 of the segment module 1600 illustrated in FIG. 4. Thus, the structure and operation of these modules will not be described further.

As shown in FIG. 6, the dependent min-max module 2610 outputs a maximum value signal MAX and a minimum value signal MIN over a pair of signal lines 2611 and 2612, respectively, to the dynamic threshold module 2620 and to an edge enhance module 2650. The dynamic threshold module 2620 outputs the enhanced image data signal Enh over a signal line 2621 to the edge enhance module 2650 and outputs a raw grayscale selector signal Grr over a signal line 2622 to a quantize module 2640.

In various exemplary embodiments, the measured dependent minimum and maximum values MIN and MAX are measured by the dependent min-max module 2610 in some neighborhood region such as, for example, a 7-by-7 window of pixels, around a current pixel of interest. The dependent maximum value for the current pixel of interest is the image value of the pixel in the window that has the highest luminance value. The dependent minimum value is the image value of the pixel in the window that has the lowest luminance value. The chroma channels of the MIN and MAX signals are typically not involved with the minimum or maximum operation, but rather represent the corresponding chroma values of the image pixel having the brightest or darkest luminance values within the given window region (hence the label "dependent"). In general, the dependent maximum and minimum signals MAX and MIN are 24-bit, three-component vector signals, corresponding to the three orthogonal axes of a suitable color space. It should be appreciated that any color space can be used, although some color spaces, such as for example, LAB, YCC, XYZ and the like, are more convenient, since the luminance can be found in these color spaces by examining only one of the three components.

The dynamic threshold module 2620 uses the image values of the identified pixels to apply adaptive thresholding to the gamut enhanced image data signal GME. In particular, the dynamic threshold module 2620 determines a dependent threshold and a dependent normalized value for the pixel of interest. The dependent threshold is determined, in various exemplary embodiments, as the average or mid-point of the MAX and MIN values for the current pixel of interest, while the dependent normalized value is, in various exemplary embodiments, determined as the difference between the MAX and MIN values for the current pixel of interest. It should be appreciated that the operation of the dynamic threshold unit 2620 is generally identical to that described and outlined above with respect to FIG. 3 and in the incorporated 249, 277, 157, 250, 246, 368, 248 and 063 applications and thus will not be described in further detail.

It should be appreciated that, in various exemplary embodiments, the dynamic threshold module 2620 and the quantized module 2640 can be combined into a single module that inputs the gamut enhanced signal GME and the dependent maximum and minimum signals MAX and MIN and outputs the tri-state edge continuity signal TEC.

In such exemplary embodiments, the absolute value of the dependent normalized signal is compared to a contrast threshold. In various exemplary embodiments, the contrast threshold is 1, although it could have any desired value. If the absolute value for the dependent normalized signal is less than the contrast threshold, the value for the tri-state edge continuity signal TEC for the current pixel of interest is set to 0. If the absolute value of the dependent normalized signal is greater than or equal to the contrast threshold, the value for the tri-state edge continuity signal TEC for the current pixel of interest is set to +1 or −1, depending on whether the value of the gamut enhanced image data signal GME for the current pixel of interest is greater than, or less than, the dynamic threshold value.

The quantize module 2640 converts the 8-bit raw grayscale selector signal Grr into the tri-state edge continuity signal TEC, which is output over the signal line 2641 to the blob identifying module 2700. The 2-bit tri-state edge continuity signal is also output over a signal line 2642 as a selector edge extract signal SEE to the edge enhance module 2650. The edge enhance module also inputs an enhance level signal ENL over a signal line 2631 and the gamut enhanced image data signal GME over the signal line 2510. Based on all of the signals input to the edge enhance module 2650, the edge enhance module 2650 outputs the color enhanced image data signal ENH over the signal line 2656 to both the blob identifying module 2700 and the map blobs and cluster module 2800, as shown in FIG. 5.

As outlined above, the incorporated 249 and 246 applications provide greater detail regarding the dependent min-max module 2610. Likewise, the incorporated 249, 277 and 368 applications provide greater detail regarding the dynamic threshold module 2620.

As outlined above, the quantize module 2640 inputs the 8-bit raw grayscale selector signal Grr over the signal line 2622 and converts that 8-bit signal into a two-bit, tri-state-valued signal TEC. Table 1 illustrates how the Grr value, which, in various exemplary embodiments, ranges from −128 to +127, is converted into the tri-state edge continuity signal TEC that is output over the signal line 2641 and the EEE signal that is output over the signal line 2642 to the edge enhance module 2650.

TABLE 1

Grr to TEC Quantization

| Grr value | Interpretation | TEC value | semantic interpretation |
|---|---|---|---|
| +127 | Strong positive edge | +1 | H |
| ... | Strong positive edge | +1 | |
| +2 | Strong positive edge | +1 | |
| +1 | Weak positive edge | 0 | 0 |
| 0 | No edge | 0 | |
| −1 | Weak negative edge | 0 | |
| −2 | Strong negative edge | −1 | L |
| ... | Strong negative edge | −1 | |
| −128 | Strong negative edge | −1 | |

In this particular exemplary embodiment, the tri-state edge continuity signal TEC is at the same resolution as the input image. If, however, higher text and line-art quality is sought, the tri-state edge continuity TEC can be generated at binary integer multiple of the scan resolution. The method and manner for increasing the TEC resolution is similar to that described above in connection with the packed selector signal SPK.

As shown in Table 1, the tri-state edge continuity signal TEC has three values, namely, −1, 0, and +1. In the case the tri-state edge continuity signal-TEC is at the scanner resolution, the selector edge extract signal EEE corresponds to the same values as TEC. The semantic interpretation of the TEC values uses L, 0, and H in place of the values −1, 0 and +1 of the tri-state edge continuity signal TEC. As shown in Table 1, the 0 values for the tri-state edge continuity signal TEC and the selector edge continuity signal EEE correspond to weak edges or no edge in the raw gray selector signal Grr, e.g., to the range of [−1 to +1] in the Grr signal values, inclusive. In contrast, strong positive edges with values greater than +1 for the raw gray selector signal Grr are converted to the +1 value (or 'H') for the tri-state edge continuity signal TEC and selector edge extract EEE. Finally, strong negative edges with values less than −1 for the raw gray selector signal Grr are mapped to the −1 value (or 'L') for the tri-state edge continuity signal TEC and selector edge extract EEE. The edge enhance module 2650, which is shown in greater detail in FIG. 7, uses the H, 0 and L values of the selector edge extract signal EEE to determine which of the various color signals. GME, MAX or MIN will be output as the enhanced image data signal ENH.

Figure 7:
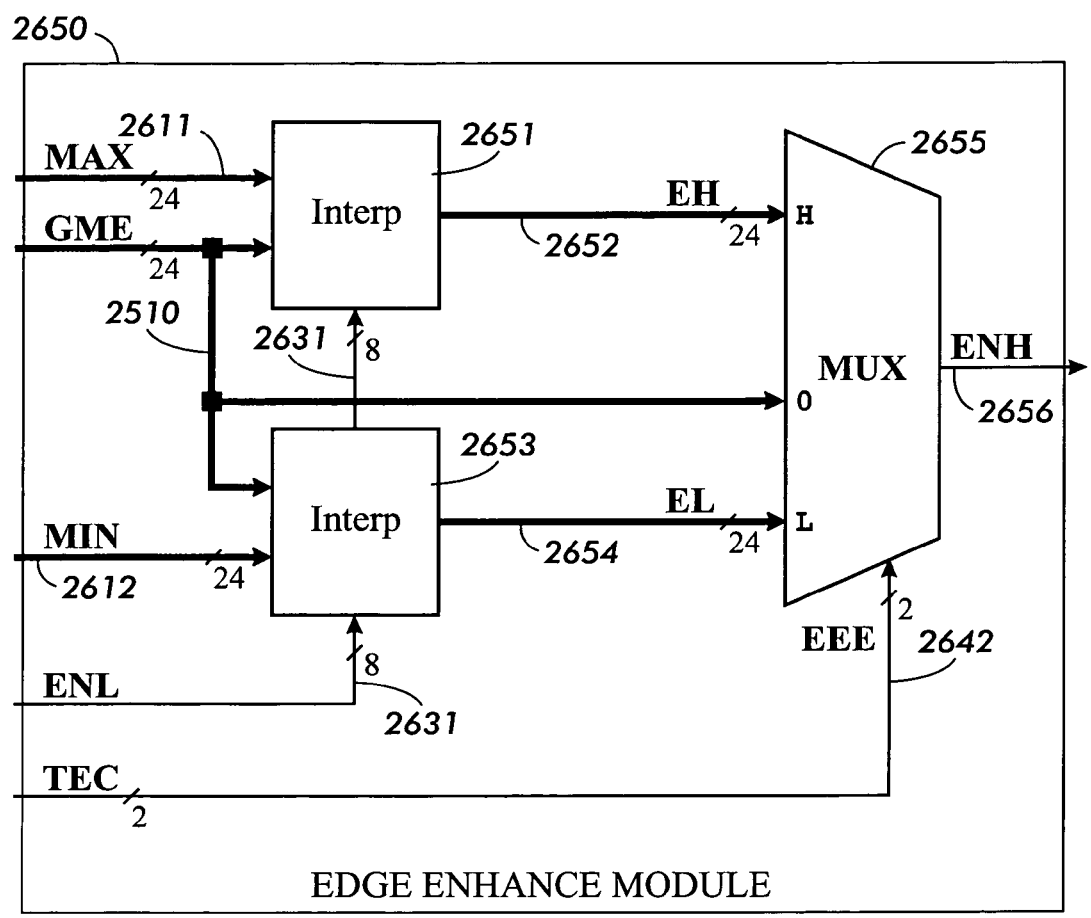
FIG. 7 illustrates one exemplary embodiment of an edge enhancement module of the segment module of FIG. 6.

FIG. 7 illustrates in greater detail one exemplary embodiment of the edge enhancement module 2650 shown in FIG. 6. As shown in FIG. 7 the edge enhanced module 2650 includes first and second interpolation modules 2651 and 2653 and a multiplexer 2655. The first interpolation module 2651 inputs the dependent maximum signal MAX over the signal line 2611 and the gamut enhanced image data signal GME over the signal line 2510 and the enhancement level signal ENL over the signal line 2631 from an enhancement level memory 2630. In contrast, the second interpolation module 2653 inputs the dependent minimum signal, MIN over the signal line 2612, as well as the gamut enhanced image data signal GME over the signal line 2510 and the enhancement level signal ENL over the signal line 2631. The first and second interpolation modules 2651 and 2653 act to create edge enhanced image data from the gamut enhanced image data signal GME by making, on a pixel-by-pixel basis, the gamut enhanced image data signal GME brighter or darker, respectively. In particular, the first interpolation module 2651 generates, on a pixel-by-pixel basis, a brighter gamut enhanced image data signal EH as:

$$EH=[GME+(MAX-GME)(ENL/256)]. \quad (1)$$

In contrast, the second interpolation module 2653 generates, on a pixel-by-pixel basis, a darker gamut enhanced image data signal EL as:

$$EL=[GME+(MIN-GME)(ENL/256)] \quad (2)$$

Each of the brighter and the darker image data signals EH and EL are output, along with the original gamut enhanced image data signal GME to the multiplexer 2655. The multiplexer 2655 also inputs the tri-state edge continuity signal TEC as selector edge extract signal EEE.

As shown in FIG. 7, the multiplexer 2655 uses the selector edge continuity signal EEE as a control signal to select, on a pixel-by-pixel basis, between the original gamut enhanced image data signal GME and the brighter or darker image data signals EH or EL, respectively. In particular, referring back to Table 1, H values for the selector edge extract signal EEE are used to select the EH signal, while L values for the selector edge extract signal EEE are used to select the EL signal. The zero value for the selector edge extract signal EEE are used to select the original gamut enhanced image data signal GME. The multiplexer 2655, based on the value of the EEE signal, outputs the selected one of the EH signal, the gamut enhanced image data signal GME or the EL signal as the enhanced image data signal ENH over the signal line 2656.

It should be appreciated that the enhanced image data signal ENH output on the signal line 2656 is made brighter relative to the original gamut enhanced image data signal when there is a strong positive edge, while it is made darker relative to the original gamut enhanced image data signal if there is a strong negative edge. Finally, there is no enhancement, by outputting the original gamut enhanced image data signal GME, if there is not a strong positive or a strong negative edge or if there is at most a weak edge.

Figure 8:
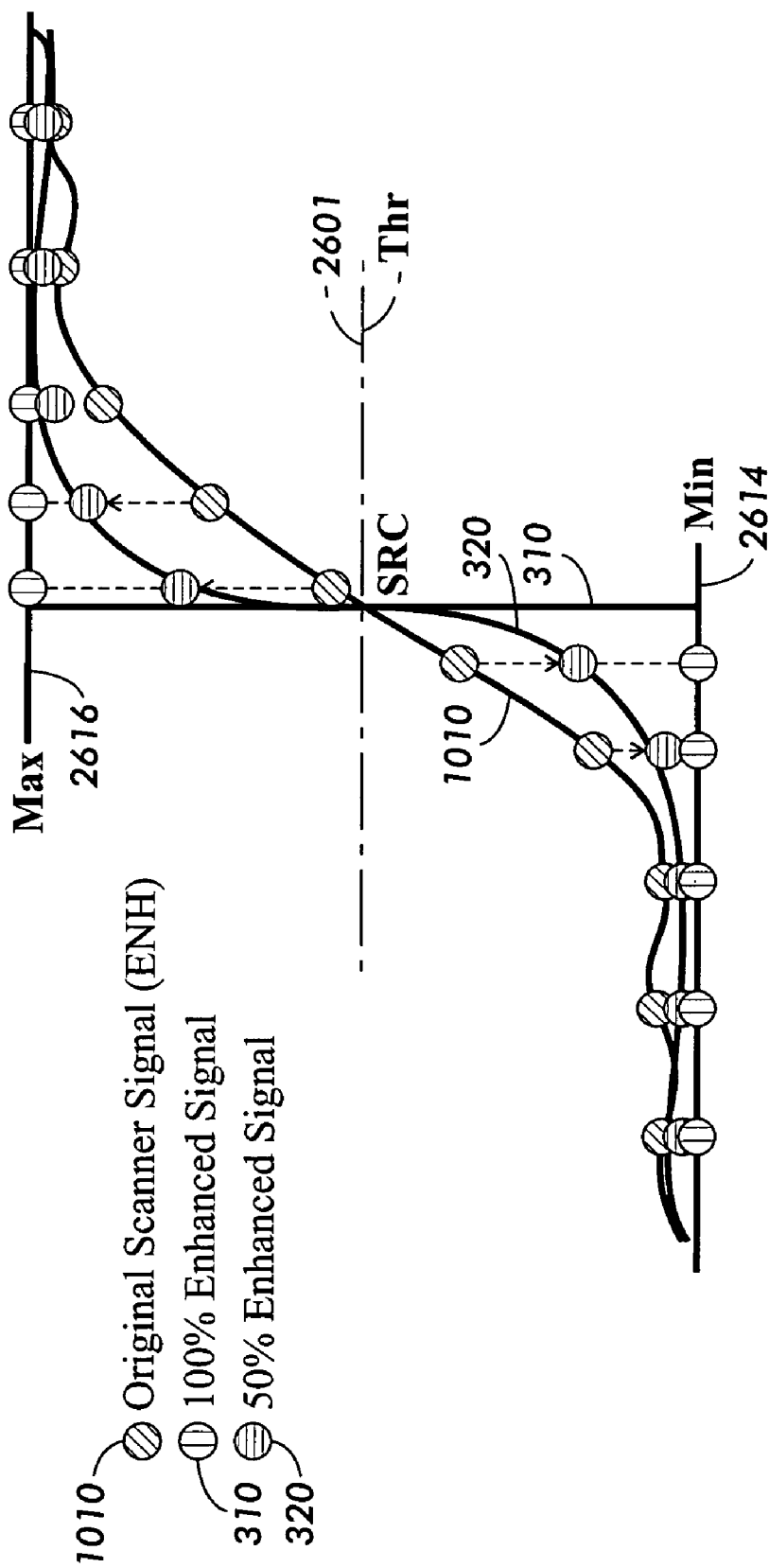
FIG. 8 is a graph illustrating an original scanner signal and various enhanced signals derived from the original scanner signal.

FIG. 8 shows the effect of the enhancement level signal ENL input on the signal line 2631 to the first and second interpolation modules 2651 and 2653. As shown in FIG. 8, for the original gamut enhanced image data signal GME, as represented by the diagonally cross hatched values in FIG. 8, when the enhancement level signal ENL has a value of 50%, or 128 for an 8-bit signal, values below the threshold value 2601 are moved toward the minimum value 2614 but at most part way, while values above the threshold 2601 are moved partially towards the maximum value 2616, resulting in the 50% enhanced signal 320. In contrast, for a 100% enhanced signal, which results in the fraction ENL/256 used in the two equations outlined above to have a value of 1, the values of the original gamut enhanced signal GME are driven fully to the minimum value 2614, while all the values above the threshold 2610 are driven fully toward the maximum value 2616. This occurs, because, in the two equations outlined above, when the fraction ENL/256 is 1, the values for the gamut enhanced image data signal GME in the two equations cancel out, leaving only the value for the dependent maximum signal MAX and the value for the dependent min signal MIN in the two equations.

Figure 9:
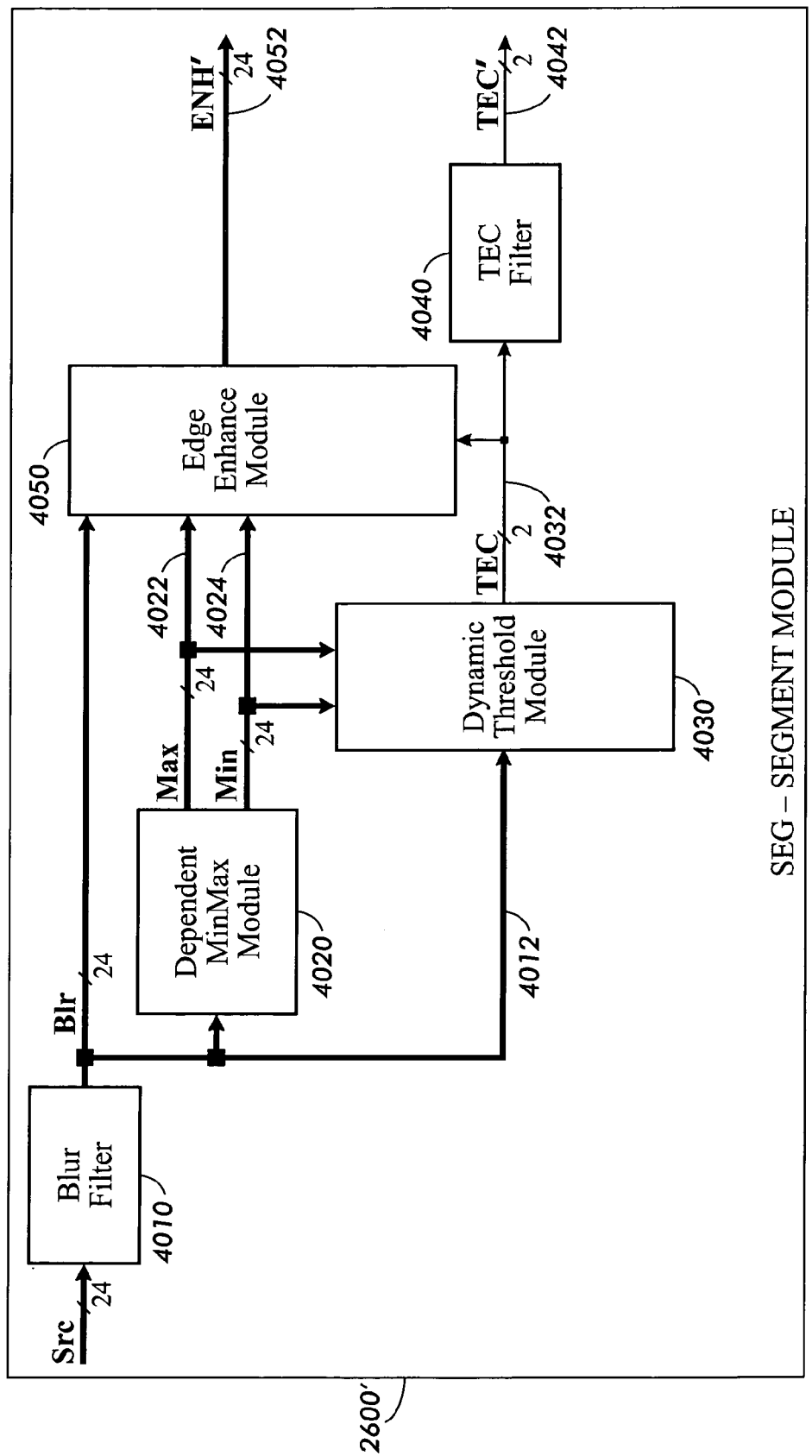
FIG. 9 illustrates another exemplary embodiment of a, segment module of the N-Layer image data generating system of FIG. 5.

FIG. 9 illustrates another exemplary embodiment of a segment module 2600' that may be implemented in the N-layer image data generating system 2000 shown in FIG. 5. As shown in FIG. 9, the segment module 2600' includes a blur filter 4010, a dependent min-max module 4020, a dynamic threshold module 4030, an a tri-state edge continuity filter 4040 and an edge enhance module 4050. The segment module 2600' does not receive the gamut enhanced image data signal GME nor the scaled screen magnitude signal SMS. Instead the segment module 2600' receives the input source signal Src which is converted to a blurred color signal Blr by the blur filter 4010. The blur filter 4010 may be optional and the segment module 2600' may receive a blurred color signal BLR from the de-screen module 1300 in the embodiment that does not implement the blur filter 4010.

The segment module 2600' receives as input a full color source signal Src and produces two separate outputs; the Enhance image signal ENH' and the tri-state edge continuity signal TEC'. The chroma components of the input source signal Src may be sub-sampled by a factor of 2 in the fast scan (x) direction. None of the color signals produced by the segment module 2600' will use chroma-x subsampling (XCSS). Thus, when the chroma values of the source signal Src is accessed, no adjustment filtering is necessary. That is, for a 4-sample XCSS quad, $L_0A_0L_1B_1$ pixel 0 is $L_0A_0B_1$ and pixel 1 is $L_1A_0B_1$.

The source signal Src is forwarded to the blur filter 4010. The blur filter 4010 includes a bank of filters that provide a set of blurred versions (signals) of the input source signal Src. Each filter size may correspond to one of the input resolutions of the source signal Src. Thus, for example, if the input resolutions of the source signals are 300, 400 and 600 dpi, then the filter sizes may be 2×2, 3×3 and 5×5, respectively. The luminance component of the source signal Src is usually filtered while the chroma components of the source signal Src are passed un-filtered through the blur filter 4010. However, chroma filtering may be applied for low-resolution input signal and noisy scanners.

Figure 10:
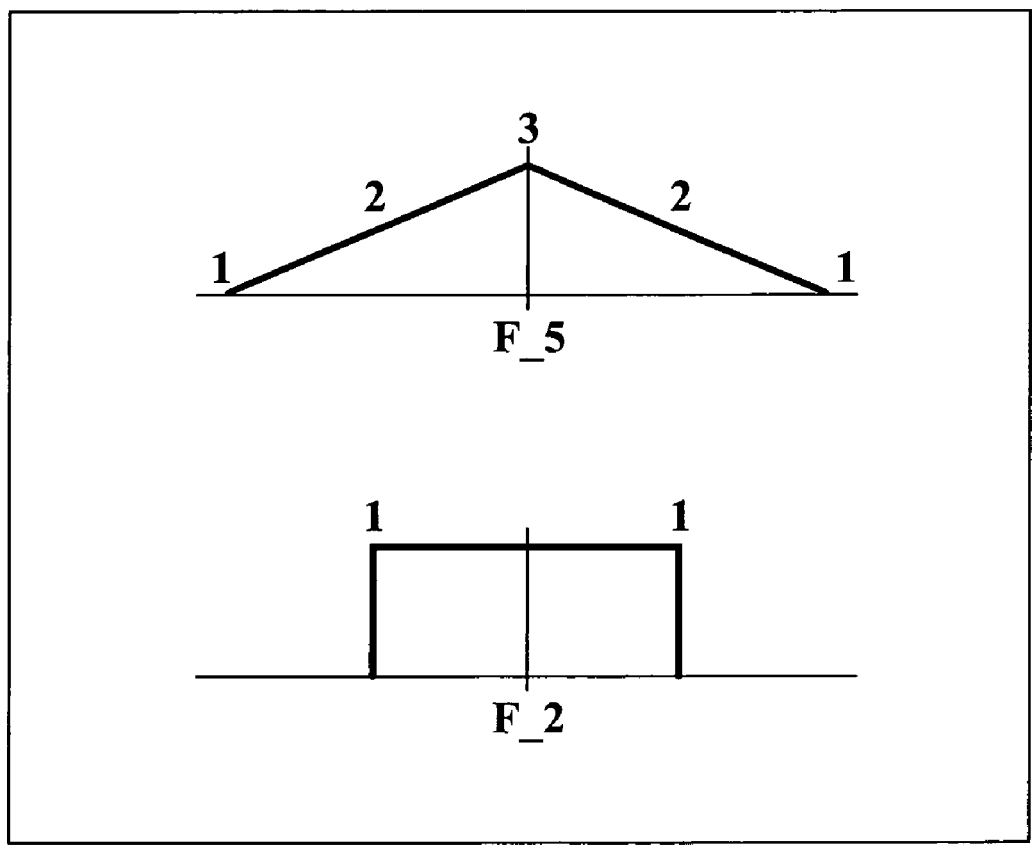
FIG. 10 illustrates a filter response of a F_2 filter and a F_5 filter.

Each filter may be an n×n 2-dimensional (2-D) finite impulse response (FIR) filter that is symmetric and separable in shape. For example, a 5×5 (F__5) filter response is shown in FIG. 10. If a filter has an odd sized window, such as 3×3 (F__3) or 5×5 (F__5) filter, the filter has a symmetric triangular shape with integer coefficients. However, if a filter has an even sized window, such as a 2×2 (F__2) filter, the filter uses equal value coefficients, which is equivalent to a 2×2, pixel averaging. An F__2 filter response is also shown in FIG. 10. Because the filters are separable, it is preferable to implement the filters in two orthogonal steps.

The blur filter 4010 outputs the blurred color signal Blr over a signal line 4012 which is received by the dependent min-max module 4020. Unlike the dependent thin-max module 2610 of FIG. 6, which measures a 7×7 window around a pixel of interest, the dependent Min-Max module 4020 measures a 2×2 window of pixels surrounding a pixel of interest. This is followed by measuring a 4×4 window of pixels surrounding the pixel of interest to determine the maximum luminance max L and the minimum luminance min L of the pixels of the combined windows. This operation may produce similar results as using a 7×7 window. The chroma values at the location of the maximum luminance max L and at the location of the minimum luminance min L may also be determined. The values associated with the location of the maximum luminance max L. Likewise, the dependent Min value is generated from the minimum luminance min L and the chroma values associated with the location of the minimum luminance min L. The min-max module 4020 then outputs the dependent Max and Min values over signal lines 4022 and 4024 respectively. The dependent Max value and the dependent Min value represent the extreme luminance values found within a window around a pixel of interest, and associated chroma values of those extreme luminance values.

An operation of the dependent min-max module 4020 is now described. The operation may proceed in two steps. In the first step, the dependent min-max module searches a 2×2 window surrounding a pixel of interest for a maximum luminance max L and a minimum luminance min L. Once the maximum luminance max L and the minimum luminance min L are found, the min-max module 4020 determines the chroma values (A, B) at the locations of the maximum luminance max L and the minimum luminance min L. The results of the first stage are then used to calculate the dependent Max and dependent Min values using a 4×4 window in the second step. Even though the blurred color signal Blr arrives at the dependent min-max module 4020 with x subsampled chroma components, this is the point at which the x chroma subsampling ceases. That is, the dependent Max and Min values do not have x subsampled chrominance. Although this method is not symmetric with respect to the center pixel, the method is less compute-extensive than using a 7×7 window.

The operation of the dependent min-max module 4020 may be separable. For example, the dependent Min/Max of individual columns may be computed first. Then, the final dependent Min value may be computed by finding the column Min pixel that has the minimum L. This means that incremental work is required as the window is moved stepwise across an image while computing one 8 high column and one 8 wide row to obtain the dependent Min and Max value outputs.

The dynamic threshold module 4030 receives the dependent Min and Max values from the dependent min-max module 4020 and the blurred color signal Blr from the blur filter 4010. The dynamic threshold module 4030 applies adaptive thresholding to the blurred color signal Blr, using the dependent Max and Min values, to generate a tri-state continuity signal TEC, which may be a 2-bit signal, over a signal line 4032.

Figure 11:
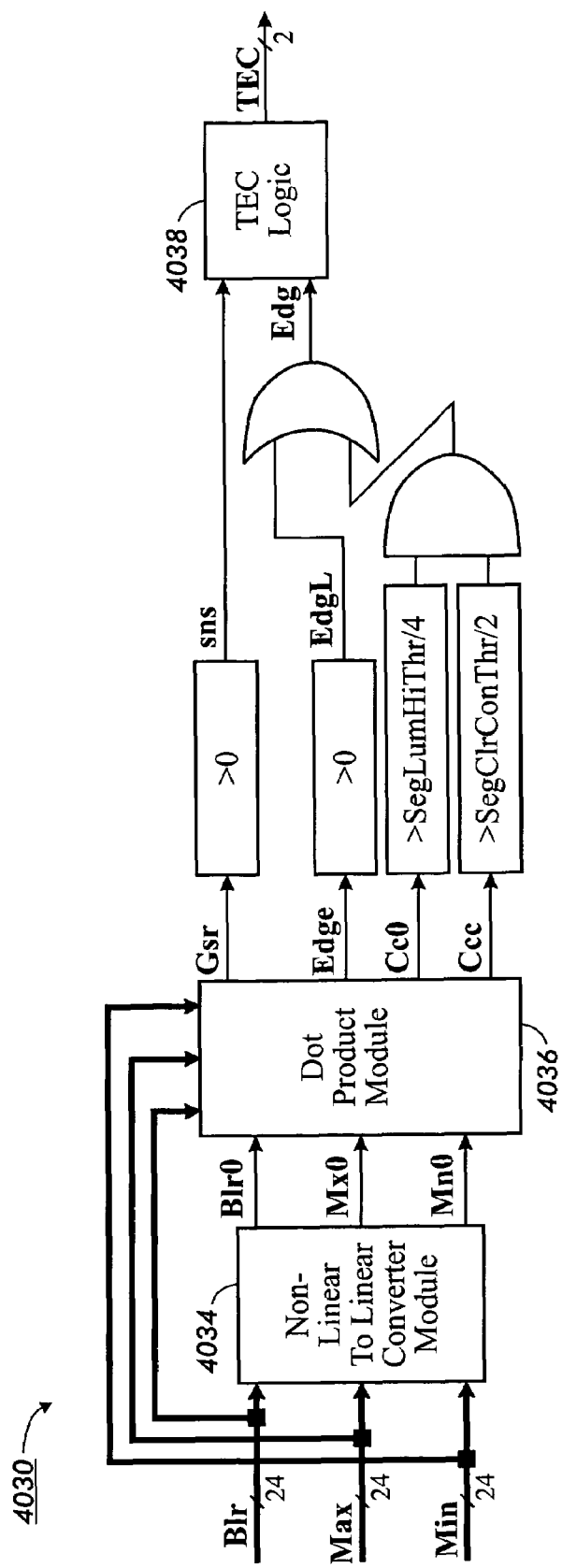
FIG. 11 illustrates one exemplary embodiment of a dynamic threshold module of the segment module of FIG. 9.
Figure 12:
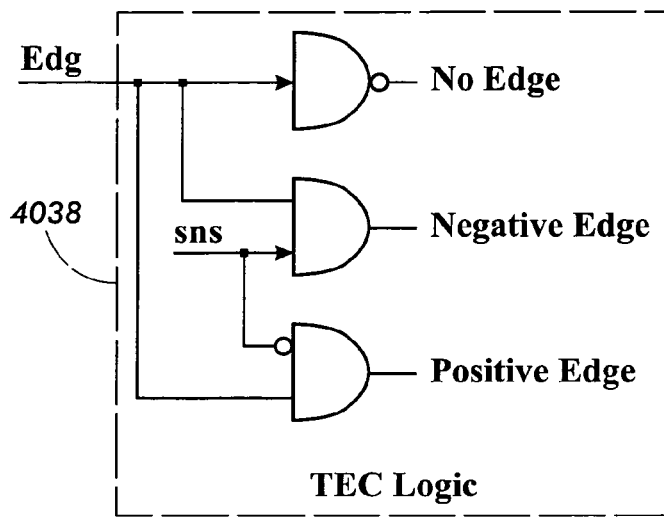
FIG. 12 illustrates one exemplary embodiment of a tri-state edge continuity (TEC) logic of the dynamic threshold module of FIG. 11.

The tri-state continuity signal TEC classifies each pixel as having a positive edge, no edge or a negative edge. A schematic diagram of an exemplary tri-state continuity signal TEC logic is shown in FIG. 12. Referring now to FIG. 11, the operation of the dynamic threshold module 4030 may be optimized if linear data is used. In the event, the input data is non-linear, such as for Lab or sYCC color data, the luminance values of the blurred color signal Blr0, the dependent Max value mx0 and the dependent Min value mn0 may be forwarded to a non-linear to linear converter module (i.e., linearizer) 4034. The non-linear to linear converter module 4034 may adjust the luminance values of the blurred color signal Blr0, the dependent Max value mx0 and the dependent Min value mn0 to be approximately linear. The adjusted luminance values of the blurred color signal Blr0, the dependent Max value mx0' and the dependent Min value mn0' as well as their associated chroma values are then forwarded to a dot product module 4036.

The dot product module 4036 receives the blurred color signal Blr, the dependent Max value and the dependent Min value. As described above, in certain instances, the luminance values of the blurred color signal Blr, the dependent Max value and the dependent Min value may be adjusted. Assuming that the dependent Max value and the dependent Min value are defined in Lab values, the dot product module 4036 performs the following dot product multiplication.

$$gsr = <X, Y> \qquad (3).$$

where <X, Y> is a dot product operation between the vectors X and Y.

Thus, $$\langle X, Y\rangle = (X_L, X_A, X_B)(Y_L, Y_A, Y_B)^t = X_L Y_L + X_A Y_A + X_B Y_B; \quad (4)$$

Where $$X = (\text{Max} + \text{Min})/2 - Blr = \begin{bmatrix} (L_{MAX} + L_{MIN})/2 - L \\ (A_{MAX} + A_{MIN})/2 - A \\ (B_{MAX} + B_{MIN})/2 - B \end{bmatrix} \quad (5)$$

$$Y = (\text{Max} - \text{Min})/2 = \begin{bmatrix} (L_{MAX} - L_{MIN})/2 \\ (A_{MAX} - A_{MIN})/2 \\ (B_{MAX} - B_{MIN})/2 \end{bmatrix} \quad (6)$$

The (L,A,B) values above are the components of the incoming blurred color signal Blr. The X vector in equation (5) is the Min and Max average minus the incoming blurred color signal Blr. The Y vector in equation (6) is the half the difference between the Min and Max values. By taking the dot product of these two vectors, the output is proportional to the relative distance from the plane, which is perpendicular to the X vector and crosses it halfway. Further details of the dot product may be found in U.S. patent application Ser. No. 10/188,277. The final output Gsr may be negative. A negative value for the output Gsr denotes a light edge pixel.

The dot product module 4036 may also output an edge signal Edge which becomes an edge signal EdgL. A positive value for the edge signal EdgL will enable the signal Edg, which denotes the location of an edge for the current pixel. The edge signal EdgL is obtained by:

$$EdgL = ((Mx0 - SegLumLoConThr)^* 1HiCmp) > (Mn0^* 1LoCmp) \quad (7)$$

Where
   Mx0 is the adjusted max luminance (if non-linear)
   Mn0 is the adjusted min luminance (if non-linear)
   1HiCmp=256−SegLumHiConThr
   1LoCmp=256−SegLumLoConThr
   SegLumHiConThr is a parameter of about 40
   SegLumLoConThr is a parameter of about 80.

The parameter values SegLumHiConThr and SegLumLoConThr are examples only and other parameter values may be used. Additionally, the above equation may be implemented as an edge detector in the dot product module 4036. A scalar measure for the overall chroma contrast magnitude $C_{CC}$ is also generated by adding together the absolute values of the two chroma-components of the vector X.

$$C_{CC} = |X_A| + |X_B| \quad (8)$$

The absolute value over the luminance component may be ignored since luminance L is confined to the positive range [0 . . . 255], and the max is always larger than the min.

Based on above, the dot product module 4036 generates 4 output signals. Gsr, EdgL, $C_{co}$ and $C_{cc}$. Luminance contrast $C_{co}$ is the luminance $L_{MAX}$−luminance $L_{MIN}$. The output signal EdgL denotes an existence of an edge when it is true. A positive value for the output signal Gsr denotes a darker Edge polarity which in turn enables the signal sns. In the case where there is not enough Luminance contrast as given by dependent Min and Max values, chrominance contrast will be used in conjunction with the luminance contrast to find the edges as described below.

As shown in FIG. 11, when the signal EdgL is enabled, signal Edg is also enabled. This means that the pixel at the current location lies on an edge (i.e., edge pixel). This edge could be either positive or negative based on the polarity of the signal sns.

If both $C_{CO}$>SegLumHiThr/4 and $C_{CC}$>SeqClrConThr/2 are true, where SegLumHiThr/4 and SeqClrConThr/2 are threshold values, the signal Edg is enabled regardless of the value of the signal EdgL. Both signals Edg and sns are forwarded to TEC logic 4038 that generates the tri-state edge continuity signal TEC per pixel based on the exemplary logic shown in FIG. 12.

The TEC filter module 4040 receives the tri-state edge continuity signal TEC from the dynamic threshold module 4030 over a signal line 4032. The TEC filter module 4040 outputs a filtered tri-state edge continuity signal TEC over a signal line 4042. As described above, the tri-state edge continuity signal classifies pixels as positive edge, negative edge and no edge. As will be described further below, the feature of the N-layer image data generating system 2000 is to find an enclosing edge boundary using the tri-state edge continuity signal TEC values. Stated differently, the tri-state edge continuity signal TEC values may be used to identify blobs and which may not require checking of all the interior pixels for color continuity. However, scanners usually introduce noise into the scanned images. Thus, the tri-state edge continuity signal TEC driven image may contain random "salt and pepper" noise that may prevent the blob identifying module 2700 from identifying a blob as a continuous enclosing edge boundary. Therefore, the N-layer image data generating system may not segment the blobs accurately. Accordingly, the TEC filter module 4040 may compensate for the "salt and pepper" noise.

Figure 13:
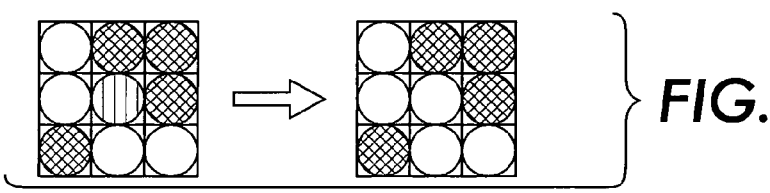
FIG. 13-15 illustrate a filter response of one exemplary embodiment of a TEC filter module of the segment module of FIG. 9.
Figure 14:
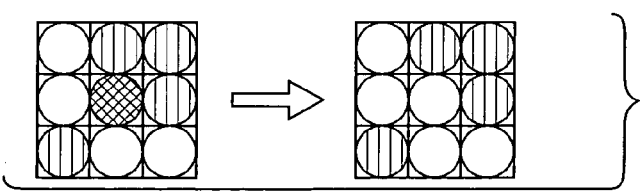
Figure 15:
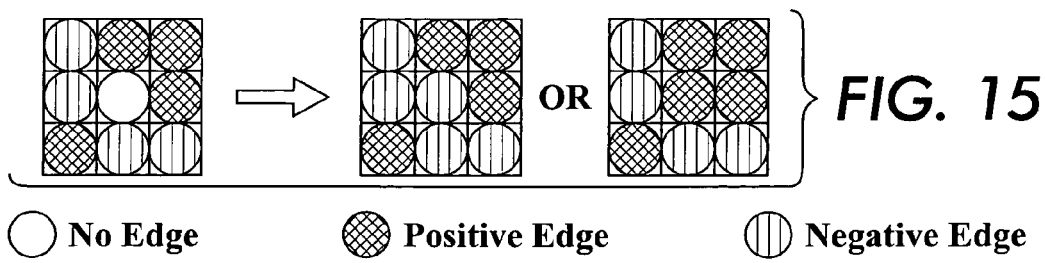

As shown in FIGS. 13-15, the TEC filter module 4040 searches through, for example, a 3×3 window centered around a pixel of interest. The TEC filter 4040 may modify an isolated pixel value at the window center as shown in FIGS. 13-15. The TEC filter 4040 may modify the value of the center of the pixel using a classifier/de-classifier that follows, for example, the rules below.

Referring now to FIG. 13, if the center is classified as a negative edge pixel and at least one surrounding pixel does not have the same classification, and the surrounding pixels are classified as either positive or no edge pixels, then the center pixel may be reclassified as no edge pixel.

Referring now to FIG. 14, if the center pixel is classified as a positive edge pixel and at least one surrounding pixel does not have the same classification, and the surrounding are classified as either no edge or negative edge pixels, then the center pixel may be reclassified as no edge pixel.

Referring now to FIG. 15, if the center pixel is classified as a no edge pixel, and at least one surrounding pixel does not have the same classification, and the surrounding pixels are classified as positive edge or negative edge pixels, then the center pixel may be classified as either negative or positive edge pixel. The modified tri-state edge continuity TEC' values are outputted from the segment module 2600' over a signal line 4042.

The edge enhance module 4050 receives the blurred color signal Blr from the blurred filter 4010 and the dependent Max and Min values from the dependent min-max module 4020. The edge enhance module 4050 also receives the tri-state edge continuity signal TEC from the dynamic threshold module 4030. The edge enhance module 4050 is responsible for enhancing the blurred color signal Blr. Specifically, the edge enhance module 4050 enhances the blurred color signal Blr, on a pixel-by-pixel basis, by making the blurred color signal Blr lighter, darker or no change based on the dependent Max and Min values and the tri-state edge continuity TEC values.

Figure 16:
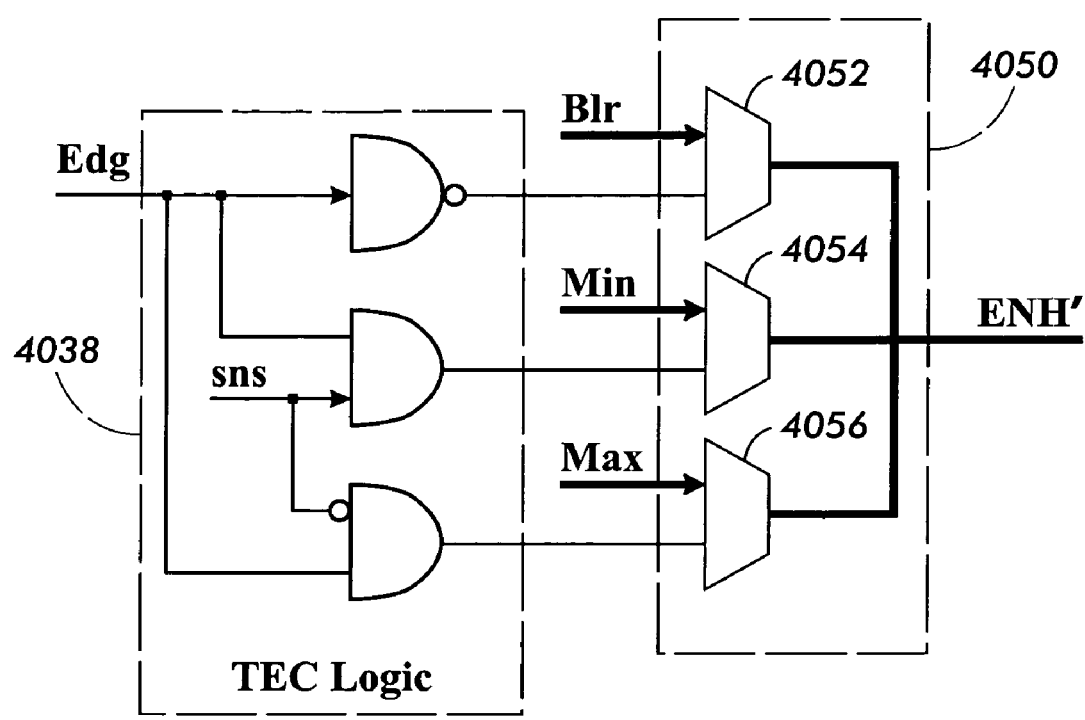
FIG. 16 illustrates one exemplary embodiment of an edge enhance module of the segment module of FIG. 9.

FIG. 16 illustrates a more detailed exemplary edge enhance module 4050. The received tri-state edge continuity signal TEC is shown in terms of the TEC logic 4038 to aid in the operation of the edge enhance module 4050. As shown in FIG. 16, the edge enhance module 4050 includes three multiplexers 4052, 4054 and 4056. The multiplexer 4052 receives as input the blurred color signal Blr. The multiplexer 4054 receives as input the dependent Min value. The multiplexer 4056 receives as input the dependent Max value. All three multiplexers 4052, 4054 and 4056 receive as a control signal the tri-state edge continuity signal TEC. The operation of the edge enhance module 4050 is as follows. When the tri-state edge continuity signal TEC does not include the signal Edg, the multiplexer 4052 is enabled to allow the blurred color signal Blr to pass through the multiplexer 4052. Meanwhile, the multiplexers 4054 and 4056 are disabled preventing the dependent Min and Max values to passthrough the multiplexers 4054 and 4056, respectively. Therefore, the edge enhance module 4050 outputs the blurred color signal Blr as the enhanced image data signal ENH'.

When the tri-state edge continuity signal includes the edge signal Edg, the signal sns determines which of the multiplexers 4054 and 4056 will be enabled. Meanwhile, the multiplexer 4052 is disabled preventing the blurred color signal Blr from passing through the multiplexer 4052. If the signal sns is logic high, the multiplexer 4054 is enabled passing the dependent Min value through the multiplexer 4054; while the multiplexer 4056 is disabled. Thus, the dependent Min value is outputted as the enhanced image data signal ENH'. Conversely, if the signal sns is logic low, the multiplexer 4056 is enabled passing the dependent Max value through the multiplexer 4056, while the multiplexer 4054 is disabled. Thus, the dependent Max value is outputted as the enhanced image data signal ENH'.

Referring now to FIG. 5, the blob identifying module 2700 inputs the color enhanced image data signal ENH over the signal line 2656 and the 2-bit tri-state edge continuity signal TEC over the signal line 2641. The blob identifying module 2700 segments the input enhanced image data into blobs, each of which may be suitable for representation on a separate one of the multiple binary foreground planes. The blob identifying module 2100 operates by assigning, on a pixel-by-pixel basis, each pixel of the image, in turn, to a previously identified blob, to a new blob, or to the background grayscale image plane. The blob identifying module separates the image into blobs such that each blob has a continuous strong edge and is either completely inside or completely outside of every other blob. In various exemplary embodiments, the blob identifying module 2700 operates by examining, for a current pixel of interest and a number of surrounding pixels, the values of the tri-state edge continuity signal TEC for these pixels. In various exemplary embodiments, the blob identifying module 2700 applies a few simple rules to identify independent regions, such as blobs, which are guaranteed to not be partially overlapped, thus simplifying the task of assigning different areas, such as blobs, of the image to different multiple binary foreground planes and determining the proper fill of the background layer.

The blob identifying module 2700, based on the value of the tri-state edge continuity signal TEC for the current pixel of interest and for a number of adjacent pixels, labels the pixel of interest with a blob ID that will be used in subsequent processing.

In various exemplary embodiments, the blob identifying module 2700 begins with the upper left hand corner pixel of the image and moves along each horizontal row of pixels of the image from left to right until the end of that row is reached. Then, the blob identifying module 2700 selects the next row and begins with the left-most pixel of that row. As each pixel is selected in turn, the blob identifying module 2700 inputs the tri-state edge continuity signal TEC for that pixel, as well as the values for the tri-state edge continuity signal TEC for one or more neighboring pixels.

In various exemplary embodiments, the blob identifying module 2700 uses the values of the tri-state edge continuity signal TEC for the pixel of interest, the pixel immediately above the pixel of interest, and the pixel immediately to the left of the pixel of interest. For higher quality additional neighboring TEC pixels may be used, such as the pixel diagonally to the top-left, or 2-pixels away to the left or from above. It should be appreciated that the particular number of TEC pixels is intended to be neither exhaustive nor limiting. For the top-most row of pixels, and for the column of left-most pixels, if the top or left adjacent pixel is not available because it does not exist, that top or left adjacent pixel is assumed to have the same edge continuity value as the current pixel of interest. Based on the three or more values for the tri-state edge continuity signal TEC for the pixels in the immediate neighborhood of the current pixel as described above, the blob identifying module 2700 identifies the blob number for the current pixel of interest as set forth in Table 2.

TABLE 2

| TEC Value | | | |
|---|---|---|---|
| Left Pixel | Top Pixel | Current Pixel | Action |
| −1 | −1 | −1 | Merge Pixel IDs |
| −1 | −1 | +1 | New ID |
| −1 | +1 | −1 | Inherit ID from Left pixel |
| −1 | +1 | +1 | Inherit ID from Top Pixel |
| +1 | −1 | −1 | Inherit ID from Top Pixel |
| +1 | −1 | +1 | Inherit ID from Left Pixel |
| +1 | +1 | −1 | New ID |
| +1 | +1 | +1 | Merge Pixel IDs |
| 0 | −1 | +1 | Merge into Background |
| −1 | 0 | +1 | Merge into Background |
| −1 | +1 | 0 | Merge into Background |
| 0 | +1 | −1 | Merge into Background |
| +1 | 0 | −1 | Merge into Background |
| +1 | −1 | 0 | Merge into Background |
| 0 | −1 | −1 | Determine if color of current Pixel is similar to colors of both top and left Pixels. If so, Merge Pixel IDs. Otherwise, Merge into Background. |
| −1 | 0 | −1 | |
| −1 | −1 | 0 | |
| 0 | +1 | +1 | |
| +1 | 0 | +1 | |
| +1 | +1 | 0 | |
| 0 | 0 | −1 | |
| 0 | 0 | +1 | |
| 0 | −1 | 0 | |
| 0 | +1 | 0 | |
| −1 | 0 | 0 | |
| +1 | 0 | 0 | |
| 0 | 0 | 0 | |

As shown in Table 2, the blob identifying module 2700, in this exemplary embodiment, performs one of several possible actions on the current pixel of interest, as well as to the blobs to which the top-adjacent and the left-adjacent pixels belong, based on the values for the tri-state edge continuity signal TEC for these three pixels. Table 2 illustrates one particular method to expedite the blob identification process. The method is based on a pattern matching technique. The three or more edge continuity TEC pixels are combined together to form an address into the table. The address is then used to lookup the specific action from the table. Each table address corresponds to a different TEC pattern combination. In particular, when the three pixels have the same non-zero value for the tri-state edge continuity signal TEC, the current pixel, the blob containing the top-adjacent pixel and the blob containing the left-adjacent pixel are all merged into a single blob having a single blob ID. In various exemplary embodiments, the blob ID that would be assigned to this merged blob will be the lowest blob ID of the top-adjacent and left-adjacent pixels. In various other exemplary embodiments, the blob ID assigned to this merged blob will be either always the blob ID associated with the top-adjacent pixel or the blob ID associated with the left-adjacent pixel. However, any consistent method of assigning a particular blob ID to the merged blob will be appropriate.

When values for the tri-state edge continuity signal TEC for the three pixels are all non-zero, but the value for the current pixel differs from the values of both the top-adjacent and left-adjacent pixels, the current pixel is assigned a new blob ID and thus begins a new blob. When the values for the tri-state edge continuity signal TEC for the three pixels are all non-zero, but the current pixel agrees with one of the left-adjacent or top-adjacent pixels, and disagrees with the other of the left-adjacent and top-adjacent pixels, the current pixel inherits its blob ID from the top-adjacent or the left-adjacent pixel, depending on which one has the same tri-state edge continuity value as the current pixel.

When the three pixels each contain a different value for the tri-state edge continuity signal TEC, e.g., one of the pixels has a +1 value, one of the pixels has a −1 value, and one of the pixels has a 0 value, there is a significant continuity break between these three pixels. As a result, the current pixel is merged into the background grayscale plane. Similarly, all pixels having the same blob ID as the left-adjacent pixel and all pixels having the same blob ID as the top-adjacent pixel are also merged into the background grayscale plane. It should be appreciated that, for any of the above-identified actions, when blobs are either merged together or are merged into the background plane, the blob IDs for any non-surviving blobs are released and thus can be reused for later blobs.

For any situations where the value for the tri-state edge continuity signal TEC is 0 for all of the pixels, or is 0 for one of the pixels while the value of the tri-state edge continuity signal TEC for the other two pixels is the same, a determination is made whether the 24-bit, three-component color of each of the top-adjacent and left-adjacent pixels is sufficiently similar to the 24-bit, three-component color of the current pixel. In various exemplary embodiments, the colors of the current pixel and one of the top-adjacent or left-adjacent pixels are determined to be sufficiently similar if the sum of the absolute differences of each of the three color components of the two pixel values is smaller than a fixed threshold, or any other comparable method.

In various other exemplary embodiments, rather than using the 24-bit color value for each of the three pixels, the 24-bit MAX or 24-bit MIN values determined for each of the three pixels by the segment module 2600 is used in this comparison. In this case, if the value for the tri-state edge continuity signal TEC is +1 for a particular pixel, the MAX value is used for that pixel. In contrast, if the value for the tri-state edge continuity signal TEC is −1, the MIN value is used for that pixel. If the colors of both the top-adjacent and left-adjacent pixels are determined to be sufficiently similar to the color of the current pixel, the merge operation, as outlined above, is used to merge the current pixel, the blob containing the top-adjacent pixel and the blob containing the left-adjacent pixel into a single blob. Otherwise, as outlined above with respect to the situations where three different values occur over the three pixels, the current pixel, as well as the pixels of the blob containing the top-adjacent pixel and the pixels of the blob containing the left-adjacent pixel are all merged into the background plane.

In various exemplary embodiments, the blob identification module 2700 keeps track of the blobs by creating and maintaining the global table of blobs, which contains attributes for each blob. The table contains various relevant blob information elements, such as the blob ID, its bounding box, defined by its top, left, bottom, and right side coordinates, a representative color value for the pixels comprising the blob, a count of how many foreground pixels are included in the blob and/or a shape of the blob. It should be appreciated that, in various exemplary embodiments, the color for the pixels of the blob can be defined as a running average. In various other exemplary embodiments, rather than a running average, a running sum is kept. That is, while the blob has not yet been completed, a running sum rather than a running average is maintained. This avoids constantly having to redetermine the running average. In various exemplary embodiments, after the blob is completed, such that no additional pixels will be added to the blob at some later time, the running sum can be divided by the number of foreground pixels to determine the average color value.

It should also be appreciated that, in various exemplary embodiments, the blob identification module 2700 can create more than one table of blobs. For example, in various exemplary embodiments, the blob identification module 2700 creates a working table of pixel blobs. For each blob, the table contains the blob attributes, where each blob is a separate entry. This working table also maintains the blob shape in an 8-bit image signal BID that is generated during the blob identification process.

The blob identification module 2700 maintains the global table of blobs to contain the blobs that are no longer active, such as the blobs that are Completed. During processing, newly identified blobs that have met all the required conditions are copied from the temporary working table to the global table of blobs.

The shape of the blob is maintained as a function of the blob ID. That is, each pixel is given a different blob ID corresponding to the blob to which it belongs. Mapping these blob IDs onto an image plane defines the shape of the blob. It should further be appreciated that pixels that are to be assigned to the grayscale background plane are assigned a special blob identification, such as a 0 value identifying those pixels as part of the "background" blob.

Each time a new blob is identified, because that blob is either not connected to, or has a different color than, the previously defined neighboring blobs, it is assigned a new blob ID in the working table. The corresponding table entry is then initialized with the information collected from the blob pixels. As the blob identification module 2700 continues to operate, new foreground pixels are added to the previously opened blobs if the foreground pixels closely match the blob properties of the adjacent pixels. The two main criteria for inclusion of pixels into existing blobs, as outlined above, are based on edge continuity and color similarity. As new pixels are added to existing blobs, the content of the blob table for those existing blobs is updated to reflect the new bounding box size, the updated running average or running sum of the blob color, the increased blob foreground pixel count and the like.

As indicated above, if, as the blob identification module 2700 operates, two or more previously separated blobs become connected, as would be the case for a "y" character, and all of these blobs agree in color, then those blobs are merged to become a single larger blob. In particular, this larger blob is the union of the previous connecting blobs. To merge the blobs, the blob identification module 2700 picks one blob ID, such as the smaller on, and updates its table entry to include all of the pixels from the merged blobs, including the new bounding box size, running average or running sum color, foreground count and the like. In addition, the blob identification module updates the shape of the blob image to assign the single selected blob ID to all pixels in the merged group. Once completed, the blob identification module 2700 removes the second and connecting blob IDs with their associated table entries from the working table of blobs., Any blob ID that is freed in this manner can be recirculated and is now available for future assignment to a newly open blob should one be encountered.

It should be appreciated that the blob identification module 2700 closes an open blob when the end of a blob is reached, e.g., when no additional connected new pixels of similar color are found below the last blob scan line and the overall edge continuity and color meet all of the required conditions. In that case, the blob attributes, such as, for example, the bounding box, the running average or running sum of the blob color, the count of foreground pixels, the blob shape, and the like are updated for the last time, to reflect the final values for the entire blob. The blob is then removed from the active list and copied onto a final blob list, such as the global table of blobs.

It should be further appreciated that the blob identification process, in one particular embodiment, can be simplified to operate in two passes for the purpose of reducing the total amount of computations and greatly reduce the amount of storage memory needed. In the first pass, the blob ID process proceeds from the top most line to bottom line as previously described, and in the process assigns blob IDs for each scanline independently, just based on the current and previous scanline information. In the second pass, the process reverses direction from the bottom to top line, and the process resolves the blob ID numbers to be uniquely and consistently defined across the entire page. The above method is particularly powerful as it requires just one line of context at any given time, and maintenance of just a small working table instead of the entire blob table for the whole page, which may contain many more blobs.

It should be appreciated that, in various exemplary embodiments, the temporary working table or active list of open blobs is restricted to some defined number, such as 256, open blobs at any given time, which will usually include the "background" blob. While any particular number can be selected as the maximum number of allowable blobs, it is conceivable that, regardless of the size of the defined number, a particularly busy page will approach that number. If the number of active blobs within a window approaches this defined maximum number, the blob identification module 2700 is designed to automatically reduce the number of blobs to make room for new ones. It should be appreciated that any desired technique for pruning the number of active blobs can be used to reduce the number of blobs in the active blob table.

Figure 17:
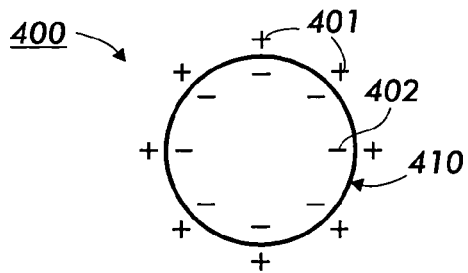
FIGS. 17-20 illustrate various valid and invalid blobs.

FIGS. 17-20 illustrate four different potential types of blobs that may be encountered by the blob identify module 2700. FIG. 17 illustrates a valid single blob 400. As shown in FIG. 17, the blob 400 is defined by a strong edge 410 that defines a closed curve and is bounded on one side of the closed curve by. +1 values for the tri-state edge continuity signal TEC and on the other side by −1 values for the tri-state edge continuity signal TEC. The closed curve 410 thus separates the pixels 402 that are in the interior of the blob 410 from pixels 401 that are outside of the blob 400.

It should be appreciated that, as shown in FIG. 17, a blob is thus any group of pixels that is defined by a closed curve and that is bounded by a strong edge on all sides. That is, the closed curve or strong edge is defined by a set of connected pixels that have the same value of the tri-state edge continuity signal TEC on one side of the edge and a different but same value of the tri-state edge continuity signal TEC for the pixels on the other side of the edge. Accordingly, the values for the tri-state edge continuity signal TEC for the pixels on each side of the edge 410 must not stop or change sign.

Figure 18:
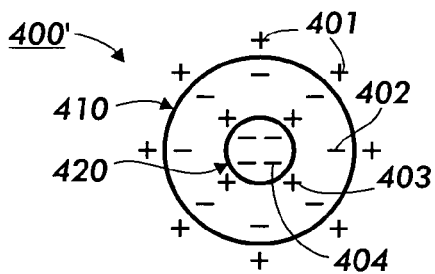

FIG. 18 illustrates a blob pair 400', where a first blob contains a second blob. As shown in FIG. 18, the closed curve or edge 410 defining the first blob is defined by +1 values for the tri-state edge continuity signal for the exterior pixels 401, while the interior pixels 402 have a value of −1 for the tri-state edge continuity signal TEC. In contrast, for the second closed curve 420 that defines the second blob, the pixels on the exterior of that closed curve 420, which are also the interior pixels 402, have values of +1 for the tri-state edge continuity signal TEC, while the pixels 404 on the interior of the closed curve 420 have values of −1 for the tri-state edge continuity signal. FIG. 18 thus illustrates that it is not necessary that all of the pixels on the interior of a single blob have the same value for the tri-state edge continuity signal TEC.

Figure 19:
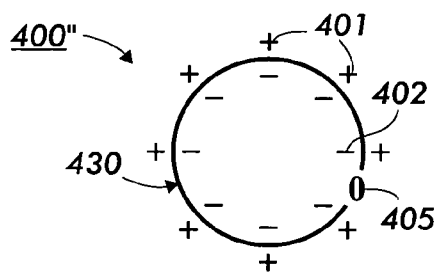

FIG. 19 illustrates a potential blob 400" that has an edge or curve 430 that is not closed. That is, as shown in FIG. 19, while most of the pixels 401 on the exterior of the curve 430 have +1 values for the tri-state edge continuity signal TEC, at least one pixel 401 has a value of 0 for the tri-state edge continuity signal TEC. Similarly, while most of the interior pixels 402 have values of −1 for the tri-state edge continuity signal TEC, at least one pixel 402 in the interior has a value of 0 for the tri-state edge continuity signal TEC. Accordingly, because the edge 430 of the potential blob 400" stops, such that the blob 400" is not bounded by strong edge on all sides, the potential blob 400" is not considered to be a valid blob and therefore is merged into the background plane. In various exemplary embodiments, this is done by marking all of the pixels identified with this blob with the background blob ID, which may conveniently chosen to be 0, e.g., a minimum possible value or a maximum possible value.

Figure 20:
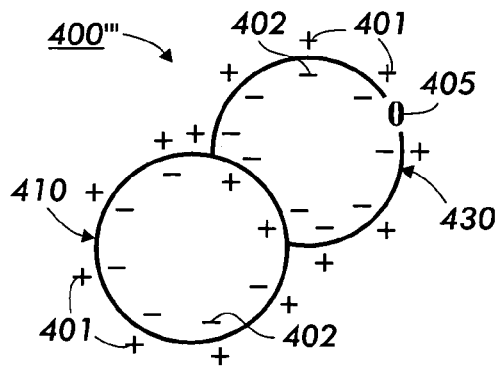

FIG. 20 shows a pair of potential blobs 400'''. As shown in FIG. 20, a first one of the blobs 400''' is bounded by a closed curve or strong edge 410, while the other one of the blobs 400''' has a broken edge or open curve 430. Thus, it is clear that the second blob of the pair of blobs 400''' is not a valid blob. However, even though the first one of the pair of blobs 400''' shown in FIG. 20 has a closed curve, i.e., is bounded by a strong edge 410 on all sides, the values of the tri-state edge continuity signal TEC for the pixels 402 on the interior side of the edge 410 change sign. In particular, as shown in FIG. 20, for the interior pixels 406, the pixels on the other side of the edge 410, i.e., the pixels 402 that are in the interior of the open curve 430 that are adjacent to the pixels 406, are darker in color than the color of the pixels 406. Accordingly, the tri-state edge continuity signal values for these pixels 406 is +1. In contrast, the rest of the pixels 402 on the interior of the closed curve 410 have colors that are darker than the adjacent pixels on the exterior of this blob. Thus, these pixels 402 have values for the tri-state edge continuity signal TEC of −1 rather than +1. Because the value of the tri-state edge continuity signal TEC for these interior pixels 402 and 406 changes, the first one of the pair of blobs 400''', while bounded by the closed curve 410, is also not a valid blob and therefore is merged into the background plane.

Figure 21:
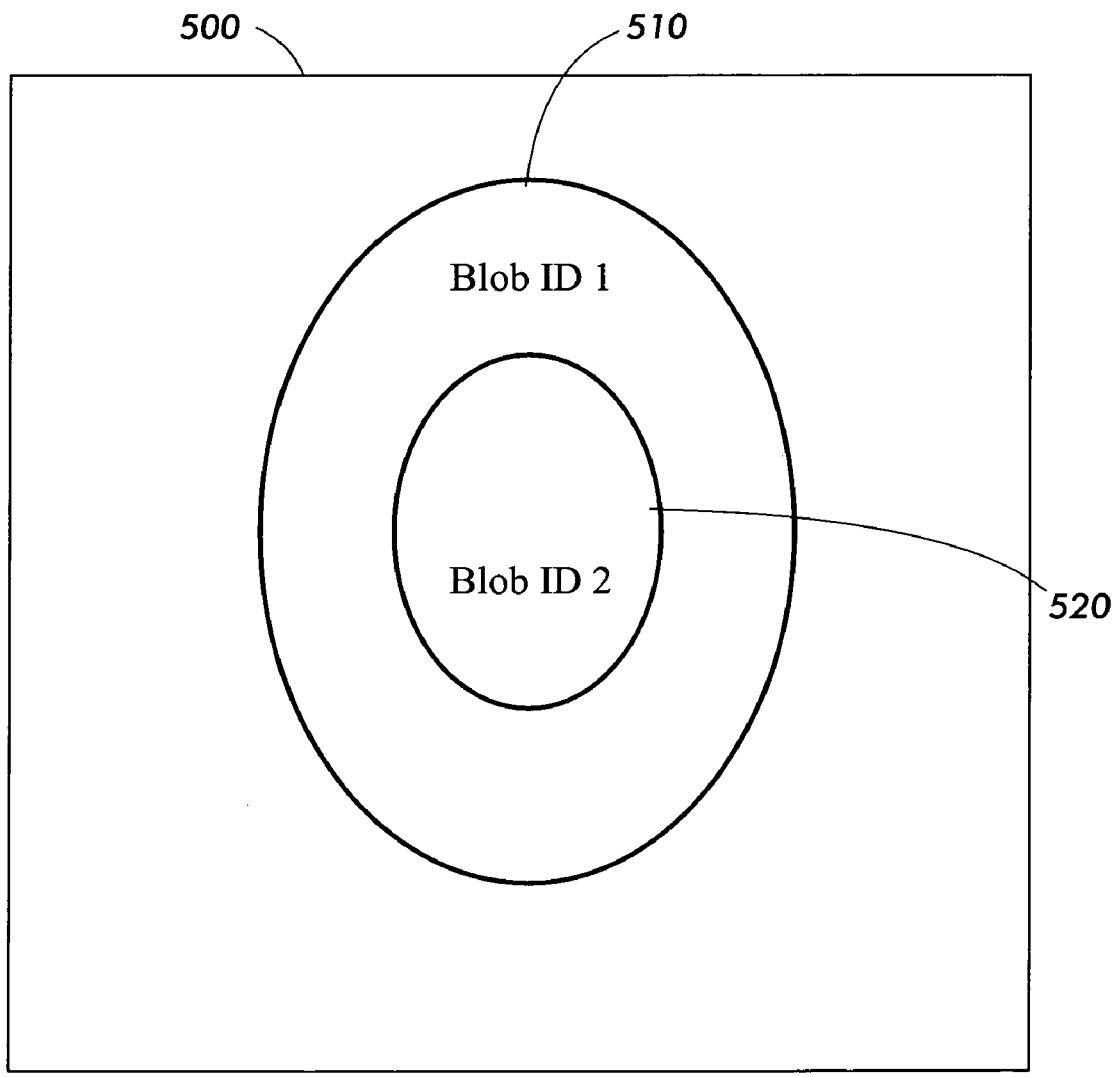
FIG. 21 illustrates how one valid blob can be inside another valid blob.

FIG. 21 illustrates how the blob IDs are assigned for pixels within different blobs when one blob is fully contained within another blob. As shown in FIG. 21, all the pixels of the interior blob 520 get a blob ID of 2. This is intuitive, as all the pixels of this interior blob 520 are contiguous and thus form a simple closed curve. In contrast, the blob 510 is annular-shaped and thus has pixels that are separated from other pixels of this same blob 510 by pixels of the blob 520. It should be appreciated that the above-outlined process for assigning blob IDs, as outlined in Table 2, easily deals with this situation so that complexly-shaped blobs, such as blobs forming the letters "Y" or "R", or the like, will not be divided unnecessarily into multiple blobs.

Once the blob identifying module 2700 has grouped regions of pixels of the image into different blobs by assigning them different blob IDs, the blob identifying module 2700 outputs the blob ID signal BID and the global table of blobs signal GTB to the map blobs and cluster module 2800. The map blobs and cluster module 2800 refines the blob identification to single out and remove bad blobs from the global table of blobs GTB and merge their pixels into the background plane.

Figure 22:
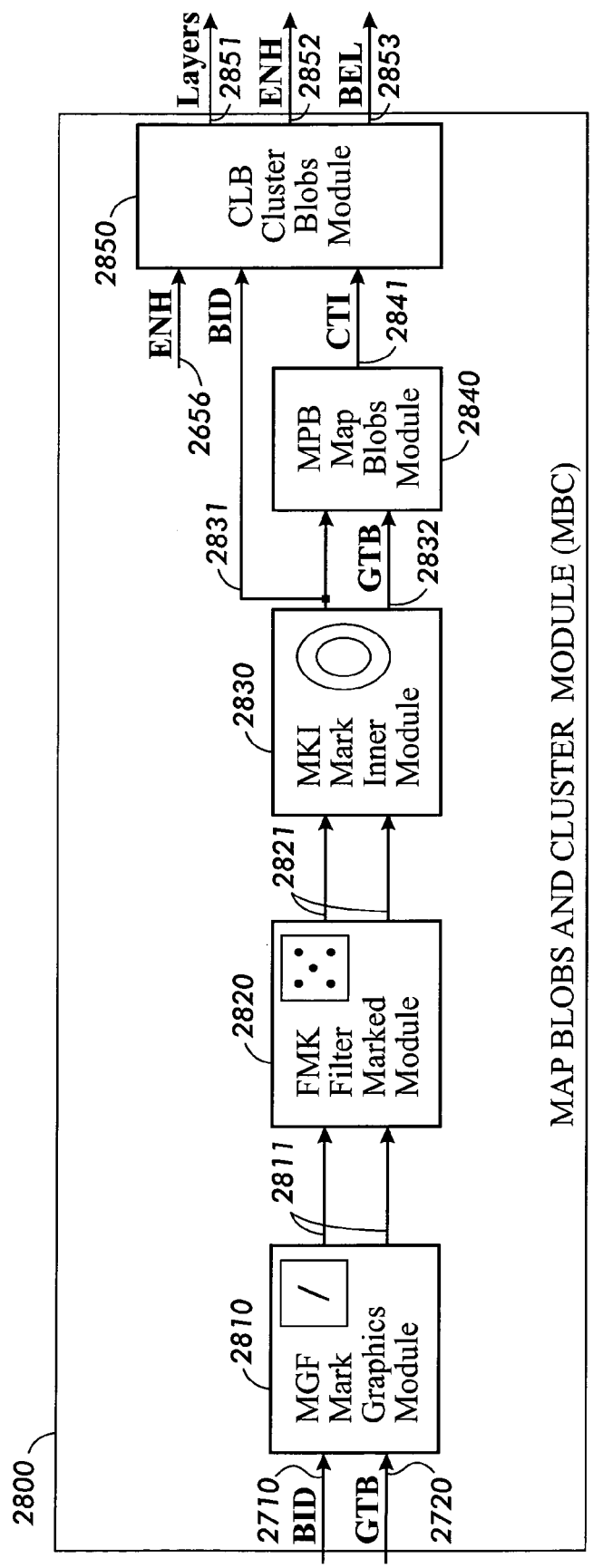
FIG. 22 illustrates one exemplary embodiment of a map blobs and cluster module of the N-layer image data generating system of FIG. 5.

FIG. 22 illustrates in great detail one exemplary embodiment of the map blobs and cluster module 2800. As shown in FIG. 22, the blob ID signal BID is input over a signal line 2710 and the global table of blobs signal GTB is input over a signal line 2720 to a mark graphics module 2810. The mark graphics module 2810 selects each identified blob in turn and marks that blob as a bad blob if certain conditions exist. For example, the blob can be marked as a bad blob if (1) the blob area of that blob is too small; or (2) if too few pixels of that blob are on, i.e., have non-zero color values; or (3) if the aspect ratio, i.e., the ratio of the width to height of the blob bounding box, indicates that that blob is too narrow either vertically or horizontally, or the like. It should be appreciated that blobs can be marked as bad for any number of reasons and that this list is intended to be neither exhaustive nor limiting. The mark graphics module 2810 then outputs the blob ID signal BID and the global table of blobs signal GTB, as modified to flag the bad blobs, over the signal lines 2811 to a filter marked blobs module 2820.

The filter marked blobs module 2820 analyzes the global table of blobs to identify bad blobs that are surrounded by neighboring good blobs. Likewise, the filter marked blobs module 2820 also analyzes the global table of blobs to identify good blobs that are surrounded by neighboring bad blobs. These isolated good and bad blobs are analyzed to determine if they have similar characteristics as the neighboring bad or good blobs, respectively. If so, the isolated bad blobs will be changed to good blobs. Similarly, if isolated good blobs have similar characteristics as the neighboring bad blobs, they are also changed to bad blobs. The filter marked blobs module 2820 then removes the bad blobs from the global table of blobs, releases their blob IDs and merges the bad blobs into the background color plane. The blob ID signal BID and the global table of blobs signal GTB, as modified by the filter marked blobs module 2820, are then output on the signal lines 2821 to the marked inner blobs module 2830.

The mark inner blobs module 2830 identifies blobs that are fully contained within other blobs, such as the blobs that form the insides of the letters "o" and "e". In various exemplary embodiments, any such inner blob is merged into the background grayscale plane and its blob ID number released. In various other exemplary embodiments, the color values of that blob are analyzed to determine if that inner blob should be merged into the background. If so, as above, the inner blob is merged into the background color plane and its blob ID number released. Otherwise, that blob continues to be an active blob. It should be appreciated that, because of the way the values of the tri-state edge continuity signal TEC operates, it is generally sufficient to test one horizontal row extending through the two blobs to determine if one blob is fully inside another blob.

For example, referring to FIG. 21, to determine that blob 2 is fully contained inside of blob 1, all of blob 2 pixels must be investigated to verify that they all are indeed inside of blob 1. This test can be very time consuming especially if blob 2 is large (as it must be checked if inside of any other blob). However, in accordance with the properties of the particular segmenter of this invention, both blob 1 and 2 are guaranteed to have consistent edge continuity along their perimeter (for otherwise they would not have been identified as blobs). This important property can be leveraged to greatly simplify the inside blob testing. The test procedure is as follows: Blob 2 top and bottom bounding box coordinates are used to calculate the line position halfway in the middle of blob 2. This one line is then traveled, starting from the leftmost pixel of the outer blob 1, to the rightmost blob 1 pixel as defined by the blob 1 bounding box. The test then uses a simple state machine to track the blob IDs of the pixels on this one line. It basically looks for a sequence of blob 1 pixels, followed by a sequence of blob 2 pixels and then blob 1 again for blob 2 to succeed as inside of blob 1. Any out of order ID of either blob 1 or 2 or any other blob will fail the inside test. Clearly, this requires far fewer computations then checking each and every possible pixel combination.

The blob ID signal BID and the global table of blocks signal GTB, as further modified by the mark inner blobs module 2830, is output over the signal lines 2831 and 2832, respectively, to the map blobs module 2840. The blob ID signal BID is also output over the signal line 2831 to the cluster blobs module 2850.

The map blobs module 2840 generates a blob-to-color index by clustering together all blobs of similar color. In various embodiments of this invention, the map blobs module 2840 assigns a color index to each of one or more blobs based on a color property of the blobs. In one embodiment of this invention, an Octal tree method of clustering is used. In another embodiment of this invention, a second Hierarchical binary free clustering method is used. Regardless of the specific clustering technique, the blobs for the entire page are classified into a typically smaller number of unique representative colors, which are then used as the colors of the multiple binary foreground planes.

It should be appreciated that the classification method of blobs may be based on the color properties alone, as is the Octal tree method, or alternatively may be based on both the color and spatial properties, as is the Hierarchical binary tree method. The Octal tree method has the advantage of producing the smallest number of multiple foreground planes since it groups together similar color blobs regardless of where they are on the page. In contrast, the Hierarchal binary tree method will only group together blobs if they have similar colors and they are close to each other. Thus, for example, one red character on the top of the page can be placed in a separate foreground plane even if it has the same color as another red character on the bottom of the page. Even though the Hierarchical binary tree method may produce more foreground planes than the Octal tree method, it may still produce a smaller file size, particularly when the color clusters are compact and sparsely populated throughout the page. The main reason for the difference in file size is due to all the intermediate pixels between the top and bottom characters that waste no compression space in the Hierarchical binary tree method.

Figure 23:
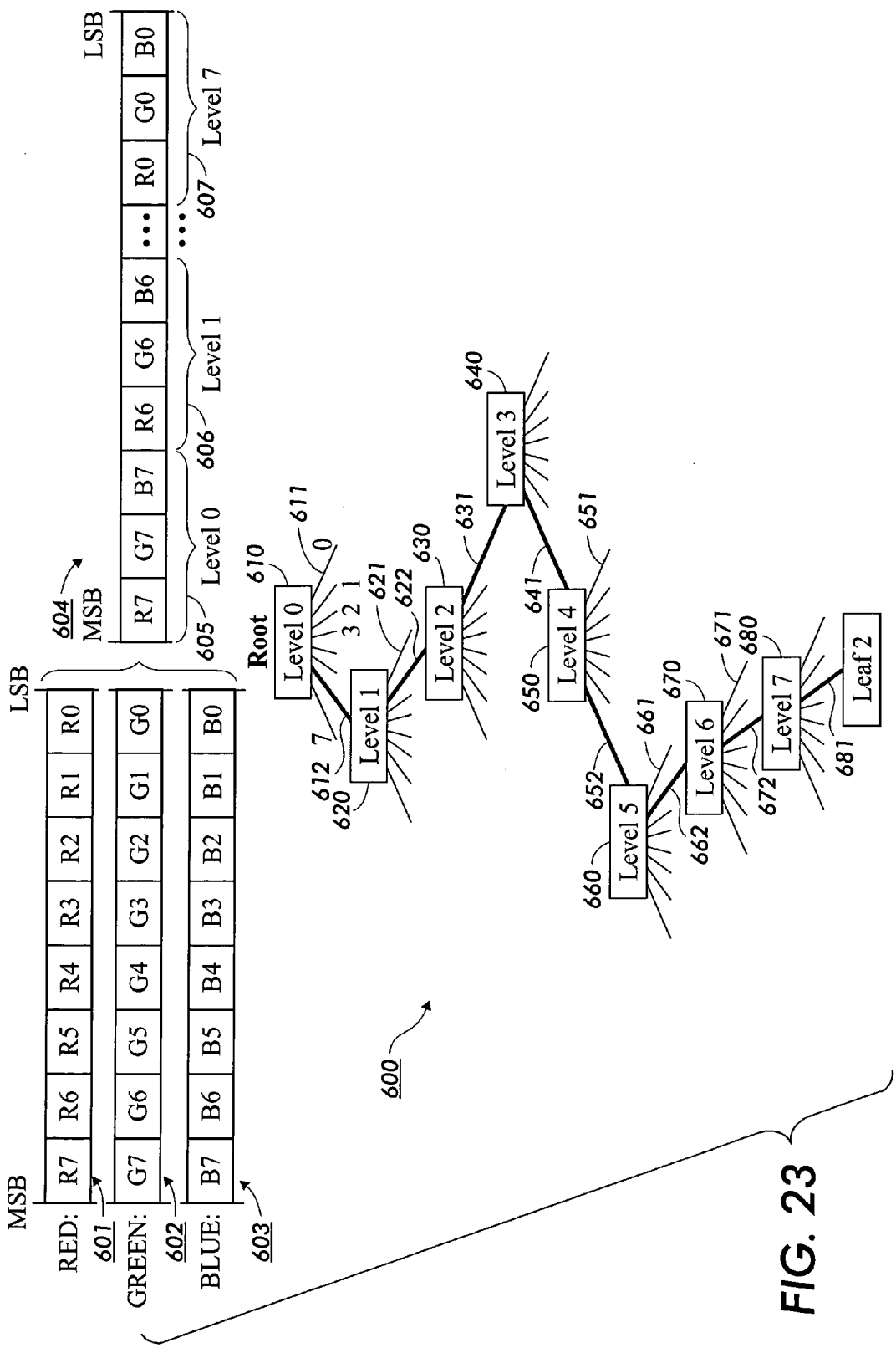
FIG. 23 illustrates one exemplary embodiment of the data structures for storing the color information used in various exemplary embodiments of the multiple binary foreground planes according to this invention and for a tree data structure generatable from the color data.
Figure 24:
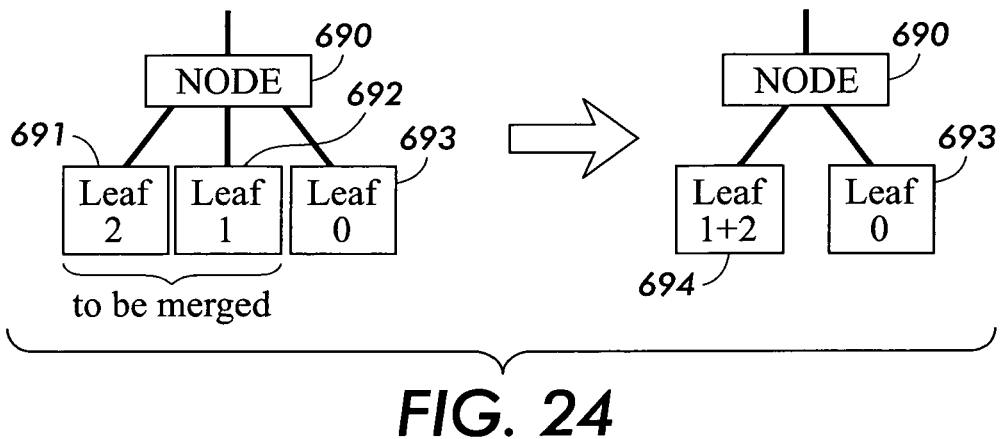
FIGS. 24 and 25 illustrate various techniques for combining the tree structure shown in FIG. 23 to reduce the number of leaf nodes in the trees.
Figure 25:
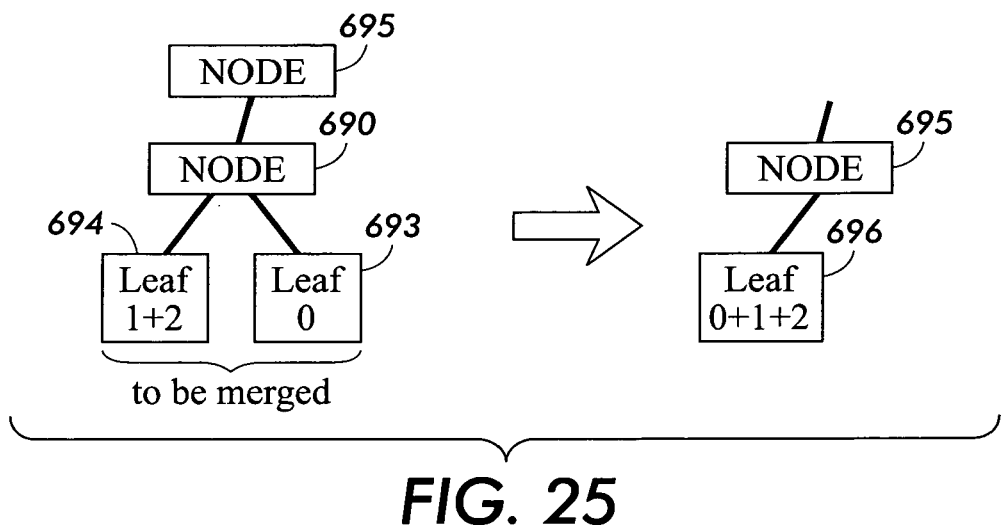

In one embodiment, the blob classification process builds an Octal tree for the remaining good blobs. This is described in further detail with respect to FIGS. 23-25. The map blobs module 2840 then outputs the generated Octal tree over the signal line 2841 to the cluster blobs module 2850. FIG. 23, which is described in greater detail below, illustrates how the enhanced color image data signal ENH is analyzed to generate the Octal tree and the blob-to-color index. In various exemplary embodiments, as illustrated in FIGS. 24 and 25, the map blobs module 2840 creates the Octal tree and then prunes the Octal tree. In such exemplary embodiments, each remaining leaf in the Octal tree represents a different layer of the multiple binary foreground layers.

In various exemplary embodiments, there may be a desired maximum number of possible binary foreground layers, for example, 128. The map blobs module 2840 clusters the leaves of the Octal tree that have similar colors together to ensure that there are no more than the maximum number of allowable leaves remaining in the Octal tree. The map blobs module 2840 then outputs the color-to-index signal CTI over a signal line 2841 to the cluster blobs module 2850.

The cluster blobs module 2850 inputs the generated color-to-index signal CTI over the signal line 2841, the block ID signal BID over the signal line 2831 and the enhanced image data signal ENH over the signal line 2856. The cluster blobs module 2850, based on the blob IDs and the colors-to-index signal CTI, merges or assigns blobs having sufficiently similar colors into specific ones of the plurality of binary foreground layers. That is, the cluster blobs module 2850 combines, for each different binary foreground layer, any blobs that have the layer ID of the color associated with that binary foreground layer into that binary foreground layer. The cluster blobs module 2850 generates the binary selector signal BEL over a signal line 2853 which is the union of all the binary foreground masks. In addition, it also passes the enhanced color signal ENH over a signal line 2852 to the background adjust module 2900, and the various determined binary foreground planes over the signal line 2851 to the compress module 3000.

FIG. 23 illustrates one exemplary embodiment of a Octal tree and how the Octal tree corresponds to the three color component vectors of the enhanced image data signal ENH. As shown in FIG. 23, the three color vectors 601, 602 and 603 each comprise 8 bits of data extending from a left-most most significant bit to a right-most least significant bit. It should be appreciated that, while FIG. 23 shows the three color components of the 24-bit color vector as red, green and blue components, the technique described herein with respect to FIG. 23 can be used with any three-dimensional color space, regardless of whether the color axes are red, green and blue, as shown in FIG. 23, or are LAB, YCC, XYZ or any other known or later-developed device-independent or device-dependent color space components.

As shown in FIG. 23, the three independent color components 601, 602 and 603 of the 24-bit full-color, three-component color vector are first reorganized into a single 24-bit word. This 24-bit word is divided into eight separate 3-bit nibbles or levels 604. Each 3-bit nibble or level 604 is formed by gathering the bits of the same degree of significance from each of the three different components 601-603 and ordering them, generally in the same order, such that the three most significant bits are in a first nibble or zeroth level 605, the three second most significant bits are in a second nibble or first level 606 and the three least significant bits are in an eighth nibble or seventh level 607. As such, each 3-bit nibble defines eight possible values for each level.

It should be appreciated that, in various exemplary embodiments, the map blobs module 2840 operates to generate and prune the Octal tree as set forth in the following description.

As shown in FIG. 23, a Octal tree 600 can be generated from the eight 3-bit nibbles such that a root node 610, corresponding to the first nibble or zeroth level 605, will have eight different branches 611, each corresponding to one possible 3-bit value for that first nibble.

It should be appreciated that each different identified blob in the global table of blobs signal GTB will be converted in this way. As such, each different blob will have one of the eight possible 3-bit values for the three most significant bits of the three components of the color value associated with that blob. For each of the eight 3-bit values that occur in the identified blobs for the first nibble 605, a further, second nibble or first level node is added at the end of that branch 611, such as for the branch 612 corresponding to the 3-bit value "101." For each such branch 611 having a first level or second nibble node 620, the second nibble 606 of each identified blob is selected. Thus, there are again eight different 3-bit values that can occur in that second nibble 606 that will need to have nodes added to that first level node 620, depending on the value of those three bits. For example, as shown in FIG. 15, for the eight branches 621 extending from the first level node 620, a second level node 630 will need to be added to the end of those branches 621, such as the branches 622 where a blob has a color value corresponding to the zeroth level 3-bit value of the first level node 620 and a first level value corresponding to the second level node positioned at the end of the branch 622, such as, for example, the level 1 value "010."

Thus, as shown in FIG. 23, the third nibble or second level node 630 will have eight branches 631 extending from it. Similarly, each fourth nibble or third level node 640 will have eight branches 641 extending from it. Likewise, each of the fifth, sixth, seventh and eighth nibbles will have a node 650, 660, 670 and 680, respectively at the end of one of the branches 641, 651, 661 and 671, respectively that extends from the previous level node. For example, if the color value of the 24-bit word shown in FIG. 23 includes a value of 000 for the third nibble, a value of 111 for the fourth nibble, a value of 111 for the fifth nibble, a value of 001 for the sixth nibble, a value of 011 for the seventh nibble and a value of 011 for the eighth nibble, the tree, for that particular 24-bit color word will contain the additional branches 641, 652, 662, 672 and 681, resulting in the tree 600 shown in FIG. 23 ending in the leaf 2. If the 24-bit color value for each other identified blob is similarly added to the tree 600, the tree 600 will contain one path from the root or zeroth level node 600 down to a particular seventh level leaf 681, such as the leaf 2 shown in FIG. 23, for each different color that is present in the identified blobs. However, because some blobs may have the exact same 24-bit color value, there will not necessarily be as many different leaves 681 as there are different identified blobs.

Furthermore, it should be appreciated that, if two different blobs share the same path through the tree 600 except for the seventh level leaf 681 or the sixth level branch 672, or even the fourth or fifth level branches 651 or 661, those colors may be sufficiently similar that the leaves and/or branches for those two or more blobs should be combined. This is shown in greater detail in FIGS. 24 and 25.

As outlined above with respect to the map blobs module 2840, the blobs remaining in the modified gross table of blocks single GTB, after the gross table of blocks single GTB has been thinned by the mark graphics module, the filter marked blobs module and the mark inner blobs module 2810, 2820 and 2830, are analyzed as outlined above, one blob at a time to form a path in the tree 600 that extends from the root node 610 down to a specific leaf node 681. It should be appreciated that the number of leaves 681 in the tree 600 determines the number of different binary foreground planes used to store the image data of the input image in the multiple binary foreground planes format.

However, it should be appreciated that it is generally not appropriate to allow as many as $2^{24}$ different binary foreground planes to be used. This is especially true since the human eye is often unable to discern differences in colors represented by the eighth nibble, and possibly even the seventh, sixth or even fifth nibbles, of the 24-bit color associated with each blob. Thus, the number of allowable layers is usually limited to some number, generally a power of two number such as 128, 256 or the like. Then, if the number of layers initially in the Octal tree 600 exceeds this limit, the Octal tree 600 must be pruned. It should be appreciated that, in various exemplary embodiments, the Octal tree 600 can be pruned by finding two or more leaves 681 having similar color values and merging those two closest leaves 681 into a single leaf 681. This is shown in FIG. 24, where a particular node 690 representing one of the nibbles 604 has three active leaves 691, 692 and 693. As shown in FIG. 24, the number of binary foreground layers can be reduced by one by merging the leaves 691 and 692 into a combined leaf 694.

It should also be appreciated that the Octal tree 600 can be pruned by merging two or more leaves 681 into their parent node 671 and/or changing a parent node into a leaf when all of its leaves or branches are otherwise pruned. As a result, for the corresponding blobs, the entire Octal tree 600 will be shorter by one level for those blobs. This is shown in greater detail in FIG. 25.

As shown in FIG. 25, the nodes 694 and 693 of FIG. 24 are to be merged such that the node 690 will have a single leaf comprising each of the original leaves 1, 2 and 3. However, because the node 690 has a single leaf, that leaf can be merged into the node 690 resulting in the leaf 696 extending from the node 695 that is one level higher in the tree 600. Once all of the leaves and branches of the Octal tree 600 have been examined and merged as appropriate to ensure that the number of layers does not exceed the leaf limit for the Octal tree 600, the remaining leaves are each assigned an identification number, which will later become the layer identification number. Finally, the map bobs module 2840 creates a color to index CTI table, which maps the colors of the blobs to the layer ID assigned to the corresponding final leaves in the Octal tree 600.

It should also be appreciated that, in various exemplary embodiments, while various leaves and nodes may be combined, as shown in FIG. 24 and FIG. 25, the different colors associated with each of the merged nodes are not combined at that time. Rather, in such exemplary embodiments, the colors are combined when the blobs associated with a particular index are clustered into a single layer by the cluster blobs module 2850.

Figure 26:
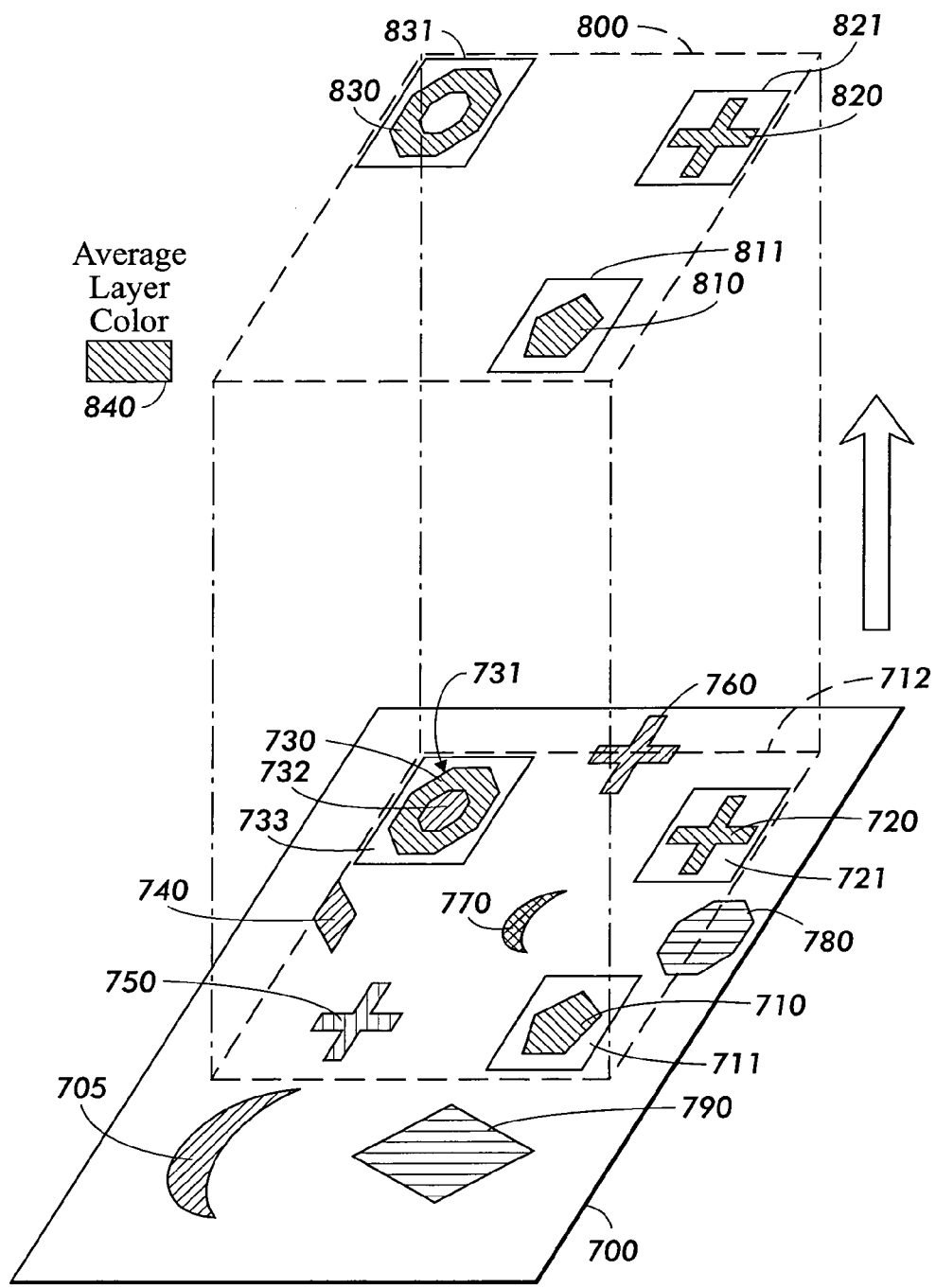
FIG. 26 illustrates one exemplary embodiment of the original image data after the various blobs of an image have been identified and techniques for gathering the identified blobs into a particular binary foreground plane based on color data of the various blobs and of the particular binary foreground plane.

FIG. 26 shows this process in greater detail. As shown in FIG. 26, an original image 700 contains a plurality of blobs 705-790. It should be appreciated that in FIG. 26, each of the different cross hatching styles represents a different index value. Thus, the blobs 705 and 760 have different index value, while the blobs 780 and 790 have the same index value. The blobs 750 and 770 are the only blobs having their particular index values. The blobs 710, 720 and 731 of the pair of blobs 730 also each have the same index value. Finally, the blobs 732 and 740 have the same index value. However, it should be appreciated that, while different blobs have the same index value, they do not necessarily have the same color value.

As shown in FIG. 26, each of the blobs 710, 720 and 731 are shown with a bounding box 711, 721 or 733, respectively, formed around those blobs. The bounding boxes 711, 721 and 733 represent the extents along the document axes of the left-most, right-most, top-most and bottom-most points of those blobs. In addition, an overall bounding box 712 that represents the left-most, right-most, top-most and bottom-most extents along the document axes for the blobs 710, 720 and 731 that have the same index is also shown relative to the full size of the document 700.

Because the blobs 710, 720 and 731 all have the same index due to pruning of the tree 600, all of these blobs will be lifted onto the same binary foreground layer 800, as shown in FIG. 26. Thus, shown in FIG. 26, the binary foreground plane 800 includes the blobs 810, 820 and 830, which are bounded by the bounding boxes 811, 821 and 831, respectively. It should be appreciated that, while each of the blobs 810, 820 and 830 have the same index, they do not necessarily have exactly the same color value. Accordingly, the color value 840 that is associated with the binary foreground layer 800 is the average color for the various blobs 810, 820 and 830 incorporated into the binary foreground layer 800. It should also be appreciated that the size of the binary foreground layer 800 and its position relative to the background grayscale layer and other ones of the multiple binary foreground layers correspond to the bounding box 712. Thus, the binary foreground layer 800 does not need to be equal in extent to the original image 700 or the chromatic or color background layer.

Figure 27:
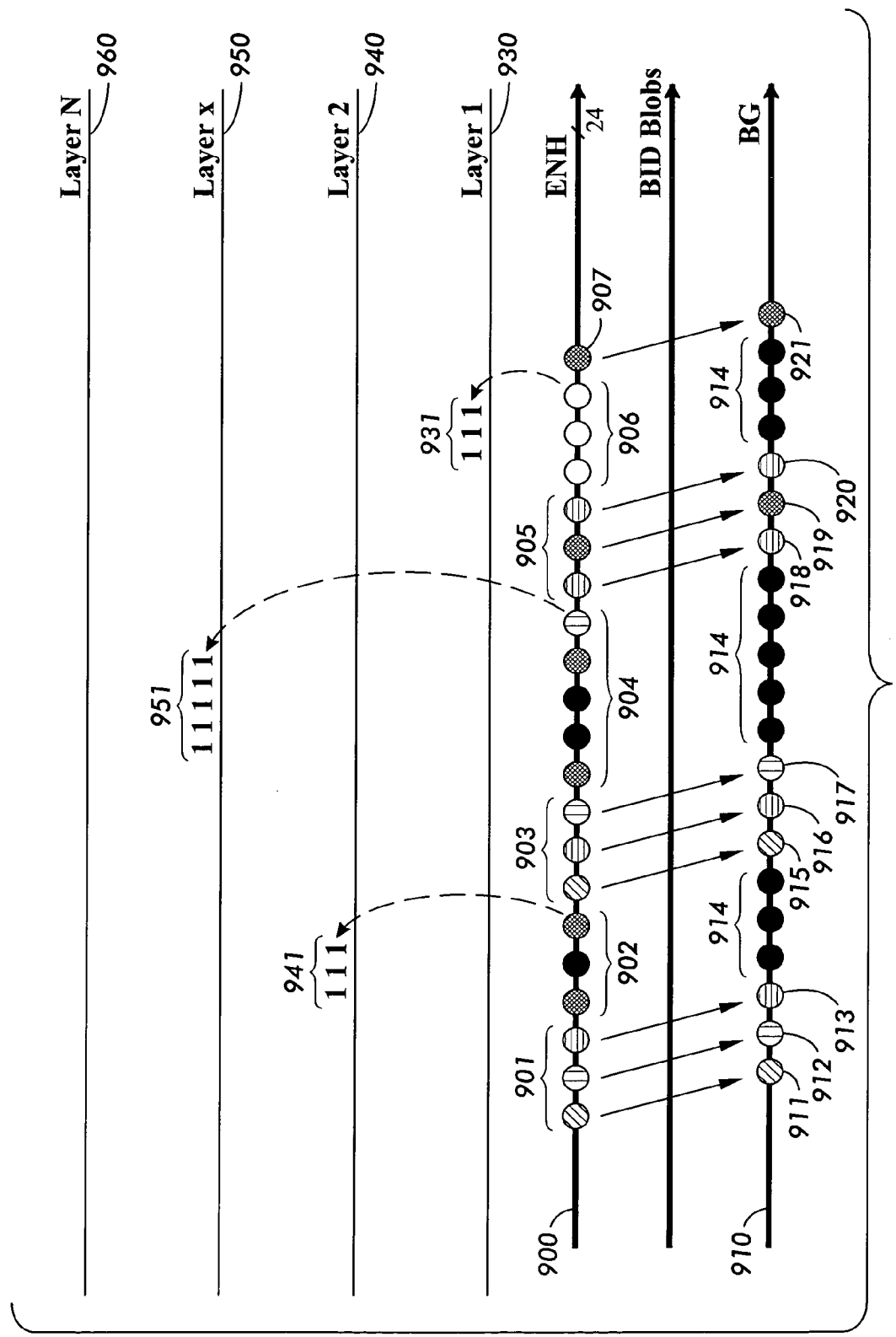
FIG. 27 illustrates how the processed image data is distributed among the background and the multiple foreground planes.

FIG. 27 illustrates another way of visualizing this process. As shown in FIG. 19, the enhanced image data signal ENH, the blob index signal BID and the blob information is input on a line by line basis. This is represented by the line 900 shown in FIG. 27. As shown in FIG. 27, for the pixels on the scanline 900 portion of the enhanced image data signal ENH, the pixels are divided into seven sections 901-907 where the sections 901, 903, 905 and 907 are marked as background pixels and are copied over to the background layer 910 as the background pixels 911-921. At the same time, based on the layer ID of each of the pixel regions 902, 904, 906 to be lifted, a binary value of "1" is written into each of the layers 930, 940, 950 or 960 depending on the layer ID of each of those pixels to be lifted. Thus, shown in FIG. 19, a set 941 of "1s" are written in the layer 940 for the set of pixels 902. Likewise, a set 951 of "1s" is written in the layer 950 for the set of pixels 904. Finally, a set 931 of "1s" is written in the layer 930 for the set 906 of pixels. At the same time, when the sets of pixels 902, 904 and 906 are lifted into the various layers 930-960, the corresponding pixels 914 in the background layer are set to zero.

It should be appreciated that, in various exemplary embodiments, the layers 930-960 have a resolution of 300 dpi. In general, because the layers are binary data and binary data is usually compressed using one-dimensional compression techniques, each line of each layer is output one at a time and compressed. In contrast, continuous tone compression methods such as JPEG often work on 2D rectangular blocks of pixel data. Depending on the block sizes of the blocks used for the JPEG compression of the background, as soon as enough lines of the background layer have been produced, which is usually as many lines as necessary to fill one swath of the background image that is one JPEG MCU high, the background compression cycle begins.

In this background compression cycle, the background grayscale image data is first filtered and then is subsampled to reduce its resolution to 150 dpi. Next, the JPEG blocks are averaged over the non-zero pixels to identify an average color for that block. That determined average color is then used to fill any of the pixels that were set to zero because their corresponding data was actually lifted into one of the binary layers 930-960. Each of the JPEG blocks is then JPEG compressed as described in the process outlined above and in the incorporated three-layer applications.

It should be appreciated that the above outlined process of FIG. 27 for the background layer is generally performed by the background adjust module 2900 and the compression of the background layer and the various binary foreground layers is performed by the compress module 3000.

Figure 28:
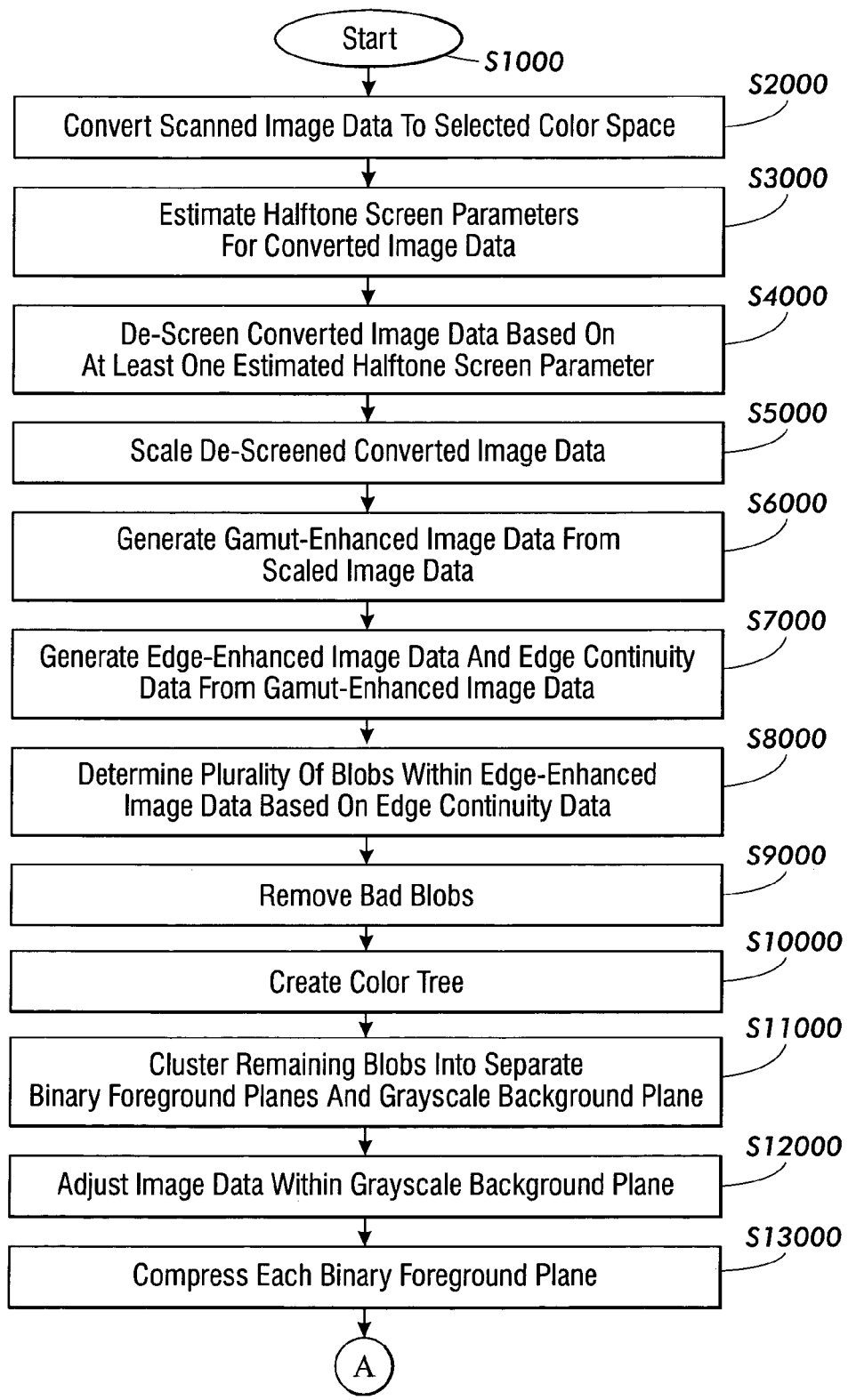
FIGS. 28 and 29 are a flowchart illustrating one exemplary embodiment of a method for converting scanned image data into a portable document format (PDF) document file using multiple binary foreground layers.
Figure 29:
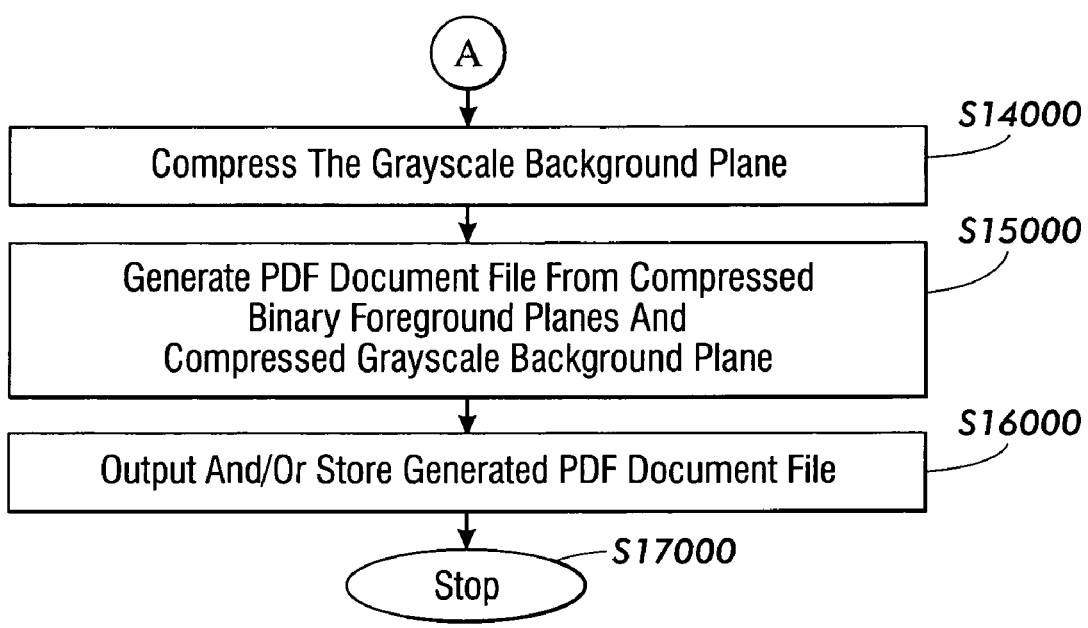

FIGS. 28 and 29 are a flowchart illustrating one exemplary embodiment of a method for converting scanned image data into a portable document format (PDF) document file using multiple binary foreground layers. As shown in FIGS. 28 and 29, operation of the method begins in step S1000 and continues to step S2000, where scanned image data is converted to a selected color space. Then, in step S3000, halftone screen parameters, such as screen frequency and screen magnitude, are estimated for the converted image data. Next, in step S4000, the converted image data is descreened to remove the halftone screening from the converted image data based on the at least one estimated halftone screen parameter. That is, the descreening converts the image data from halftone image data back into true continuous tone grayscale image data. Operation then continues to step S5000.

In step S5000, the descreened converted image data is scaled. Next, in step S6000, gamut enhanced image data is generated from the scaled descreened image data. Then, in step S7000, edge-enhanced image data and edge continuity data are generated from the gamut enhanced image data. Operation then continues to step S8000.

In step S8000, a plurality of blobs of image data that will be distributed among the multiple binary foreground layers that occur within the edge-enhanced image data are determined based on the edge continuity data. Then, in step S9000, any poorly defined blobs, such as, for example, "bad" blobs, are removed. Next, in step S10000, a color tree is created from the remaining blobs after the "bad" blobs are removed from the determined blobs. Operation then continues to step S11000.

In step S11000, the remaining blobs are clustered into separate binary foreground planes or layers and a grayscale background plane. Next, in step S12000, the image data within the grayscale background plane is adjusted to improve the compressibility of the grayscale background plane. Then, in step S13000, each of the separate binary foreground planes determined in step S11000 are compressed using a compression technique that is appropriate to such binary foreground planes. Operation then continues to step S14000.

In step S14000, the grayscale background plane is compressed using a compression technique that is appropriate for such grayscale data. Then, in step S15000, a portable document format (PDF) document file is generated from the compressed binary foreground planes and the decompressed grayscale background plane. Next, in step S16000, the generated portable document format (PDF) document file is output to a downstream processor and/or stored in a memory. Operation then continues to step S17000, where operation of the method ends.

It should be appreciated that, in step S2000, the scanned image data, which is typically in RGB format, is converted to a selected color space to simplify the downstream processing. For example, converting the scanned image data to YCC or LAB color spaces allows the luminance values to be detected directly, rather than having to be derived. However, it should be appreciated that any desired color space could be used, including the original RGB or other color space of the scanned image data as scanned. In this case, step S2000 can be omitted.

It should also be appreciated that, in various exemplary embodiments, any known or later-developed document format, in place of the portable document format (PDF) can be used in steps S15000 and S16000.

Figure 30:
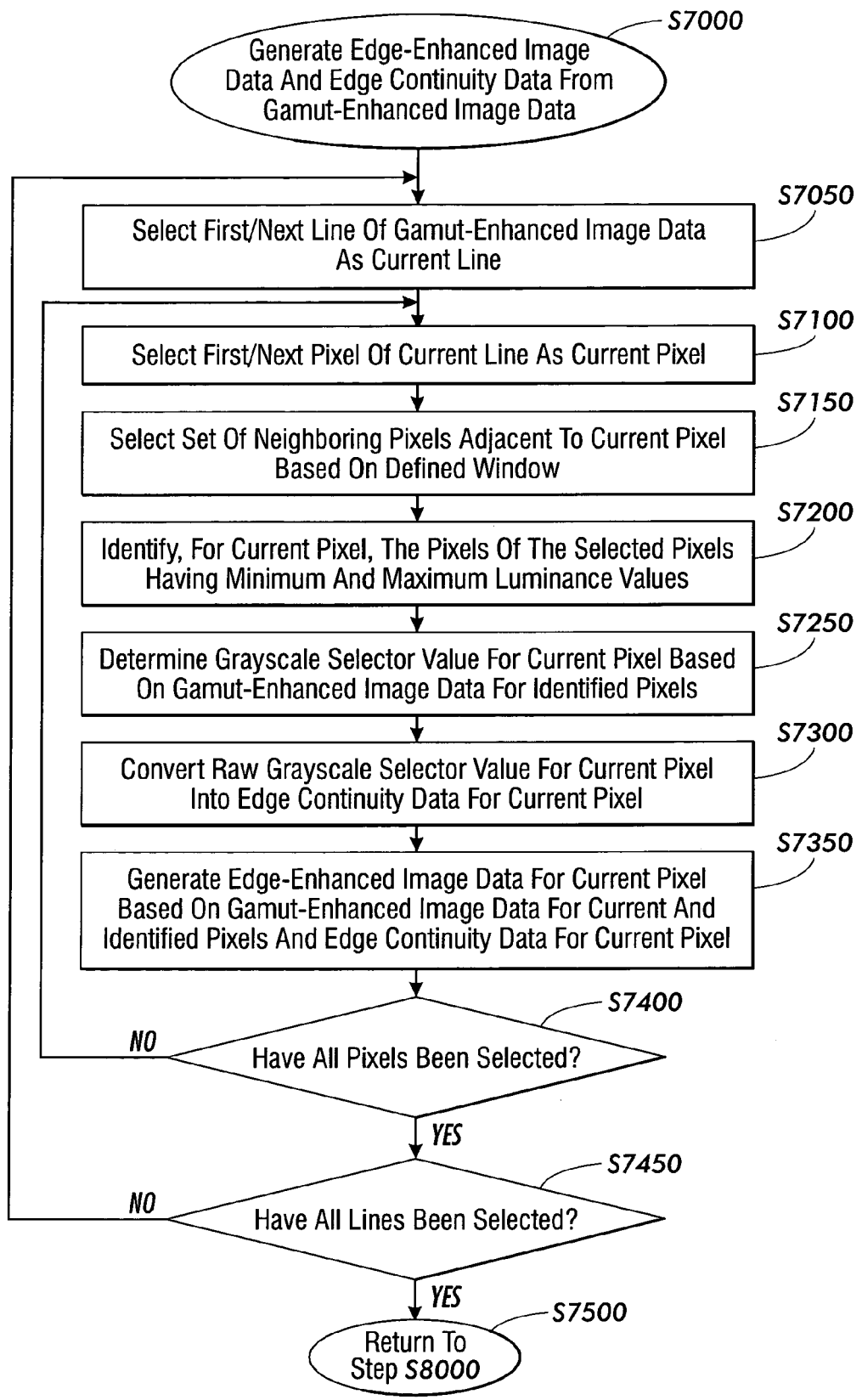
FIG. 30 is a flowchart outlining in greater detail one exemplary embodiment of a method for generating edge-enhanced image data and edge continuity data from the gamut enhanced image data.

FIG. 30 is a flowchart outlining in greater detail one exemplary embodiment of a method for generating edge-enhanced image data and edge continuity data from the gamut enhanced image data of step S7000. As shown in FIG. 30, beginning in step S7000, operation continues to step S7050, where a first or next line of the gamut enhanced image data is selected as a current line. Then, in step S7100, a first and/or next pixel of the current line selected in step S7050 is selected as a current pixel. Next, in step S7150, a set of neighboring pixels-that are adjacent to the current pixel is selected based on a defined window. As outlined above, the defined window can be, for example, a 7×7 window centered on the current pixel. Operation then continues to step S7200.

In step S7200, the pixels appearing in the window around the current pixel are reviewed to identify, for the current pixel, a pixel appearing in the window that has a maximum luminance value and a pixel appearing in the window that has a minimum luminance value. Next, in step S7250, a grayscale selector value is determined for the current pixel based on the full three-component gamut-enhanced image data of the pixels identified in step S7200. Then, in step S7300, the raw grayscale selector value is converted into edge continuity data for the current pixel. As outlined above, in various exemplary embodiments, the edge continuity data indicates whether there is an edge in the window or on the current pixel that can be associated with the current pixel and the relationship of that edge to the current pixel. Operation then continues to step S7350.

In step S7350, edge-enhanced image data is generated for the current pixel based on the gamut-enhanced image data for the current pixel and the gamut-enhanced image data for the pixels identified in step S7200, as well as the edge continuity data for the current pixel. Then, in step S7350, a determination is made whether all pixels of the current line have been selected as the current pixel. If not, operation returns to step S7100, where a next pixel of the current line is selected as the current pixel. Otherwise, if all of the pixels of the current line have been selected as the current pixel, operation continues to step S7450. In step S7450, a determination is made whether all lines of the image data have been selected. If not, operation returns to step S7050, where a next line of the gamut-enhanced image data is selected as the current line. Otherwise, if all of the lines of the image data have been selected, such that the entire image has been analyzed and edge-enhanced image data and edge continuity data has been generated for each pixel in the scanned image data, operation continues to step S7500 where operation returns to step S8000.

Figure 31:
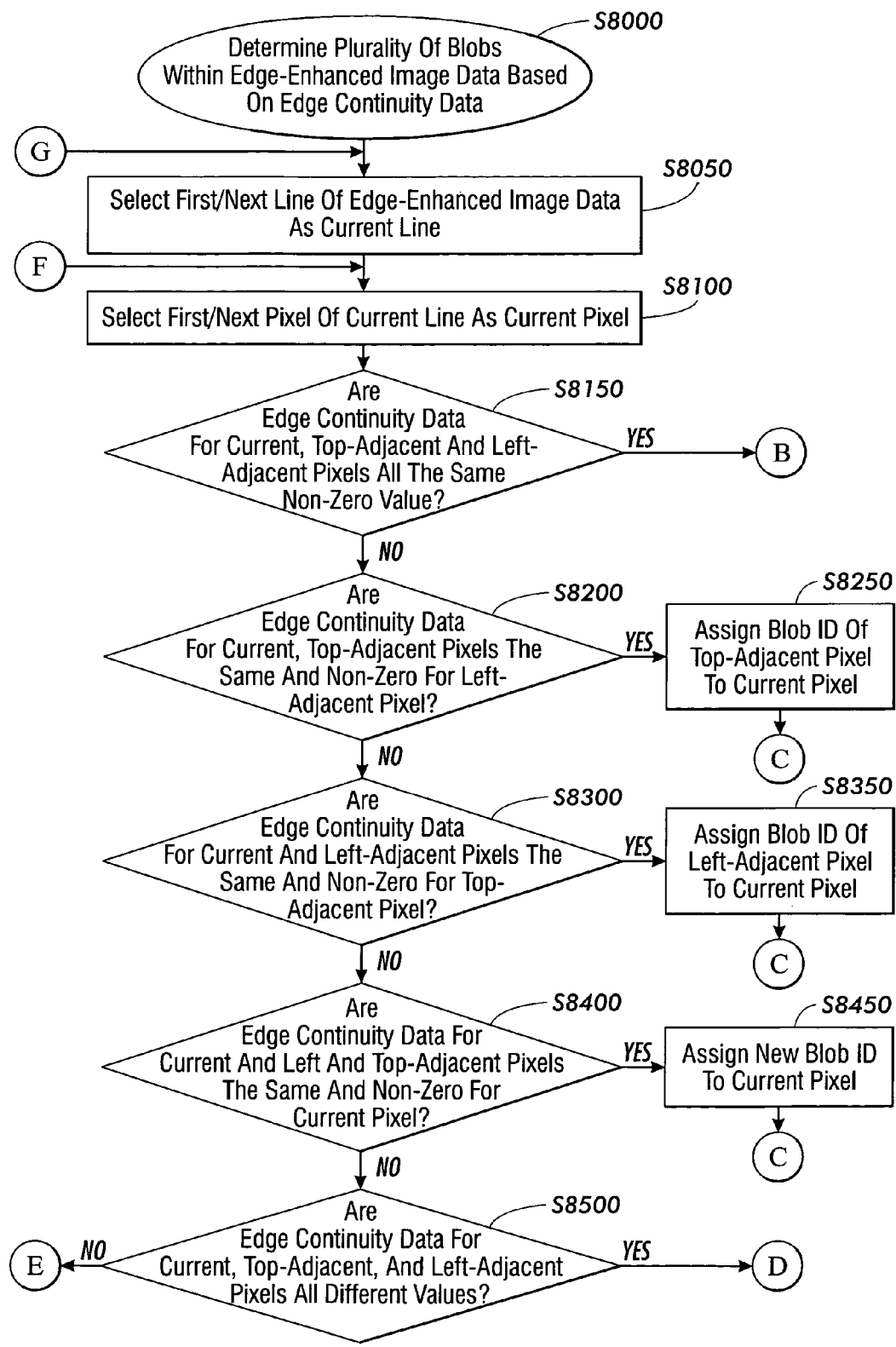
FIGS. 31 and 32 outline in greater detail one exemplary embodiment of a method for determining the plurality of blobs within the edge-enhanced image data based on the edge continuity data.
Figure 32:
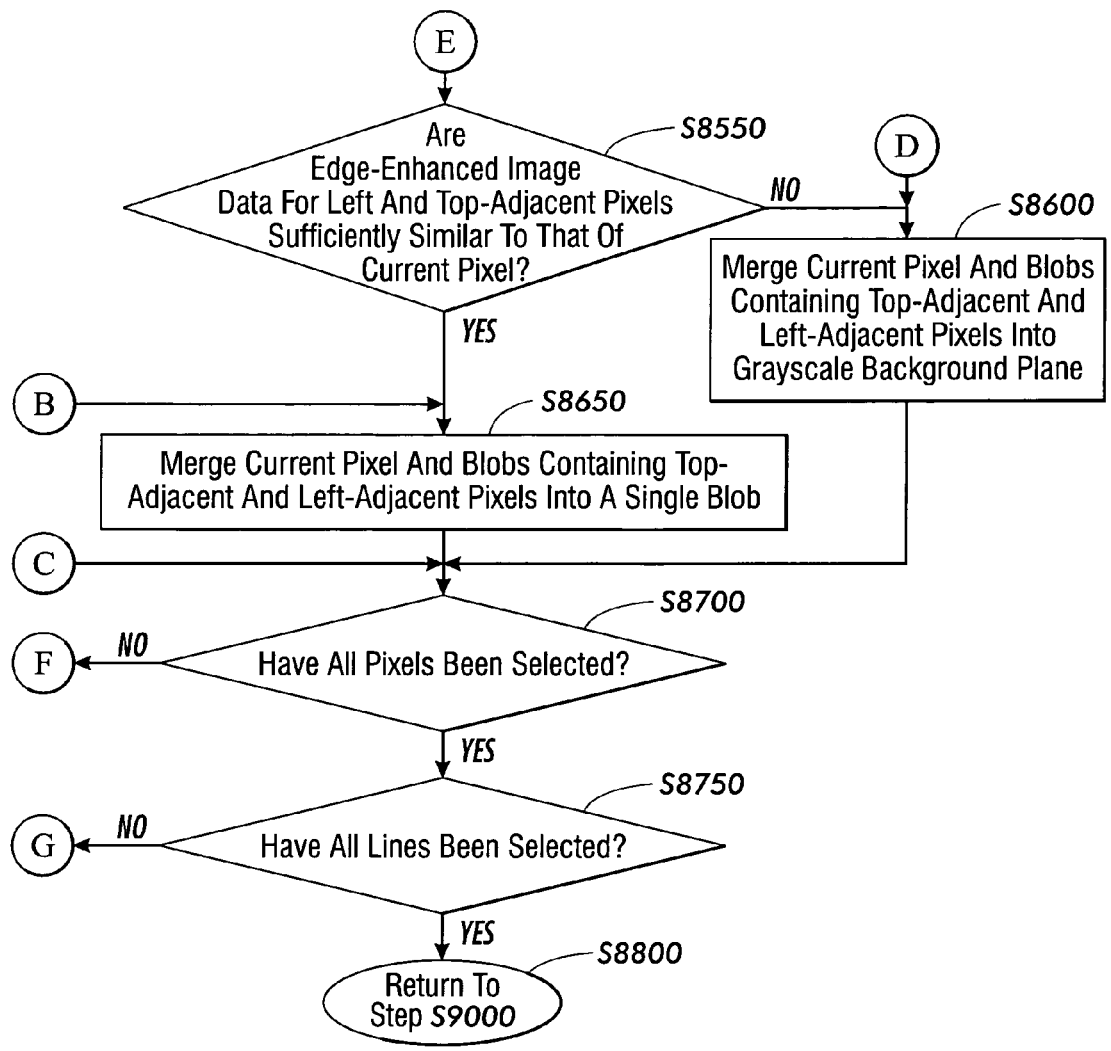

FIGS. 31 and 32 outline in greater detail one exemplary embodiment of a method for determining the plurality of blobs within the edge-enhanced image data based on the edge continuity data of step S8000. As shown in FIGS. 31 and 32, beginning in step S8000, operation continues to step S8050, where a first or next line of edge-enhanced image data is selected as a current line. Then, in step S8100, a first or next pixel of the current line is selected as the current pixel. Next, in step S8150, a determination is made whether the edge continuity data for the current pixel, the top adjacent pixel and the left adjacent pixel all have the same, non-zero edge continuity value. It should be appreciated that, in this exemplary embodiment of step S8000, the edge continuity data is tested for a pixel which shares a top edge with the current pixel, i.e., a top-adjacent pixel, and a pixel which shares the left edge of the current pixel, i.e., a left-adjacent pixel. In step S8150, if the edge continuity data for the current, top-adjacent, and left-adjacent pixels all have the same non-zero value, operation jumps to step S8650. Otherwise, operation continues to step S8200.

In step S8200, a determination is made whether the edge continuity data for the current pixel and the top-adjacent pixel is the same, while the edge continuity data for the left-adjacent pixel is different but non-zero. If so, operation continues to step S8250. Otherwise, operation jumps to step S8300. In step S8250, the blob ID for the top-adjacent pixel is also assigned to the current pixel, indicating that these two pixels are contained within the same blob. Operation then jumps to step S8700.

In step S8300, a determination is made whether the edge continuity data for the current pixel and the left-adjacent pixel are the same, while the edge continuity data for the top-adjacent pixel is different but non-zero. If so, operation continues to step S8350. Otherwise, operation jumps to step S8400. In step S8350, the blob ID for the left-adjacent pixel is also assigned to the current pixel, such that these two pixels are part of the same blob. Operation then jumps again to step S8700.

In step S8400, a determination is made whether the edge continuity data for the left- and top-adjacent pixels are the same, while the edge continuity data for the current pixel is non-zero but different. If so, operation continues to step S8450. Otherwise, operation jumps to step S8500.

In step S8450, the current pixel is assigned a new blob ID that is different from the blob IDs of either the top-adjacent or left-adjacent pixels. Thus, the current pixel is in a blob which is distinct from the blobs of the top-adjacent and left-adjacent pixels, even if those two pixels are within the same blob. Operation then again jumps to step S8700.

In step S8500, a determination is made whether the edge continuity data for the current pixel, the top pixel and the left adjacent pixels all have different values. That is, one of the current top and left-adjacent pixels has a first value, a second one has a second value and a third one has a third value. If so, operation jumps to step S8600. Otherwise, operation continues to step S8550. In step S8550, a determination is made whether the edge-enhanced image data for the left-adjacent pixel and the top-adjacent pixel are each sufficiently similar to the edge-enhanced image data for the current pixel. If not, operation again continues to step S8600. Otherwise, operation jumps to step S8650.

In step S8600, because either each of the current, top-adjacent, and left-adjacent pixels have different edge continuity values or because the top-adjacent and left-adjacent pixels have colors that are not sufficiently similar to that of the current pixel, the current pixel is merged into the grayscale background plane. Furthermore, the blobs containing the top-adjacent pixel and the left-adjacent pixel, i.e., all of the pixels contained within those blobs, are also merged into the grayscale background plane. Operation then jumps to step S8700.

In contrast, in step S8650, because the current pixel, the top-adjacent pixel, and the left-adjacent pixel all have the same edge continuity value, or all of the pixels have sufficiently similar edge-enhanced image data and either two of the current pixels, the top-adjacent pixel and the left-adjacent pixel have the same edge continuity value while the third has a zero value, or two of the current pixel, the top-adjacent pixel and the left-adjacent pixel have zero values, the current pixel can be merged into both of the blobs containing both of the top-adjacent and left-adjacent pixels. As a result, both of those blobs and the current pixel are all merged into a single blob. It should be appreciated that this single blob can take the blob ID of the top-adjacent pixel, can take the blob ID of the left-adjacent pixel, can take an entirely new blob ID, or can take any other appropriate blob ID, depending upon the particular implementation. Operation then continues to step S8700.

In step S8700, a determination is made whether all pixels of the current line of edge-enhanced image data have been selected. If not, operation returns to step S8100. Otherwise, operation continues to step S8750. In step S8750, a determination is made whether all lines of the edge-enhanced image data have been selected as the current line. If not, operation returns to step S8050. Otherwise, operation continues to step S8800, where operation returns to step S9000.

It should be appreciated that, in various other exemplary embodiments, different techniques for identifying the blobs can be used. For example, the particular technique outlined in co-pending U.S. Patent Application Ser. No. 10/776,515, which is filed on even date herewith and which is incorporated by reference in its entirety, can be used in place of the method outlined above with respect to FIGS. 31 and 32.

Figure 33:
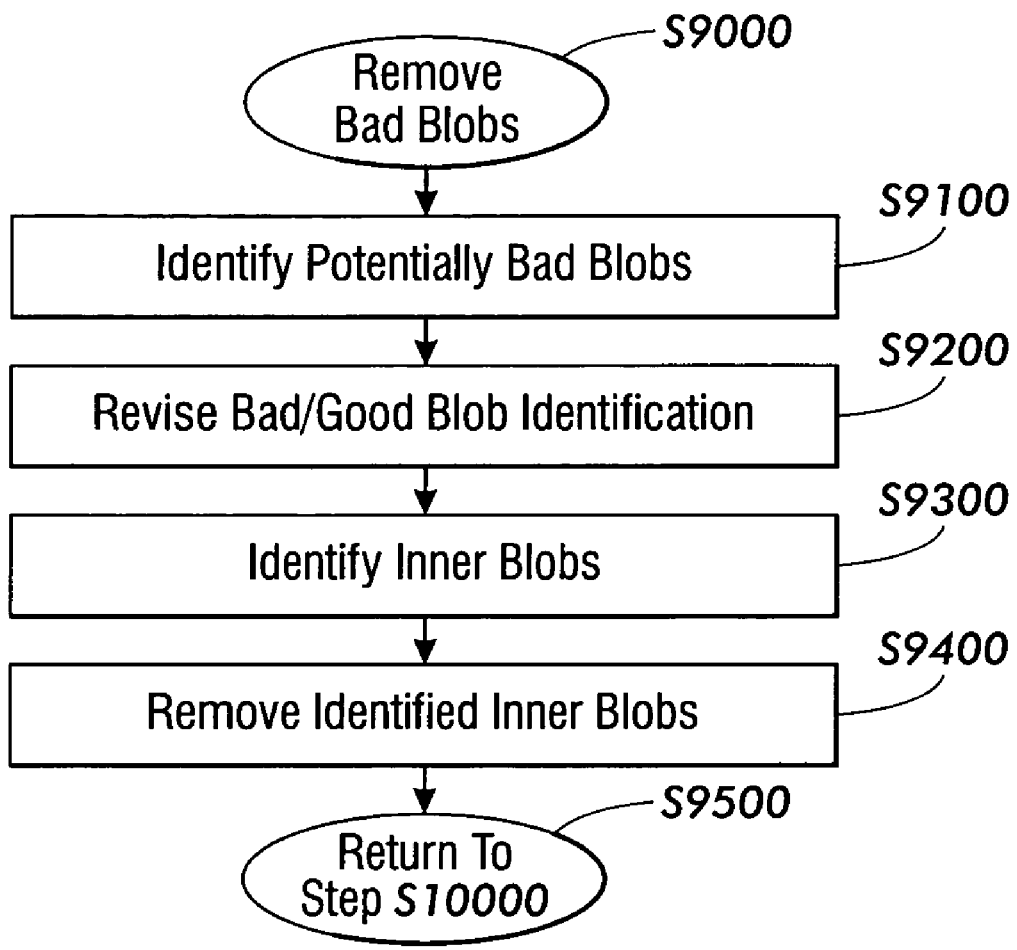
FIG. 33 is a flowchart outlining in greater detail one exemplary embodiment of a method for removing bad blobs.

FIG. 33 is a flowchart outlining in greater detail one exemplary embodiment of a method for removing bad blobs of step S9000. As shown in FIG. 33, operation of the method begins in step S9000 and continues to step S9100, where potentially bad blobs are identified. Next, in step S9200, the blobs which are identified as bad but which are surrounded by good blobs, and the blobs which are good but which are surrounded by bad blobs, are further analyzed to determine if the good or bad blob identification should be revised. It should be appreciated that, in various exemplary embodiments, identifying the bad or good blobs as being surrounded by the opposite type blob is sufficient to determine that the good/bad blob identification should be reversed. Operation then continues to step S9300.

In step S9300, any inner blobs, i.e., any blobs which are completely contained within other blobs, are identified. In various exemplary embodiments, such inner blobs are automatically removed as blobs and their image data merged onto the grayscale background plane. In various other exemplary embodiments, the inner blobs are analyzed to determine if they truly represent the background image data or if they should be maintained as valid blobs. Then, in step S9400, any inner blobs that are identified are removed. As indicated, in various exemplary embodiments, any identified inner blobs are automatically removed to the grayscale background plane. In various other exemplary embodiments, only those inner blobs which truly represent the background image data are removed to the grayscale background plane. Operation then continues to step S9500, where operation returns to step S10000.

Figure 34:
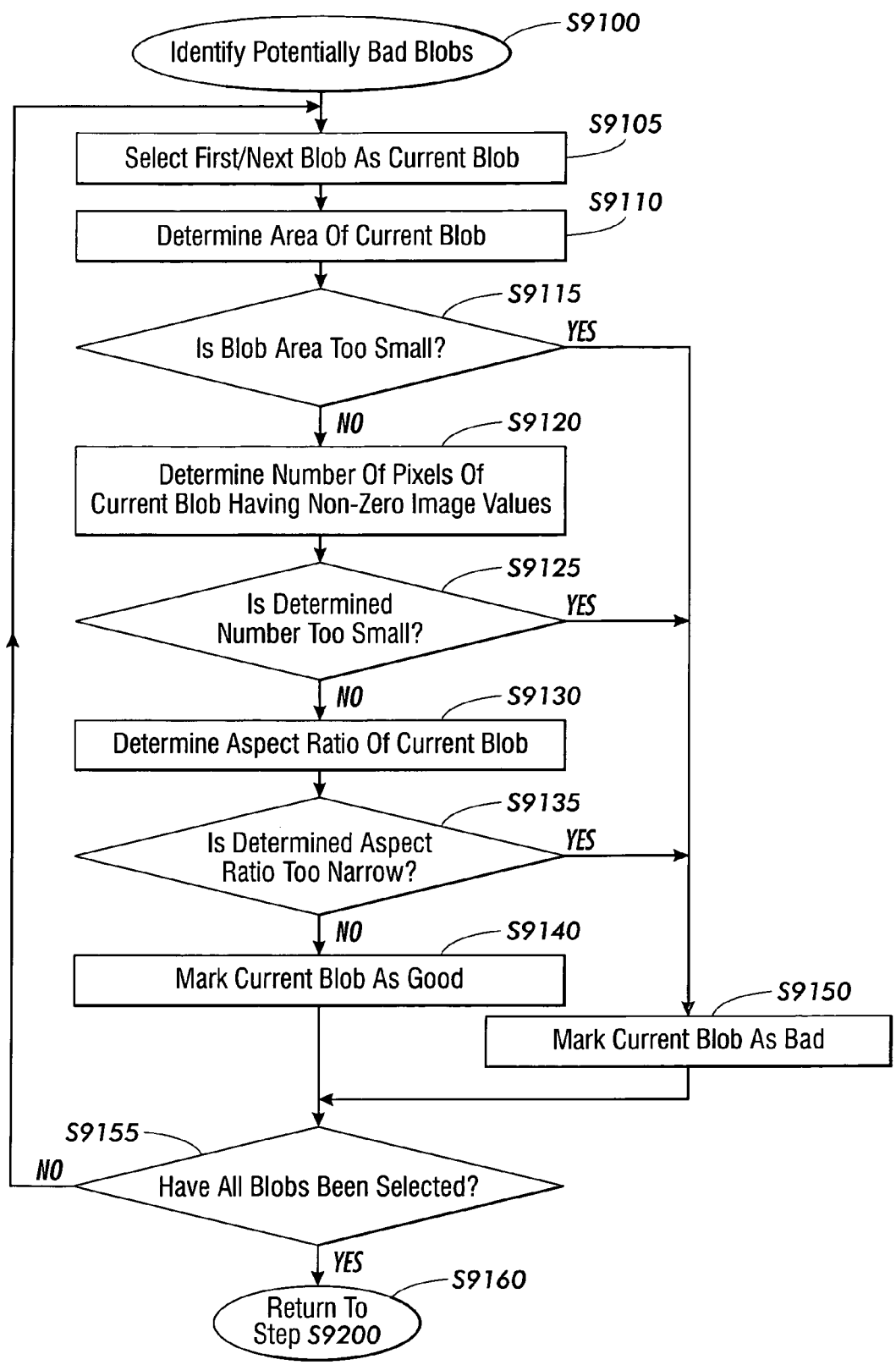
FIG. 34 is a flowchart outlining in greater detail one exemplary embodiment of a method for identifying potentially bad blobs.

FIG. 34 is a flowchart outlining in greater detail one exemplary embodiment of a method for identifying potentially bad blobs of step S9100. As shown in FIG. 34, operation of the method begins in step S9100 and continues to step S9105, where a first or next blob of the determined plurality of blobs is selected as a current blob. Then, in step S9110, the two-dimensional area of the current blob is determined. Next, in step S9115, a determination is made whether the determined area of the current blob is too small. If so, operation jumps to step S9150. Otherwise, operation continues to step S9120.

In step S9120, a number of "on" pixels, i.e., the number of pixels having non-zero image values, of the current blob is determined. Next, in step S9125, a determination is made whether the determined number of "on" pixels is too small. If so, operation again jumps to step S9145. Otherwise, operation continues to step S9130.

In step S9130, the aspect ratio of the current blob is determined. The aspect ratio is the ratio of the height to the width of the current blob. It should be appreciated that the aspect ratio is normalized so that it does not matter whether the blob is horizontally or vertically oriented. Then, in step S9135, a determination is made whether the aspect ratio of the current blob is too narrow. If so, operation again jumps to step S9145. Otherwise, because the blob has passed all of the tests, the blob is good and operation continues to step S9140, where the current blob is marked as good. Operation then jumps to step S9150.

In contrast, in step S9145, because the current blob has failed at least one of the tests, the current blob is marked as bad. Then, in step S9150, a determination is made whether all of the determined blobs have been selected. If not, operation returns to step S9105. Otherwise, operation continues to step S9155, where operation returns to step S9200.

Figure 35:
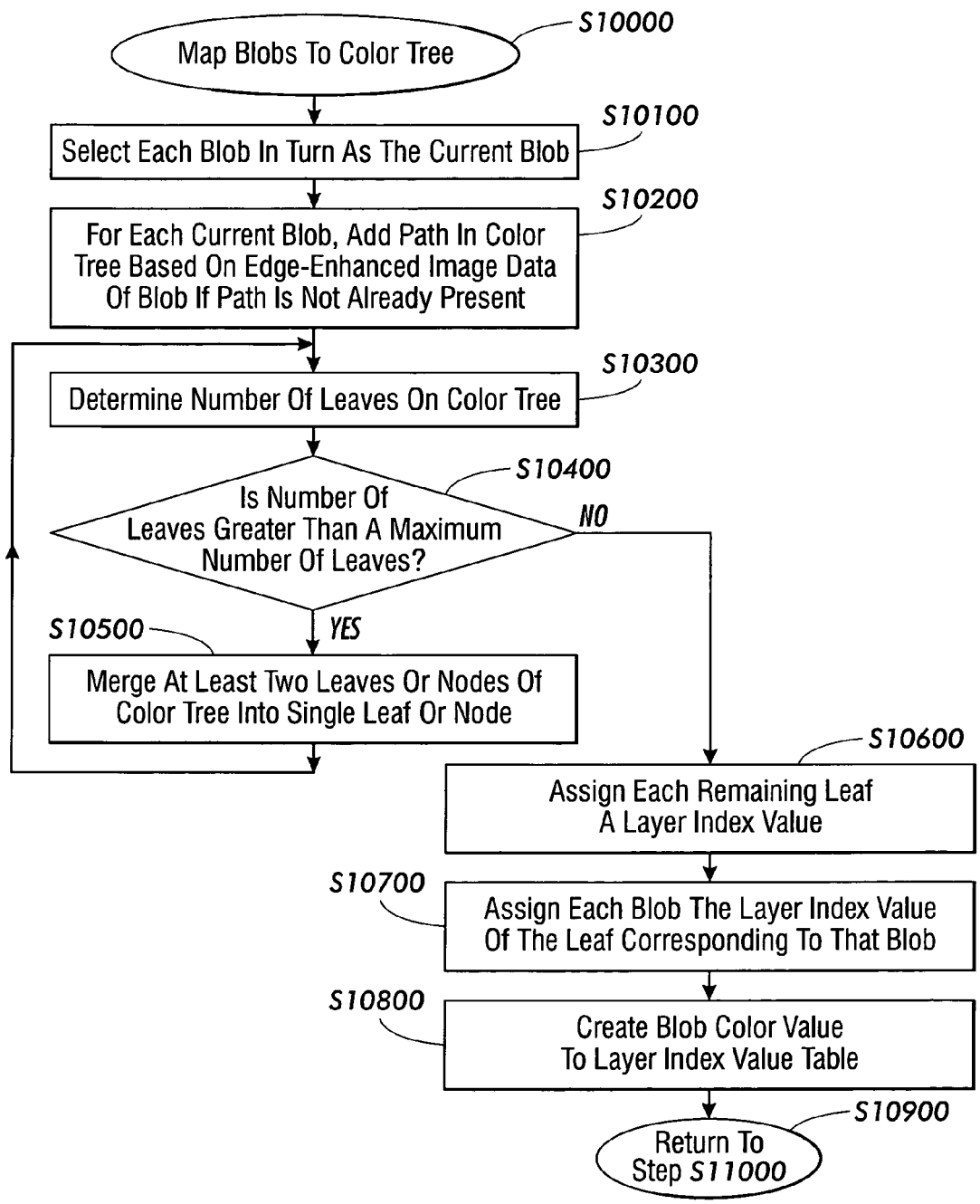
FIG. 35 is a flowchart outlining in greater detail one exemplary embodiment of a method for creating a color tree.

FIG. 35 is a flowchart outlining in greater detail one exemplary embodiment of a method for creating a color tree of step S10000. As shown in FIG. 35, operation begins in step S10000 and continues to step S10100, where each blob remaining after the bad blobs are removed from the set of determined blobs is selected in turn as the current blob. Then, in step S10200, for each blob, as it is selected in turn, a path is added in a color tree based on the edge-enhanced image data of the current blob, so long as the path corresponding to that edge-enhanced image data is not already present in the color tree. Next, in step S10300, after all of the paths for all of the blobs remaining after step S9000 are analyzed, a convenient number of leaves on the color tree are determined. Operation then continues to step S10400.

In step S10400, a determination is made whether the number of leaves on the color tree is greater than a maximum allowable number of leaves. If so, operation continues to step S10500. Otherwise, operation jumps to step S10600. In step S10500, at least two trees of a single node are merged together or a node having no leaves is merged into its parent node, or the like is performed, to reduce the number of leaves in the color tree. Operation then returns to step S10300 to determine the remaining number of leaves on the color tree.

Once the number of leaves is at most equal to the maximum number of leaves, operation continues to step S10600, where each remaining leaf in the color tree is assigned a layer index value. Next, in step S10700, each blob is assigned the layer index of the leaf to which that blob corresponds. Next, in step S10800, a blob color value to layer index value table is created. Operation then continues to step S10900, where operation returns to step S11000.

Figure 36:
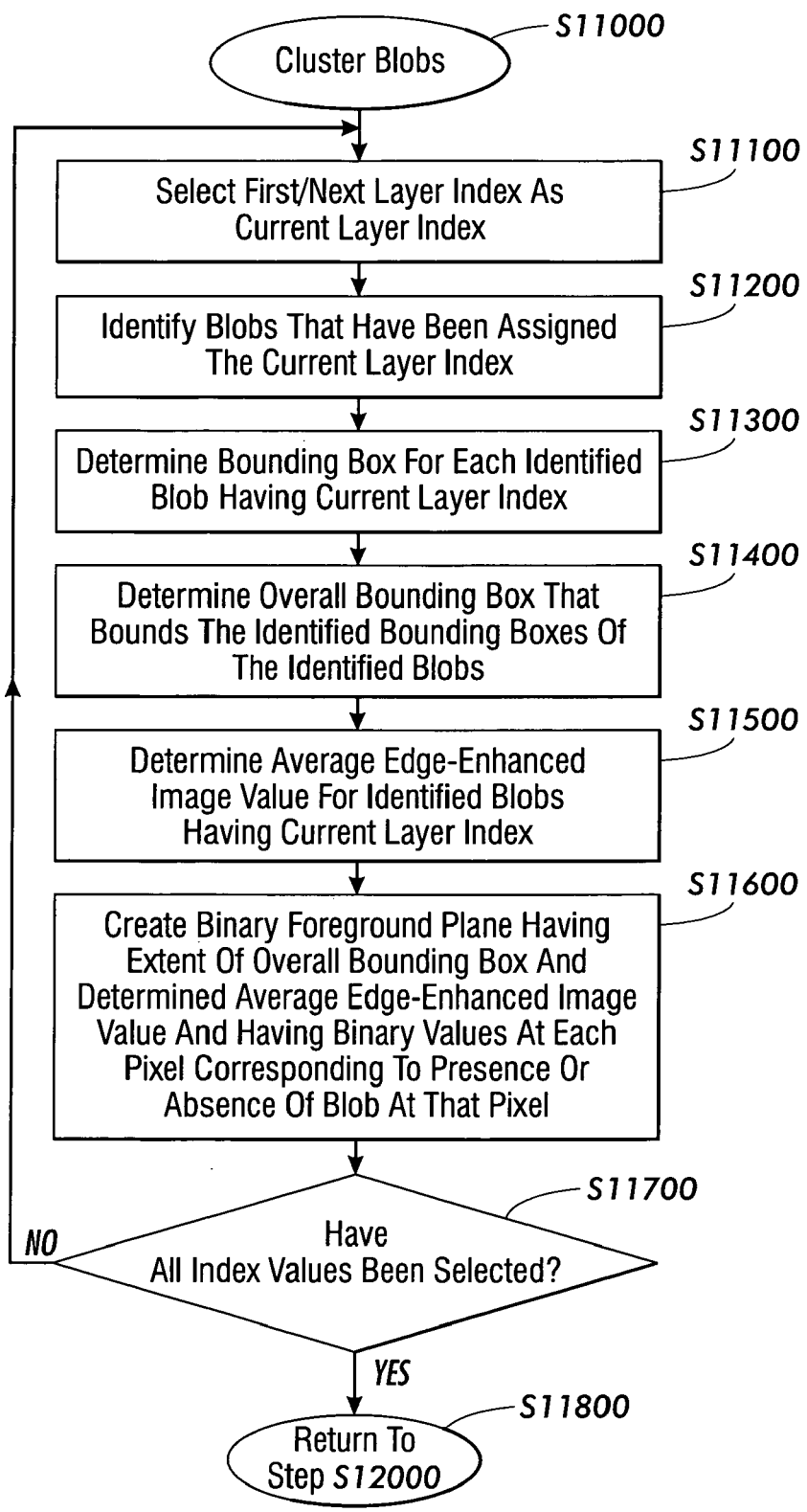
FIG. 36 is a flowchart outlining in greater detail one exemplary embodiment of a method for clustering the blobs.

FIG. 36 is a flowchart outlining in greater detail one exemplary embodiment of a method for clustering the blobs of step S11000. As shown in FIG. 36, beginning in step S11000, operation continues to step S11100, where the first or next layer index value is selected as the current layer index value. Then, in step S11200, blobs that have been assigned the current index layer are identified. Next, in step S11300, a bounding box is determined for each identified blob having the current layer index. Operation then continues to step S11400.

In step S11400, an overall bounding box that bounds all of the determined bounding boxes of the identified blobs is itself determined. Next, in step S11500, an average image value is determined for the identified blobs having the current layer index. Then, in step S11600, for the current layer index, a binary foreground plane is created, with this binary foreground plane having an extent corresponding to the overall bounding box and having a color corresponding to the determined average image value. Furthermore, the binary foreground plane has a binary value at each pixel that corresponds to the presence or absence of one of the identified blobs at that pixel. Operation then continues to step S11700.

In step S11700, a determination is made whether all of the layer index values have been selected. If so, operation returns to step S11100. Otherwise, operation continues to step S11800, where operation returns to step S12000.

While the invention has been described in conjunction with various exemplary embodiments, these embodiments should be viewed as illustrative, not limiting. Various modifications, substitutes, or the like are possible within the spirit and scope of invention.

What is claimed is:

1. A method for generating edge continuity pixel data, comprising:
   identifying a pixel as an edge pixel based on a maximum luminance value and a minimum luminance value of a first neighborhood of the pixel;
   setting a polarity value of the edge pixel based on a dot product of the maximum luminance value and associated chroma values, and the minimum luminance value and associated chroma values; and
   reclassifying the polarity value of the edge pixel if at least one pixel in a second neighborhood of the edge pixel does not have a same polarity value.

2. The method of claim 1, further comprising:
   reclassifying a non-edge pixel as an edge pixel with a polarity value if all pixels in a second neighborhood of the non-edge pixel have polarity values.

3. The method of claim 1, further comprising:
   assigning the maximum luminance value and associated chroma values of the edge pixel as values of a corresponding pixel in an enhanced image data if the edge pixel has a first polarity value;
   assigning the minimum luminance value and associated chroma values of the edge pixel as values of the corresponding pixel in the enhanced image data if the edge pixel has a second polarity value; and assigning blurred color image values of a non-edge pixel as values of the corresponding pixel in the enhanced image data for the non-edge pixel.

4. The method of claim 1, further comprising:
linearizing a sequence of consecutive maximum luminance values and minimum luminance values if the sequence of consecutive maximum luminance values and minimum luminance values are non-linear prior to performing the dot product.

5. An apparatus to generate edge continuity pixel data, comprising:
a minimum-maximum value generator that outputs a maximum luminance value and associated chroma values, and a minimum luminance value and associated chroma values based on the maximum luminance value and the minimum luminance value of a first neighborhood of a pixel;
a dot product multiplier that generates a polarity value of the pixel based on a dot product of the maximum luminance value and associated chroma values, and the minimum luminance value and associated chroma values;
an edge detector that detects that the pixel is an edge pixel based on the maximum luminance value and the minimum luminance value generated by the minimum-maximum generator;
a classifier that classifies the edge pixel based the polarity value generated by the dot product multiplier for the edge pixel; and
a reclassifier that reclassifies a classified pixel if at least one pixel in a second neighborhood of the pixel does not have a same classification.

6. The apparatus of claim 5, further comprising:
an edge enhancer that assigns:
the maximum luminance value and associated chroma values of the edge pixel as values of the corresponding pixel in the enhanced image data if the edge pixel has a first polarity value;
the minimum luminance value and associated chroma values of the edge pixel as values of a corresponding pixel in an enhanced image data if the edge pixel has a second polarity value; and
blurred color image values of a non-edge pixel as values of the corresponding pixel in the enhanced image data for the non-edge pixel.

7. The apparatus of claim 5, further comprising:
a linearizer that linearizes a sequence of consecutive maximum luminance values and the minimum luminance values if the sequence of consecutive maximum luminance values and the minimum luminance value are non-linear prior to input to the dot product multiplier.

8. A xerographic marking device incorporating the apparatus of claim 5.

9. A marking device incorporating the apparatus of claim 5.

10. A digital photocopier incorporating the apparatus of claim 5.

11. An apparatus to generate edge continuity pixel data, comprising:
means for identifying a pixel as an edge pixel based on a maximum luminance value and a minimum luminance value of a first neighborhood of the pixel;
means for setting a polarity value of the edge pixel based on a dot product of the maximum luminance value and associated chroma values, and the minimum luminance value and associated chroma value;
means for reclassifying the polarity value of the edge pixel if at least one pixel in a second neighborhood of the edge pixel does not have a same polarity value; and
means for reclassifying a non-edge pixel as an edge pixel with a polarity value if all pixels in a second neighborhood of the non-edge pixel have polarity values.

12. The apparatus of claim 11, further comprising:
means for assigning the maximum luminance value and associated chroma values of the edge pixel as values of a corresponding pixel in an enhanced image data if the edge pixel has a first polarity value;
means for assigning the minimum luminance value and associated chroma values of the edge pixel as values of the corresponding pixel in the enhanced image data if the edge pixel has a second polarity value; and
means for assigning the blurred color image data of a non-edge pixel as values of the corresponding pixel in the enhanced image data for the non-edge pixel.

13. A storage medium storing a set of program instructions executable on a data processing device, the set of program instructions comprising:
instructions for identifying a pixel as an edge pixel based on a maximum luminance value and a minimum luminance value of a first neighborhood of the pixel;
instructions for setting a polarity value of the edge pixel based on a dot product of the maximum luminance value and associated chroma values, and the minimum luminance value and associated chroma values,
instructions for reclassifying the polarity of the edge pixel if at least one pixel in a second neighborhood of the edge pixel does not have a same polarity value; and
instructions for reclassifying a non-edge pixel as an edge pixel with a polarity value if all pixels in the second neighborhood of the non-edge pixel have polarity values.

14. The program of claim 13, further comprising:
instructions for assigning the maximum luminance value and associated chroma values as values of a corresponding pixel in an enhanced image data if the edge pixel has a first polarity value;
instructions for assigning the minimum luminance value and associated chroma values as values of the corresponding pixel in the enhanced image data if the edge pixel has a second polarity value; and
instructions for assigning the blurred color image data of a non-edge pixel as values of the corresponding pixel in the enhanced image data for the non-edge pixel.

* * * * *